US012030981B2

(12) United States Patent
Kohl et al.

(10) Patent No.: US 12,030,981 B2
(45) Date of Patent: Jul. 9, 2024

(54) ANION-EXCHANGE MEMBRANES AND METHODS OF MAKING AND USING THE SAME

(71) Applicant: Georgia Tech Research Corporation, Atlanta, GA (US)

(72) Inventors: Paul A. Kohl, Atlanta, GA (US); Garrett Huang, Atlanta, GA (US); Mrinmay Mandal, Atlanta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 955 days.

(21) Appl. No.: 17/042,003

(22) PCT Filed: Mar. 27, 2019

(86) PCT No.: PCT/US2019/024273

§ 371 (c)(1),
(2) Date: Sep. 25, 2020

(87) PCT Pub. No.: WO2019/191225

PCT Pub. Date: Oct. 3, 2019

(65) Prior Publication Data

US 2021/0363291 A1 Nov. 25, 2021

Related U.S. Application Data

(60) Provisional application No. 62/764,912, filed on Aug. 16, 2018, provisional application No. 62/648,508, filed on Mar. 27, 2018.

(51) Int. Cl.
*C08G 61/08* (2006.01)
*B01J 41/14* (2006.01)
(Continued)

(52) U.S. Cl.
CPC .............. *C08G 61/08* (2013.01); *B01J 41/14* (2013.01); *C08J 5/2256* (2013.01);
(Continued)

(58) Field of Classification Search
CPC ................ C08G 61/08; C08G 2261/12; C08G 2261/135; C08G 2261/146;
(Continued)

(56) References Cited

U.S. PATENT DOCUMENTS

| | | | | |
|---|---|---|---|---|
| 2014/0042090 | A1 | 2/2014 | Bell et al. | |
| 2016/0046752 | A1* | 2/2016 | Bell | B01D 61/362 525/289 |
| 2017/0015790 | A1* | 1/2017 | Bell | B01D 71/44 |

FOREIGN PATENT DOCUMENTS

| | | | |
|---|---|---|---|
| EP | 3075763 | A1 | 10/2016 |
| JP | 2007227070 | A | 9/2007 |

(Continued)

OTHER PUBLICATIONS

"Extended European Search Report corresponding to European Application No. 19776800.5 dated Oct. 18, 2021".

(Continued)

*Primary Examiner* — Michael M. Bernshteyn
(74) *Attorney, Agent, or Firm* — Myers Bigel, P.A.

(57) ABSTRACT

The invention relates to an anion-exchange membrane (AEM) having a multiblock copolymer including a hydrophilic norbornene-based monomer and a hydrophobic alkene-based or norbornene-based monomer. The hydrophilic norbornene-based monomers include one or more cationic head groups such as a quaternary ammonium ion, which can optionally be crosslinked with a crosslinking agent to increase the structural stability of the polymer. These AEMs can be employed in electrochemical devices such as fuel cells.

20 Claims, 34 Drawing Sheets

(51) Int. Cl.
*C08J 5/22* (2006.01)
*H01M 50/414* (2021.01)
*H01M 50/497* (2021.01)

(52) U.S. Cl.
CPC ....... *H01M 50/414* (2021.01); *H01M 50/497* (2021.01); *C08G 2261/12* (2013.01); *C08G 2261/135* (2013.01); *C08G 2261/146* (2013.01); *C08G 2261/3324* (2013.01)

(58) Field of Classification Search
CPC ........ C08G 2261/3324; H01M 50/497; H01M 50/414; B01J 41/14; C08J 5/2256
USPC .......................................................... 526/281
See application file for complete search history.

(56) References Cited

FOREIGN PATENT DOCUMENTS

| | | | |
|---|---|---|---|
| JP | 2016199733 | A | 12/2016 |
| JP | 2017525808 | A | 9/2017 |
| WO | 2007096747 | A1 | 8/2007 |
| WO | 2016025942 | A1 | 2/2016 |

OTHER PUBLICATIONS

"International Preliminary Report on Patentability corresponding to International Application No. corresponding to International Application No. PCT/US2019/024273 mailed Oct. 8, 2020".

"International Search Report and Written Opinion corresponding to International Application No. PCT/2019/024273 mailed Jul. 8, 2019".

Chen, Wanting , et al., "Highly Conducting Anion-Exchange Membranes Based on Cross-Linked Poly(norbornene): Ring Opening Metathesis Polymerization", ACS Appl. Energy Mater. 2(4):2458-2468 (Feb. 11, 2019).

Liaw, Der-Jang , et al., "Novel Active Ester-Bridged Copolynorbornene Materials Containing Terminal Functional Hydroxyl, Amino, Methacryloyl, or Ammonium Groups via Ring-Opening Metathesis Polymerization", Journal of Polymer Science Part A: Polymer Chemistry 43(18):4233-4247 (Jan. 1, 2005).

Mandal, Mrinmay , et al., "Anionic multiblock copolymer membrane based on vinyl addition polymerization of norbornenes: Applications in anion-exchange membrane fuel cells", Journal of Membrane Science 570-571:394-402 (Oct. 18, 2018).

* cited by examiner

PNB-$X_{70}$-$Y_{30}$-PTFE

PNB-$X_{70}$-$Y_{30}$-PO

ANION-EXCHANGE MEMBRANES AND METHODS OF MAKING AND USING THE SAME

STATEMENT OF PRIORITY

This application is a 35 U.S.C. § 371 national phase application of PCT Application PCT/US2019/024273 filed Mar. 27, 2019, which claims the benefit, under 35 U.S.C. § 119(e), of U.S. Provisional Application Ser. No. 62/648,508, filed Mar. 27, 2018, and U.S. Provisional Application Ser. No. 62/764,912, filed Aug. 16, 2018, each of which are incorporated by reference herein in their entirety.

STATEMENT REGARDING FEDERALLY FUNDED RESEARCH

This invention was made with government support under grant number DE-AR0000769 awarded by the Department of Energy. The government has certain rights in the invention.

FIELD OF THE INVENTION

The present invention is directed to the preparation of anion-exchange membranes made from multiblock copolymers and their use in electronic and electrochemical devices.

BACKGROUND OF THE INVENTION

Alkaline anion exchange membrane electrochemical devices, including fuel cells (AEMFCs), electrolyzers and flow batteries, have gained increased interest due to their use of non-platinum catalysts and facile reaction kinetics (Pan, J. et al., *Chem. Mater.* 2017, 29, 5321-5330; Gottesfeld, S. et al. *J. Power Sources* 2017, 375, 170-184; Dekel, D. R. et al., *J. Power Sources* 2018, 375, 158-169). The solid, anion-exchange membrane (AEM) is a key component of the electrochemical device. AEMs have been investigated and several notable advances have been made in recent years (Ponce-Gonzalez, J. et al., *Energy Environ. Sci.* 2016, 9, 3724-3735; Varcoe, J. R. et al., *Energy Environ. Sci.* 2014, 7, 3135-3191; Pan, Z. F. et al., *Prog. Energy Combust.* 2018, 66, 141-175; Arges, C. G. et al., *ACS Appl. Energy Mater.* 2018, 1, 2991-3012). The requirements for AEMs include (i) high ionic conductivity, (ii) chemical and thermal stability at high pH and (iii) adequate mechanical toughness and durability for device fabrication and operation (Sun, Z. et al., *Chem Sus Chem* 2017, 11, 58-70; Pan, J. et al., *Acc. Chem. Res.* 2012, 45, 473-481). However, optimization of all the properties can be difficult because the polar moieties in the polymer backbone or elsewhere in the polymer structure have led to issues with long-term alkaline stability, especially at high pH (Nuñez, S. A. et al., *Chem. Mater.* 2016, 28, 2589-2598; Xue, J. et al., *J. Mater. Chem.* 2018, 6, 11317-11326; Liu, D. et al., *J. Mater. Chem.* 2018, 6, 10879-10890).

A common strategy to increase the ionic conductivity is to synthesize polymers with high ion exchange capacity (IEC). However, this can lead to high water uptake (WU), which often reduces the mechanical toughness of the polymer and floods the ion conducting channels (Pan, J. et al., *Energy Environ. Sci.* 2014, 7, 354-360; Hossain, M. M. et al., *J. Power Sources* 2018, 390, 234-241). Cross-linking is a simple way to limit the WU and membrane swelling. However, a high degree of cross-linking can inhibit polymer flexibility, lead to poor ion mobility and results in inferior mechanical properties (Lin, C. X. et al., *J. Membr. Sci.* 2017, 539, 24-33; Lee, K. H. et al., *Energy Environ. Sci.* 2017, 10, 275-285; Wang, J. et al., *J. Membr. Sci.* 2014, 459, 86-95). The long-term alkaline stability of AEMs is a critical issue for anionic devices. Increasing the device operating temperature is highly desirable because it improves electrokinetics and WU is less of a problem because the high water vapor pressure assists in water management, however, nucleophilic hydroxide attack is accelerated at high temperature (Fujimoto, C. et al., *J. Membr. Sci.* 2012, 423, 438-449). Benzyl-attached trimethyl ammonium is known to be an unstable means of cation attachment (i.e. fixed quaternary ammonium cation). The electron withdrawing nature of the aromatic ring makes the benzyl-attached quaternary ammonium cation susceptible to nucleophilic attack (Arges, C. G. et al., *Proc. Natl. Acad. Sci. U S. A.* 2013, 110, 2490-2495). To mitigate this degradation, long alkyl tethers have been used to replace the methylene groups between the polymer backbone and the fixed cation head-group (Guo, D. et al., *ACS Appl. Mater. Interfaces* 2016, 8, 25279-88; Lee, W.-H. et al., *ACS Macro Lett.* 2017, 6, 566-570; Dang, H.-S. et al., *J. Mater. Chem. A* 2016, 4, 11924-11938). Moreover, electron-withdrawing groups, such as sulfones and aryl ethers, have stability problems in alkaline solutions at typical device operating temperature (e.g. 80° C.). Thus, there is a great need in the art to develop polymers that overcome the above mentioned shortcomings and exhibit the desirable physical properties that allow for their application in electronic devices.

SUMMARY OF THE INVENTION

The anion-exchange membranes (AEMs) of the invention are AEMs composed of all-hydrocarbon backbones with long alkyl tethered side chains which contain a fixed-cation head-group. The polymers exhibit suitable chemical stability and physical characteristics that are desirable for use in electronic devices.

In particular, one aspect of the invention relates to a multiblock copolymer comprising one or more norbornene-based hydrophilic blocks and one or more norbornene-based or alkene-based hydrophobic blocks.

One aspect of the invention relates to a multiblock copolymer comprising one or more norbornene-based hydrophilic blocks and one or more hydrophobic blocks. For example, the one or more hydrophobic blocks(s) are norbornene-based hydrophobic blocks comprising one or more hydrophobic monomers with a structure represented by Formula (I):

(I)

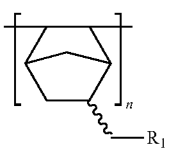

wherein $R_1$ is a saturated C1-C20 alkyl chain or halogenated alkyl chain branched or unbranched; and n is an integer from 1 about 1,000.

In another example, the one or more hydrophobic blocks(s) are alkene-based hydrophobic blocks comprising one or more hydrophobic monomers with a structure represented by Formula (II):

(II)

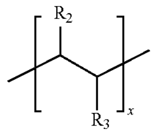

wherein $R_2$ and $R_3$ are independently selected from H, a bond [Not sure what it means to be a bond.], and a saturated C1-C20 alkyl or halogenated alkyl chain branched or unbranched; and x is an integer from about 10 to 1,000.

Examples of the one or more hydrophilic blocks comprise one or more hydrophilic monomers with a structure represented by Formula (III):

(III)

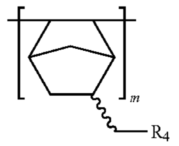

wherein $R_4$ is a saturated C2-C20 alkyl chain branched or unbranched with one or more cationic head groups; and m is an integer from about 10 to about 1,000.

Another aspect of the invention relates to an anion-exchange membrane (AEM) comprising the multiblock copolymer of the invention. For example, the AEM of the invention may comprise a structure represented by:

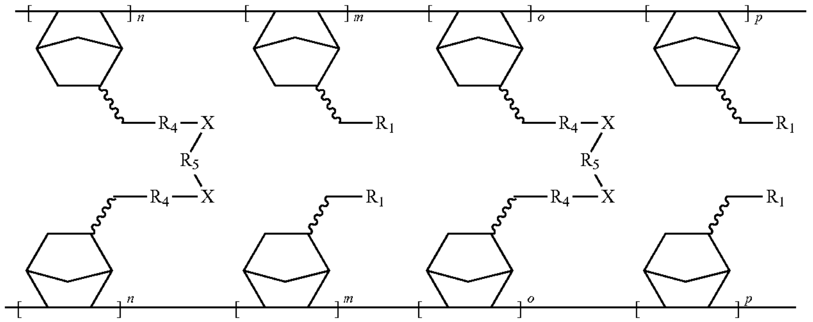

wherein $R_4$ is a saturated C1-C20 alkyl chain branched or unbranched;

$R_1$ is a saturated C2-C20 alkyl chain branched or unbranched;

X is a cationic head group comprising a cationic charged heteroatom (e.g., $^{+}N(CH_3)_2$);

$R_5$ is a crosslinker comprising a saturated C2-C10 alkyl chain branched or unbranched; and n, m, o, and p are integers independently selected from about 10 to about 1,000.

Another aspect of the invention relates to a method of making the multiblock copolymer of the invention, e.g., via vinyl addition polymerization or ring opening metathesis polymerization (ROMP).

Another aspect of the invention relates a method of making a crosslinked multiblock copolymer comprising crosslinking one or more hydrophilic blocks in a multiblock copolymer of the invention with one or more crosslinking agents.

Another aspect of the invention relates to a device comprising the multiblock copolymer and/or an anion-exchange membrane (AEM) of the invention, e.g., an electrochemical device such as a fuel cell, an electrolyzer, and a redox flow battery.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

DETAILED DESCRIPTION

Figure 1A:
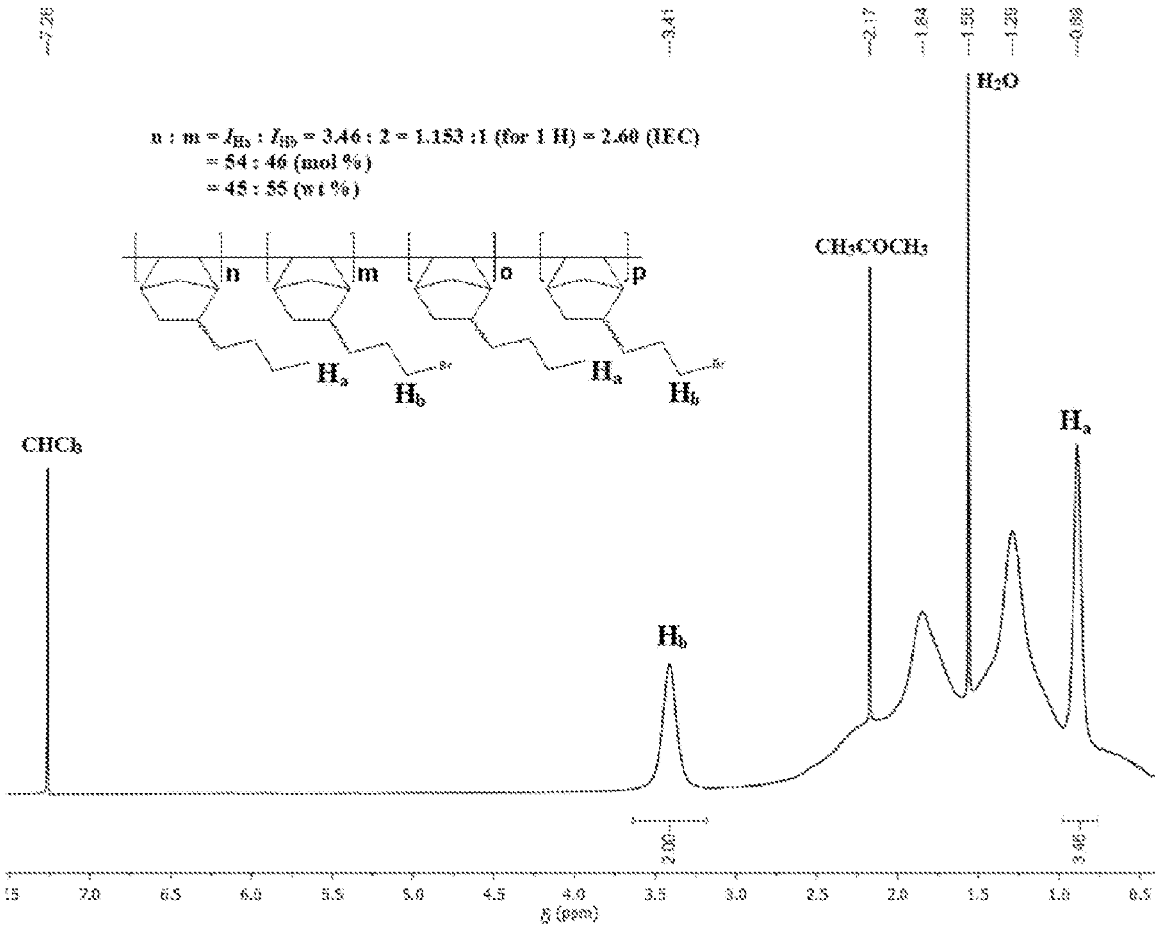
FIG. 1A. $^1$H NMR spectrum of tetrablock PNB-$X_{54}$-$Y_{46}$ in $CDCl_3$.

The present invention will now be described more fully hereinafter. This invention may, however, be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the present application and relevant art and should not be interpreted in an idealized or overly formal sense unless expressly so defined herein. The terminology used in the description of the invention herein is for the purpose of describing particular embodiments only and is not intended to be limiting of the invention. All publications, patent applications, patents and other references mentioned herein are incorporated by reference in their entirety. In case of a conflict in terminology, the present specification is controlling.

Also as used herein, "and/or" refers to and encompasses any and all possible combinations of one or more of the associated listed items, as well as the lack of combinations when interpreted in the alternative ("or").

A weight percent (wt. %) of a component, unless specifically stated to the contrary, is based on the total weight of the formulation or composition in which the component is included.

A mole percent (mol %) of a component, unless specifically stated to the contrary, is based on the total number of moles of each unit of the formulation or composition in which the component is included.

As used herein, "molecular weight" refers to number-average molecular weight which is sometimes measured by $^1$H NMR spectroscopy or other analytical methods such as gel permeation chromatography, unless clearly indicated otherwise.

As used herein, "copolymer" is a polymer made by reaction of at least two different monomers, with units of more than one kind.

As used herein, "multiblock polymers" (or segmented block copolymers) are copolymers consisting of alternating homogeneous segments (i.e. blocks) of at least two different monomers which are attached covalently to each other. If these monomers are chemically distinct, they differ significantly from the respective random copolymers or blends of the homopolymers. The segments of "blocks" can also differ in size and molecular weight depending on the number of monomers present in each block. Each block of a multiblock copolymer does not have to be the same molecular length. For example, the block length of each block in a tetrablock copolymer can have a unique value.

The term "hydration number" as used herein refers to the number of molecules of water with which an ion can combine in an aqueous solution of given concentration.

The term "water uptake (WU) percentage" is the amount of water adsorbed by the polymer as expressed as percentage. That is, the weight of water in the polymer divided by the total weight of the polymer when it contains water.

The term "swelling ratio" as used herein refers to the amount of liquid material that can be absorbed by the copolymer.

The term "ion exchange capacity" is the equivalents of charge per mass of polymer. It can be expressed in milli-equivalents of charge per gram of polymer, meq./g. Doubly charged ions within the polymer have twice the equivalents of charge compared to a singly charged ion.

The term "hydroxide conductivity" is the ionic conduction of hydroxide ions within the polymer, as can be measured by conductivity or impedance measurements known by a person of ordinary skill in the art. The units on ionic conductivity are siemens/cm (S/cm) or 1/(ohm cm). A siemen is an inverse ohm.

The term "monomer" as used herein refers to one of the constituent units used to synthesize a polymer.

The term "crosslinking agent" as used herein refers to a molecule, ion or other chemical unit capable of forming a chemical unit linking two parts of the same polymer chain or two different polymer chains.

The term "alkyl" as used herein is a branched or unbranched saturated hydrocarbon group of 1 to 20 carbon atoms, such as methyl, ethyl, n-propyl, isopropyl, n-butyl, isobutyl, t-butyl, pentyl, hexyl, heptyl, octyl, nonyl, decyl, dodecyl, tetradecyl, hexadecyl, eicosyl, tetracosyl, and the like. The alkyl group can also be substituted or unsubstituted. The term "quaternary ammonium" as used herein is represented by the formula $NA_4^+$ where A can be hydrogen or hydrocarbons.

Anion-exchange membranes (AEM) are of interest for a number of electrochemical devices (i.e. fuel cells, electrolyzers, redox flow battery) (Mekhilef, S. et al., *Renewable Sustainable Energy Rev.* 2012, 16, 981-989; Carrette, L. et al., *Fuel Cells* 2001, 1, 5-39). The development of AEMs with long-term alkaline stability and high hydroxide ion conductivity is of current interest (Winter, M. et al., *Chem. Rev.* 2004, 104, 4245-4269; Steele, B. C. et al., *Nature* 2001, 414, 345-352; Varcoe, J. R. et al., *Energy Environ. Sci.* 2014, 7, 3135-3191' Lu, S.; Pan, J. et al., *Proc. Natl. Acad. Sci. U.S.A.* 2008, 105, 20611-20614). The operation of fuel cells and electrolyzers at high pH allows the use of non-precious metal catalysts, especially for oxygen reduction and evolution, and reduced fuel crossover compared to proton-exchange membranes (PEM) devices (Yu, E. H. et al., *Energy Environ. Sci.* 2012, 5, 5668-5680; Hickner, M. A. et al., *J. Polym. Sci. Part B: Polym. Phys.* 2013, 51, 1727-1735; Zhou, J. et al., *J Electrochem. Soc.* 2013, 160, F573-F578; Mohanty, A. D. et al., *J. Mater. Chem. A* 2014, 2, 17314-17320; Liu, L. et al., *J Mater. Chem. A* 2016, 4, 16233-16244). Early AEMs have had low ionic conductivity, poor stability at high pH, and high water uptake (Mandal, M. et al., *J. Membr. Sci.* 2019, 570-571, 394-402; Mohanty, A. D. et al., *J. Electrochem. Soc.* 2017, 164, F1279-F1285; Arges, C. G. et al., *ACS Appl. Energy Mater.* 2018, 1, 2991-3012). However, recent studies have shown that the tethered, long-chain trimethyl ammonium (TMA) cation is stabile in alkaline environments at elevated temperature (Zhang, X. et al., *Polym. Chem.* 2018, 9, 699-711; Shi, Q. et al., *Polymer* 2017, 121, 137-148; Weiber, E. A. et al., *Polym. Chem.* 2015, 6, 1986-1996; Akiyama, R. et al., *Macromolecules* 2016, 49, 4480-4489). High hydroxide conductivity is critical in membranes for fuel cells, batteries and electrolyzers. The use of multiblock copolymers can improve the hydroxide mobility compared to random copolymers (Shimada, M. et al., *J. Polym. Sci. Part A: Polym. Chem.* 2016, 54, 935-944). This is due to the high degree of phase segregation in block copolymers leading to efficient ion-channel formation, compared to random copolymers. In addition, water management within the membrane can play an important role in controlling the mechanical deformation (i.e. water swelling) and ionic conductivity. Water is needed in the membrane to form the ionic hydration shell for the mobile hydroxide ion and stationary cation. However, excessive water uptake can lead to swelling of the ion conduction channels resulting in lower ionic conductivity (i.e. lower ion mobility) and softening of the membrane. Thus, it is necessary to optimize the ion conducting channel size so that the amount of free, unbound (unproductive) water is minimized.

The long-term stability of AEMs largely depends on the chemical nature of the polymer backbone, position of the cation within the polymer architecture, and chemical nature of the fixed cation. In the past, polymers based on poly (arylene ether sulfone)s were investigated as AEMs (Fujimoto, C. et al., *J. Membr. Sci.* 2012, 423-424, 438-449; Nuñez, S. A. et al., *ACS Macro Lett.* 2013, 2, 49-52; Arges, C. G. et al., *Proc. Natl. Acad. Sci. U.S.A.* 2013, 110, 2490-2495) and poly(arylene ether ketone)s (Long, H. et al., *J. Phys. Chem. C* 2012, 116, 9419-9426; Lee, W. H. et al., *ACS Macro Lett.* 2015, 4, 453-457). Significant degradation was observed at high pH. Polysulfone and polyketone groups in the polymer backbone were susceptible to nucleophilic attack by hydroxide. The poly(aryl ether) backbone undergoes cleavage of the C—O bonds at high pH which limits the long-term use (Ono, H. et al., *J Mater. Chem. A* 2017, 5, 24804-24812; Lee, W. 14 et al., *ACS Macro Lett.* 2015, 4, 814-818; Park, D. Y. et al., *J Phys. Chem. C* 2013, 117, 15468-15477).

In addition to the polymer backbones, nucleophilic attack of the fixed cation headgroups results in degradation. The mechanisms for degradation of quaternary ammonium head groups include β-hydrogen Hofmann elimination, direct nucleophilic substitution ($S_N2$) and elimination via ylide formation (Chen, X. C. et al., *Nano Lett.* 2014, 14, 4058-4064; Inceoglu, S. et al., *ACS Macro Lett.* 2014, 3, 510-514) Hibbs et al. found that a hexamethylene spacer between the trimethylammonium (TMA) cation and the polymer backbone results in better stability than the trimethylbenzylammonium (BTMA) cation in 4 M KOH at 80° C. (Sun, J. et al., *J. Am. Chem. Soc.* 2014, 136, 14990-14997). Miyatake et al. optimized the length of the pendent chain and found that side chains with three carbon atoms lead to a balance between high conductivity and low water uptake in AMEs (Ahmad Mahmoud, et al., *J Mater. Chem.* 2018, 6, 1440-14409). Later, Mohanty et al. reported that a quaternary ammonium head group tethered to the backbone by a long alkyl chain had the best alkaline stability by comparing the stability of small molecules. A cation attached to a long alkyl chain increases the barrier for the Hofmann elimination reaction and minimizes the risk of degradation (Sun, J. et al., *Macromolecules* 2016, 49, 3083-3090). It was observed that the polymers with the combination of an all-hydrocarbon backbone and tethered quaternary ammonium group on a long alkyl chain have the best long-term alkaline stability (Price, S. C. et al., *Macromolecules* 2013, 46, 7332-7340; Meek, K. M. et al., *Macromolecules* 2015, 48, 4850-4862; He, X. et al., *RSC Adv.* 2015, 5, 63215-63225).

Price et al. synthesized hydrogenated poly(norbornene) as an anion-exchange membrane via ring-opening metathesis polymerization (ROMP) with high ionic conductivity, 177 mS/cm at 80° C. Although the conductivity was high, the membranes were mechanically weak and not stable under alkaline condition (Kim, D.-G. et al., *Chem. Mat.* 2015, 27, 6791-6801). Register et al. described the synthesis of block copolymers by vinyl addition polymerization of substituted norbornenes in a living polymerization and their use as a pervaporation membrane (He, S. Q. et al., *J. Membr. Sci.* 2016, 509, 48-56; Xu, W. et al., *Adv. Funct. Mater.* 2015, 25, 2583-2589; Wang, J. et al., *J. Membr. Sci.* 2012, 415-416, 205-212). In a previous study, high $T_g$ (385° C.) polynorbornene was shown to have excellent stability (Tibbits, A. C. et al., *J. Electrochem. Soc.* 2015, 162, F1206-F1211).

In this disclosure, a facile synthetic strategy was used to prepare a series of tetrablock AEM copolymers based on vinyl addition polymerization of norbornenes, Scheme 1.

The AEMs were cast from solution and the impact of bound and unbound water on conductivity was evaluated. Surprisingly, tetrablock AEM copolymers comprising light cross-linking exhibited high IEC while maintaining good hydroxide mobility. Furthermore, high thermal stability, excellent mechanical properties and negligible long-term degradation at high pH (1 M NaOH solution at 80° C.) were demonstrated. The AEMs were used as membranes in an all-alkaline fuel cell.

Thus, one aspect of the invention relates to a multiblock copolymer comprising one or more norbornene-based hydrophilic blocks and one or more hydrophobic blocks. In some embodiments, the one or more hydrophobic blocks are norbornene-based hydrophobic blocks. Norbornene-based hydrophobic blocks comprise hydrophobic monomers having a norbornene structure substituted with a saturated C1-C20 alkyl chain (e.g., C1, C2, C3, C4, C5, C6, C7, C8, C9, C10, C11, C12, C13, C14, C15, C16, C17, C18, C19, or C20 alkyl chain) branched or unbranched. In some embodiments, the alkyl chain may be halogenated (i.e., comprising one or more halogens (e.g., Cl, Br, F, or I) located throughout the alkyl chain. For example, in some embodiments, the alkyl chain is halogenated with bromine, chlorine or fluorine. In some embodiments, the halogen is located at the terminal position of the halogenated alkyl chain of the hydrophobic monomer. In some embodiments, the alkyl chain is non-halogenated. In some embodiments, the alkyl chain is a C3-C6 alkyl chain. When one or more norbornene-based hydrophobic monomers are combined a "norbornene-based hydrophobic block" is formed, wherein the number (n) of norbornene-based hydrophobic monomers can vary. In some embodiments, the number (n) of norbornene-based hydrophobic monomers is from about 10 to about 1,000, from about 100 to about 1,000, or from about 500 to about 1,000. For example, a norbornene-based hydrophobic block present in a multiblock copolymer of the invention comprises a structure represented by Formula (I):

(I)

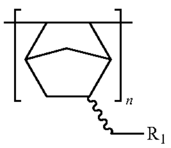

wherein $R_1$ is a saturated C1-C20 alkyl chain or halogenated alkyl chain branched or unbranched; and n is an integer from 1 about 1,000.

In some embodiments, the one or more hydrophobic blocks are alkene-based hydrophobic blocks. The alkene-based hydrophobic blocks comprise one or more hydrophobic monomers with a structure represented by Formula (II):

(II)

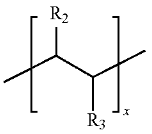

wherein $R_2$ and $R_3$ are independently selected from H and a saturated C1-C20 alkyl or halogenated alkyl chain branched or unbranched; and x is an integer from about 10 to 1,000.

Norbornene-based hydrophilic blocks comprise hydrophilic monomers having a norbornene structure substituted with a saturated C2-C20 alkyl chain (e.g., C2, C3, C4, C5, C6, C7, C8, C9, C10, C11, C12, C13, C14, C15, C16, C17, C18, C19, or C20 alkyl chain) branched or unbranched with a cationic head group (e.g., C2-C20, C2-C10, or C4-C6 alkyl chain branched or unbranched). The cationic head group can be any group bearing a positive charge, such as a quaternary ammonium group, —$^+NR_3$ wherein R is H or an alkyl group (e.g., R is methyl, ethyl, etc.). The cationic head group may be terminal or non-terminal. In some embodiments, more than one cationic head group is present in the norbornene-based hydrophilic monomer. In some embodiments, the norbornene-based hydrophilic monomer comprises a norbornene structure substituted with a saturated C4-C10 alkyl chain terminated with a positively charged quaternary ammonium cationic head group. When one or more norbornene-based hydrophilic monomers are combined a "norbornene-based hydrophilic block" is formed, wherein the number (m) of norbornene-based hydrophilic monomers can vary. In some embodiments, the number (m) of norbornene-based hydrophilic monomers is from about 10 to about 1,000, from about 100 to about 1,000, or from about 500 to about 1,000.

For example, a norbornene-based hydrophilic block present in a multiblock copolymer of the invention comprises a structure represented by Formula (III):

(III)

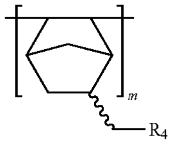

wherein $R_4$ is a saturated C2-C20 alkyl chain branched or unbranched with one or more cationic head groups; and m is an integer from about 10 to 1,000.

In some embodiments, the cationic head group is a quaternary ammonium head group (e.g., $—^{+}N(R)_3$ wherein R is a saturated C1-C10 alkyl chain branched or unbranched (e.g., $—CH_3$)).). In some embodiments, the cationic head group is a terminal quaternary ammonium head group (e.g., $—N(CH_3)_3{}^{+}$). In some embodiments, $R_4$ is a saturated C3 (i.e., propyl) or C4 (i.e., butyl) alkyl chain. In some embodiments, $R_4$ is a C3 or C4-alkyl chain (e.g., propyl or butyl) with at terminal cationic head group (e.g., $—N(CH_3)_3{}^{+}$).

In some embodiments, the multiblock copolymer comprises 2, 3, 4, 5, 6, 7, 8, 9, 10 or more blocks, wherein these blocks are hydrophilic and/or hydrophobic (e.g., norbornene-based hydrophilic blocks, norbornene-based hydrophobic blocks, and/or alkene-based hydrophobic blocks). In some embodiments, the multiblock copolymer comprises one or more norbornene-based hydrophilic blocks and one or more norbornene-based hydrophobic blocks. In some embodiments, the multiblock copolymer comprises one or more norbornene-based hydrophilic blocks and one or more alkene-based hydrophobic blocks. In some embodiments, the multiblock copolymer comprises 2 to 8 blocks. In some embodiments, the hydrophilic and/or hydrophobic blocks alternate within the multiblock copolymer. In some embodiments, the multiblock copolymer comprises an all-hydrocarbon backbone.

In some embodiments, the amount of hydrophobic blocks present in the multiblock copolymer of the invention can vary. For example, in some embodiments, the multiblock copolymer of the invention comprises a mole percent of the one or more hydrophobic blocks of from about 30% to about 40% (or from about 30%, about 31%, about 32%, about 33%, about 34%, about 35%, about 36%, about 37%, about 38%, about 39%, or about 40%). For example, in some embodiments, the multiblock copolymer of the invention comprises a weight percent of the one or more hydrophobic blocks of from about 10% to about 30% (or from about 10%, about 11%, about 12%, about 13%, about 14%, about 15%, about 16%, about 17%, about 18%, about 19%, about 20%, about 21%, about 22%, about 23%, about 24%, about 25%, about 26%, about 27%, about 28%, about 29%, or about 30%).

In some embodiments, the amount of hydrophilic blocks present in the multiblock copolymer of the invention can vary. For example, in some embodiments, the multiblock copolymer of the invention comprises a mole percent of the one or more hydrophilic blocks of from about 60% to about 70% (or about 60%, about 61%, about 62%, about 63%, about 64%, 65%, 66%, 67%, 68%, 69%, or 70%). For example, in some embodiments, the multiblock copolymer of the invention comprises a weight percent of the one or more hydrophobic blocks of from about 70% to about 90% (or from about 70%, about 71%, about 72%, about 73%, about 74%, about 75%, about 76%, about 77%, about 78%, about 79%, about 80%, about 81%, about 82%, about 83%, about 84%, about 85%, about 86%, about 87%, about 88%, about 89%, or about 90%).

In some embodiments, the multiblock copolymers of the invention have a ratio of norbornene-based hydrophilic monomer to hydrophobic monomer of from about 1:250 to about 250:1. For example, the ratio of norbornene-based hydrophilic monomer to hydrophobic monomer is about 1:250; 1:200; 1:100; 1:75; 1:50; 1:25; 1:20; 1:15; 1:10; 1:5; 1:1, 5:1; 10:1; 15:1; 20:1; 25:1; 50:1; 75:1; 100:1; 200:1, or 250:1.

In some embodiments, each norbornene-based hydrophilic block and/or hydrophobic block present in the multiblock copolymer comprise a molecular weight of from about 5 to about 20 kDa or from about 5 to about 15 kDa.

In some embodiments, the multiblock copolymer comprises a molecular weight of from about 10 to about 75 kDa or from about 20 to about 45 kDa.

In some embodiments, the multiblock copolymer of the invention is crosslinked with a crosslinking agent. Crosslinking is the act of chemically bonding one polymer chain to another or alternatively, one part of a chemical chain to another part of the same chain. Crosslinking polymers can modify the mechanical properties by creating new bonds that alter how the polymer behaves under mechanical stresses. Variables such as the crosslink density and the chemical nature of the crosslink can further alter the polymer's final properties. The disclosed multiblock copolymers are crosslinked with a crosslinking agent comprising at least two functional groups which can react with a chemical site on the multiblock copolymer. The end result is to create a chemical crosslink incorporating the crosslinking agent.

In some examples, the crosslinking agent can comprise two or more reactive groups (e.g., 3 or more, 4 or more, or 5 or more). In some examples the crosslinking agent can comprise 6 or less reactive groups (e.g., 5 or less, 4 or less, or 3 or less). The number of reactive groups of the crosslinking agent can range from any of the minimum values described above to any of the maximum values described above, for example from 2 to 6 (e.g., from 2 to 4, from 4 to 6, from 3 to 5, from 2 to 3, from 3 to 4, from 4 to 5, or from 5 to 6). Suitable reactive groups of the crosslinking agent include, but are not limited to, nucleophilic groups such as amines. In some embodiments, the crosslinking agent is a multi-amine comprising a saturated C2-C10 alkyl chain branched or unbranched with at least two amine functional groups (i.e., reactive groups). In some embodiments, the crosslinking agent is an alkyldiamine comprising C2-C10 alkyl chain branched or unbranched. Exemplary crosslinking agents include, but are not limited to, ethylene diamine, propyl diamine, butyl diamine, 1,5-pentanediamine and/or 1,6-hexanediamine. In some embodiments, the crosslinking agent is a C6 alkyl diamine (e.g., 1,6-hexanediamine).

Suitable functional groups for crosslinking incorporated into the copolymer include electrophilic functional groups such as, but not limited to, electrophilic carbon atoms, e.g., carbon atoms attached to leaving groups such as halogens (e.g., Cl, Br, F, I) or sulfonates (e.g., mesylate, triflate, tosylate). Thus, crosslinking of the copolymer of the invention comprising an electrophilic functional group such as a carbon bond to a leaving group with a crosslinking agent comprising a nucleophilic functional group (e.g., —$NR_2$ group, wherein R is H or alkyl) occurs via a nucleophilic substitution reaction ($S_N2$ reaction) to afford the crosslinked copolymer.

The amount of crosslinking, and thus the number of reactive groups in the copolymer involved in reactions, can be controlled by selecting the desired amount of crosslinking agent. That is, the stoichiometry of the reagents can be used to dictate the extent of crosslinking. The amount of crosslinking can be monitored by various analytical techniques, such as thin layer chromatography, infrared spectroscopy, gel permeation chromatography, and NMR. The mole percent of crosslinking agent used in the crosslinking reactions can be about 1% or more based on the total moles of sites on the polymer available for crosslinking. The percentage here refers to mole percent, sometimes given as mol %. (e.g., about 1% or more, about 3% or more, about 5% or more, about 10% or more, about 15% or more, about 20% or more, about 25% or more, about 30% or more, about 35% or more, about 40% or more, or about 45% or more). In some examples, the amount of crosslinking agent used can be about 10% or less based on the total number of sites within the polymer available for crosslinking (e.g., about 9% or less, about 8% or less, about 7% or less, about 6% or less, about 5% or less, about 4% or less, about 3% or less, about 2% or less, or about 1% or less). The amount of crosslinking agent used can range from any of the minimum values described above to any of the maximum values described above. For example, the amount of crosslinking agent used can be from about 1% to about 50% based on the total amount of monomers to be polymerized (e.g., from about 1% to about 50%, from about 5% to about 50%, from about 10% to about 40%, from about 20% to about 30%).

Thus, some embodiments of the invention relate to a method of making a crosslinked multiblock copolymer comprising crosslinking one or more hydrophilic blocks in a multiblock copolymer of the invention with one or more crosslinking agents as described above. In some embodiments, the crosslinking agent is a multi-amine alkyl chain comprising a saturated C2-C10 alkyl chain branched or unbranched with at least two amine functional groups. The one or more hydrophilic blocks in the multiblock copolymer comprise a saturated C1-C20 halogenated alkyl chain. A skilled artisan would be aware that the saturated C1-C20 halogenated alkyl chain contains at least one or more electrophilic carbon atoms as described above (i.e., a carbon atom bonded with a leaving group such as a halogen).

In some embodiments, the crosslinked copolymer comprises a crosslinker having one or more saturated C2-C20 alkyl chains branched or unbranched bound to the one or more cationic head groups (e.g., —$^+NR_3$, R is H or alkyl) of one or more norbornene-based hydrophilic monomers. For example, in some embodiments, the crosslinked copolymer comprises a crosslinker having a C4-C6 alkyl chain. In some embodiments, the cationic head groups of the one or more norbornene-based hydrophilic monomers are crosslinked with each other via an alkyl chain crosslinker.

For example, in some embodiments, the copolymer of the invention comprises a structure represented by Formula (IV):

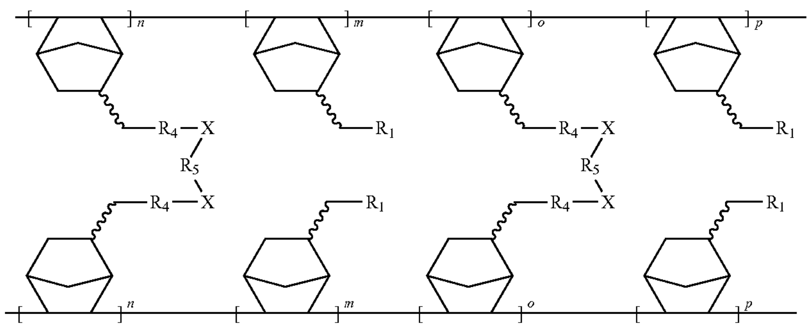

wherein $R_4$ is a saturated C1-C20 alkyl chain branched or unbranched;

$R_1$ is a saturated C2-C20 alkyl chain branched or unbranched;

X is a cationic head group comprising a cationic charged heteroatom (e.g., $^+N(R)_2$, wherein R is a C1-C10 alkyl chain branched or unbranched (e.g., —$CH_3$));

$R_5$ is a crosslinker comprising a saturated C2-C10 alkyl chain branched or unbranched; and n, m, o, and p are integers independently selected from about 1 to about 1,000.

The concentration of the crosslinker present in the copolymer can vary. For example, in some embodiments, the concentration of the crosslinker is from about 5 to about 50%, about 10% to about 40%, about 20 to about 30% (or at least about 5%, about 10%, about 15%, about 20%, about 25%, about 30%, about 35%, about 40%, or at least about 50%). Make these all mol %.

Another aspect of the invention is directed to an anion-exchange membrane comprising the multiblock copolymer composition of the invention. In some embodiments, the AEM of the invention comprises one or more crosslinked multiblock copolymers as described above. In some embodiments, the AEM of the invention comprises one or more non-crosslinked multiblock copolymers as described above. In some embodiments, the AEM of the invention comprises hydrophobic and hydrophilic regions within the multiblock polymer and/or AEM which form due to phase segregation within block copolymers. The presence of one or more anion conducting channels in the copolymer promotes the conductive properties of the AEM.

In some embodiments, the AEM of the invention comprises an ion exchange capacity of from about 1.5 to about 4.5 meq./g, about 1.75 meq./g to about 4.25 meq./g, about 2.0 meq./g to about 4.00 meq./g, about 2.25 meq./g to about 3.75 meq./g, about 2.50 meq./g to about 3.75 meq./g, about 2.75 meq./g to about 3.75 meq./g, about 3.00 meq./g to about 3.50 meq./g, or from about 3.25 meq./g to about 3.50 meq./g (or at least about 1.5 meq./g, about 2 meq./g, about 2.5 meq./g, about 3 meq./g, about 3.5 meq./g, or at least about 4 meq./g).

In some embodiments, the AEM of the invention comprises a hydroxide conductivity of from about 25 to about 275 mS/cm, about 35 to about 250 mS/cm, about 50 mS/cm to about 225 mS/cm, about 75 mS/cm to about 200 mS/cm, about 100 mS/cm to about 175 mS/cm, or about 125 mS/cm to about 175 mS/cm (or at least about 25 mS/cm, about 50 mS/cm, about 75 mS/cm, about 100 mS/cm, about 125 mS/cm, about 150 mS/cm, about 175 mS/cm, about 200 mS/cm, about 225 mS/cm, or at least about 250 mS/cm). The hydroxide conductivity can be measured at various temperatures. For example, in some embodiments, the hydroxide conductivity is measured at a temperature of from about 20° C. to about 100° C., about 25° C. to about 80° C., or from about 25° C. to about 65° C. (or at least about 25° C., about 35° C., about 45° C., about 55° C., about 65° C., about 75° C., about 85° C., or at least about 95° C.).

In some embodiments, the AEM of the invention comprises a water uptake percentage from about 10% to about 80%, about 15% to about 75%, about 25% to about 65%, or from about 40% to about 60% (or at least about 10%, about 20%, about 30%, about 40%, about 50%, about 60%, about 70%, about 80%, or at least 90%).

In some embodiments, the AEM of the invention comprises a hydration number of from about 5 to about 30, about 5 to about 25, about 5 to about 20, or about 5 to about 15 (or at least about 5, about 10, about 15, about 20, or at least about 25.

In some embodiments, the AEM of the invention comprises a swelling ratio of about 15% to about 50%, about 20% to about 40% (or at least about 10%, about 20%, about 30%, or about 40%).

In some embodiments, the AEM of the invention comprises a number of freezable water molecules of from about 1 to about 10 or from about 3 to about 6 (or at least about 1, about 2, about 3, about 4, about 5, about 6, about 7, about 8, or at least about 9) per ion pair.

In some embodiments, the AEM of the invention comprises a number of bound water molecules of from about 1 to about 50 or from about 10 to about 25 (or at least about 5, about 10, about 15, about 20, about 25, about 30, about 35, about 40, or at least about 45) per ion pair.

In some embodiments, the AEM of the invention is stabilized and/or reinforced with a stabilizing agent. A stabilizing agent can be any agent known in the art to modify the physical properties of a copolymer to increase its stability and endurability towards outside stressors. Examples of stabilizing agents include, but are not limited to, perfluorinated tetrafluoroethylene (PFTE) or a polyolefin (PO). The stabilizing agent can take the form or woven or non-woven fabric, or individual fibers. The size of the individual strands of the stabilizing agent can be from molecular-size strands to macro-strands with dimensions of 0.01 to 1.0 mm, or larger. Physical properties such as tensile strength, elongation at break, and Young's modulus of AEMs can be modulated with stabilizing agents.

The amount of the stabilizing agent present in the AEM varies and is dependent upon the type of stabilizing agent being used and the desired physical properties to be obtained. For example, in some embodiments the amount of stabilizing agent is from about 2 wt % to 80 wt %. In some cases, the amount of stabilizing agent is from 10 wt % to 50 wt %. The greater the amount of stabilizing agent, the stronger the composite film may become but at the expense of ion conductivity because the stabilizing agent may not contribute much or anything to ionic conductivity.

In some embodiments, the AEM of the invention exhibits a tensile strength of from about 10 to about 500 MPa, about 10 to about 250 MPa, about 12 to about 175 MPa, about 12 to about 150 MPa, or about 14 to about 45 MPa (or at least about 10 mPa, about 25 MPa, about 50 MPa, about 75 MPa, about 100 MPa, about 125 MPa, about 150 MPa, about 175 MPa, about 200 MPa, about 250 MPa, about 300 MPa, about 325 MPa, about 350 MPa, about 375 MPa, about 400 MPa, about 425 MPa, about 450 MPa, or at least about 475 MPa). The term "tensile strength" describes the resistance of a material (i.e., the AEM of the invention) to breaking under tension.

In some embodiments, the AEM of the invention exhibits an elongation to break of from about 10% to about 200%, about 25% to about 175%, or about 45% to about 155% (or at least about 10%, about 20%, about 30% about 40%, about 50%, about 60%, about 70%, about 80%, about 90%, about 100%, about 110%, about 120%, about 130%, about 140%, about 150%, about 160%, or at least 170%). The term "elongation to break" describes the existing elongation in the moment of rupture of a standardized test specimen (i.e., the AEM of the invention). The elongation at break is expressed as a percentage in relation to the initial length before the elongation.

In some embodiments, the AEM of the invention exhibits a Young's modulus (i.e., elastic modulus) of from about 0.0010 to about 1 GPa, 0.0050 to about 1 GPa, about 0.0050 to about 0.0200 GPa, about 0.0050 GPa to about 0.0175 GPa, or from about 0.0075 GPa to about 0.0150 GPa (or at least about 0.0010 GPa, about 0.0050 GPa, about 0.0100 GPa, about 0.1 GPa, about 0.2 GPa, about 0.3 GPa, about 0.4 GPa, about 0.5 GPa, about 0.6 GPa, about 0.7 GPa, about 0.8 GPa, or at least about 0.9 GPa. The term "Young's modulus", which is also known as the elastic modulus, describes a mechanical property of linear elastic solid materials (e.g., AEMs of the invention) and, thus, defines the relationship between stress (force per unit area) and strain (proportional deformation) in a material.

Another aspect of the invention relates to a method of making the AEM and/or multiblock copolymers of the invention according to known methods in the art. Exemplary methods include, but are not limited to, polymerization of norbornene through vinyl addition polymerization or ring-opening metathesis polymerization (ROMP) to afford the copolymers of the invention. For example, polymerization of substituted norbornene molecules in the presence of a metal catalyst (e.g., Pd-based catalyst) and a solvent affords hydrophobic and/or hydrophilic polymer blocks of polymerized norbornene and/or alkene-based molecules, wherein the polymer has an all-hydrocarbon backbone. The total ratio of monomers to catalyst used can range from about 1500:1 to about 1:1. For example, ratio of norbornene monomers to catalyst can be about 1200:1, about 1100:1, about 1000:1, about 750:1, about 500:1, about 100:1, about 50:1, about 10:1, or about 1:1. Sequential and alternate addition of hydrophilic and/or hydrophobic monomers to the growing polymer affords the multiblock copolymer of the invention. In some embodiments, the solvent comprises a nonpolar solvent, e.g., toluene. The reaction mixture can be left at ambient temperatures or elevated temperatures.

Another aspect of the invention relates to a method of making a crosslinked multiblock copolymer comprising crosslinking one or more hydrophilic blocks in a multiblock copolymer of the invention with one or more crosslinking agents. In some embodiments, the crosslinking agent is a multi-amine alkyl chain comprising a saturated C2-C10 alkyl chain branched or unbranched with at least two amine functional groups. For example, in some embodiments, the crosslinking agent is an alkyldiamine comprising a saturated C2-C10 alkyl chain branched or unbranched. In some embodiments the one or more hydrophilic blocks in the multiblock copolymer comprises a saturated C1-C20 halogenated alkyl chain Another aspect of the invention relates to a device comprising the copolymer of the invention and/or the AEM of the invention. In some embodiments, the device is an electrochemical device. In some embodiments, the electrochemical device is selected from a fuel cell, an electrolyzer, and a redox flow battery. In some embodiments, the electrochemical device is a fuel cell. In some embodiments, the fuel cell is part of a stationary power generator and/or portable electronic device.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1: Anionic Multiblock Copolymer Membrane Based on Vinyl Addition Polymerization of Norbornenes: Applications in Anion-Exchange Membrane Fuel Cells Materials: 1-hexene, 5-bromo-1-pentene and dicyclopentadiene were purchased from Alfa Aesar and used as-received. The monomers, butyl norbornene (BuNB) and bromopropyl norbornene (BPNB), were synthesized via a Diels-Alder reaction at high-temperature according to a published procedure (Martínez-Arranz, S. et al., Macromolecules 43 (2010) 7482-7487). Prior to polymerization, the monomers were purified by distillation over sodium and degassed by three freeze-pump-thaw cycles. All polymerization reactions were performed under a dry argon atmosphere in a glove box with rigorous care to avoid moisture and air. Toluene was dried by heating under reflux for 6 h over sodium and benzophenone. Toluene was freshly distilled prior to use. Triisopropylphosphine and [($\eta^3$-allyl)Pd(Cl)]$_2$ were purchased from Sigma-Aldrich and used as-received. The catalyst, (allyl)palladium (triisopropylphosphine)chloride (($\eta^3$-allyl)Pd($^i$Pr$_3$P)Cl), was prepared according to a previously published report (Lipian, J. et al., Macromolecules 35 (2002) 8969-8977). Lithium tetrakis(pentafluorophenyl)-borate.(2.5Et$_2$O) (Li[FABA]) was purchased from Boulder Scientific Co. and used as-received. α,α,α-trifluorotoluene (TFT), anhydrous, ≥99% and tetrahydrofuran (THF) were purchased from Sigma-Aldrich and used as-received.

Synthesis of tetrablock copolymer [Poly(BuNB-b-BPNB-b-BuNB-b-BPNB)]: The tetrablock copolymer, consisting of alternating butyl norbornene (BuNB) and bromopropyl norbornene (BPNB) blocks (two blocks each), was synthesized by the sequential addition of the monomers (one after the other) at room temperature in an inert atmosphere glove box. The monomers were divided into four round-bottomed flasks (two for each monomer) and toluene was added to make a 5 wt % solution in each flask. The catalyst solution was prepared separately in a vial by dissolving ($\eta^3$-allyl)Pd($^i$Pr$_3$P)Cl (12 mg, 0.03 mmol) and Li[FABA] (28 mg, 0.03 mmol) in a solution composed of 0.5 g toluene and 0.5 g TFT. The catalyst solution was stirred for 20 min. BuNB (0.45 g, 3.00 mmol) and toluene (10 mL) were added to a 100 mL round-bottomed flask fitted with a magnetic stir bar. The catalyst solution was injected into the flask under vigorous stirring. After 20 min the BuNB polymerization was complete. A small aliquot was removed and quenched with $CH_3CN$ for gel permeation chromatography (GPC) analysis. Then, a mixture of BPNB (0.64 g, 3.00 mmol) and toluene (12 mL) was added to the reaction flask, still containing the catalyst, and stirred for 3 h to incorporate the BPNB block onto the BuNB polymer. After the 3 h reaction time (complete consumption of BPNB), a small aliquot was taken out and quenched with $CH_3CN$ for GPC analysis. Next, BuNB (0.45 g, 3.00 mmol) and toluene (10 mL) were added to the reaction flask and allowed to react for 20 min for incorporation of the third block. A small aliquot was again taken out and quenched with $CH_3CN$ for GPC analysis. Finally, a mixture of BPNB (0.64 g, 3.00 mmol) and toluene (12 mL) was added to the flask and stirred for 3 h to incorporate the fourth block onto the polymer. After completion, the reaction mixture was quenched and the polymer precipitated by addition of methanol. The resulting polymer was dissolved in THF and stirred over activated charcoal. The solution was passed through an alumina filter to remove any palladium residue. The resulting product was precipitated from THF by addition of methanol. The polymer product was dried under vacuum at 60° C. Tetrablock copolymers with different hydrophobic and hydrophilic chain lengths were synthesized by changing the monomer to catalyst feed ratio.

Nuclear magnetic resonance (NMR) spectra and GPC: The polymer samples were analyzed by $^1$H NMR using Bruker Avance 400 MHz NMR instrument using $CDCl_3$ was the solvent. The number average molecular weight ($M_n$) and polydispersity index ($M_w/M_n$) of the polymer samples were determined by GPC (Shimadzu) equipped with an LC-20 AD HPLC pump and a refractive index detector (RID-20 A, 120 V). Measurements were performed in THF with the eluent flow rate of 1.0 mL/min at 30° C. A polystyrene standard was used.

Membrane casting and ion-exchange: The tetrablock copolymer (0.20 g) was dissolved in 5 mL chloroform and the resulting solution was filtered through a 0.2 μm poly(tetrafluoroethylene) (PTFE) membrane syringe filter into a 4 cm diameter aluminum dish. The solvent was evaporated at room temperature in a nitrogen gas stream. The membrane was dried overnight under vacuum. The membranes were colorless, flexible and free-standing with a thickness of ca. 50 μm. Next, the bromobutyl headgroup was quaternized by immersion of the membrane in 45 wt % aqueous trimethylamine solution for 48 h at room temperature. The quaternized membrane with bromide counter-ion was removed from solution and washed thoroughly with DI water. The membranes were then soaked in 1 M NaOH solution under nitrogen for 24 h to exchange the bromide ions for hydroxide ions. The membranes were stored in DI water after being washed with DI water three times.

Morphological characterization: Small angle X-ray scattering (SAXS) was used to analyze the morphology of AEMs. Hydrated membranes in bromide form were tested in air using either a Malvern Panalytical Empyrean XRD (Netherlands) instrument with a Pixel 3D detector or the NSLS-II beamline at the Center for Functional Nanomaterials (Brookhaven National Laboratory, Upton, N.Y. The wave vector (q) was calculated using Equation 1, where 20 is the scattering angle.

$$q = \frac{4\pi}{l\sin 2\theta} \tag{1}$$

The characteristic separation length, or inter-domain spacing (d) (i.e. the Bragg spacing) was calculated using Equation 2.

$$d = \frac{2\pi}{q} \tag{2}$$

Transmission electron microscopy (TEM) was also used to analyze the morphology of membranes. TEM was performed with a JEOL JEM-1400 Transmission Electron Microscope. Dry membranes with a bromide counter ion were stained by fuming with osmium tetroxide at room temperature prior to TEM examination. The stained membranes were embedded within an epoxy resin, sectioned into ca. 50 nm thick samples with a Leica UC6rt Ultramicrotome, and placed on a copper grid for observation.

Hydroxide conductivity and alkaline stability: The ionic resistance of the membranes was measured using a four-point, in-plane probe and electrochemical impedance spectrometry (1 Hz to 1 MHz) with a PAR 2273 potentiostat. All samples were tested in HPLC-grade water under a nitrogen purge to minimize the detrimental effects of $CO_2$. The samples were allowed to equilibrate for 30 min prior to each measurement. The in-plane ionic conductivity was calculated using Equation 3.

$$\sigma = \frac{L}{WTR} \tag{3}$$

In Eq. 3, σ is the ionic conductivity in S/cm, L is the length between sensing electrodes in cm, W and T are the width and thickness of the membrane in cm, respectively, and R is the resistance measured in Ohms. Long-term (up to 1200 h) alkaline stability testing was performed by storing the membrane in 1 M NaOH solution at 80° C. in a teflon-lined Parr reactor. The ionic conductivity was measured periodically by taking the membranes out of solution and thoroughly washing them with DI water before measuring the conductivity. After each measurement, the membranes were placed back into the reactors with a freshly prepared NaOH solution.

Ion exchange capacity (IEC), water uptake (WU), hydration number (λ), number of freezable water ($N_{free}$) and bound, nonfreezable water ($N_{bound}$) molecules: The ion exchange capacity was calculated using NMR data which is discussed in detail in the next section. In addition, the membrane IEC was also measured by titration (Wang, C. et al., J. Membr. Sci. 556 (2018) 118-125). The membrane in Bf form was first immersed in 0.1 M NaCl solution for 24 h to exchange the bromide ions for chloride ions. Next, the membrane in chloride form was thoroughly washed with DI water and dried under vacuum for 24 h to obtain the dry weight. The dried membrane was immersed in a fixed volume of 0.5 M aqueous $NaNO_3$ solution for 24 h. The Cl ions released from the membrane were titrated with 0.05 M $AgNO_3$ using $K_2CrO_4$ (10 wt. %) as the indicator. The IEC was calculated using Equation 4.

$$IEC = \frac{c_{AgNO_3} \times V_{AgNO_3}}{M_d} \tag{4}$$

In Eq. 4, $V_{AgNO3}$ (mL) is the volume of $AgNO_3$ solution, $C_{AgNO3}$ (0.05 mol·L$^{-1}$) is the concentration of $AgNO_3$ solution, and $M_d$ (g) is the weight of the dried membrane sample.

The water uptake of the membranes was calculated using Equation 5.

$$WU\ (\%) = \frac{M_w - M_d}{M_d} \times 100 \tag{5}$$

In Eq. 5, $M_d$ is the dry mass of the membrane and $M_w$ is the wet mass of the membrane after removing excess surface water. The membranes were in $OH^-$ form and measured at room temperature. The hydration number (λ), number of water molecules per ionic group, was calculated using Equation 6.

$$\lambda = \frac{1000 \times WU\ \%}{IEC \times 18} \tag{6}$$

The number of freezable water ($N_{free}$) and bound water (or non-freezable water) ($N_{bound}$) were determined by differential scanning calorimetry (DSC). DSC measurements were carried out on a Discovery DSC with autosampler (TA Instruments). The membrane samples were fully hydrated by soaking in deionized water for one week. After the water on the membrane surface was dabbed off, a 5 to 10 mg sample was quickly sealed in an aluminum pan. The sample was cooled to −50° C. and then heated to 30° C. at a rate of 5° C./min under $N_2$ (20 mL/min). The quantity of freezable and non-freezable water was determined by Equations 7 to 9 (Lue, S. J. et al., J. Macromol. Sci. Part B: Phys. 48 (2009) 114-127; Mecheri, B. et al., J. Phys. Chem. C 116 (2012) 20820-20829; Moster, A. L. et al, J. Appl. Polym. Sci. 113 (2009) 243-250).

$$N_{free} = \frac{M_{free}}{M_{tot}} \times \lambda \tag{7}$$

$M_{free}$ is the mass of freezable water and $M_{tot}$ is the total mass of water absorbed in the membrane. The weight fraction of freezable water was calculated using Equation 8.

$$\frac{M_{free}}{M_{tot}} = \frac{H_f / H_{ice}}{(M_W - M_d)/M_w} \tag{8}$$

$H_f$ is the enthalpy obtained by the integration of the DSC freezing peak and $H_{ice}$ is enthalpy of fusion for water, corrected for the subzero freezing point according to Equation 9.

$$H_{ice} = H_{ice}^{\circ} - \Delta C_p \Delta T_f \tag{9}$$

$\Delta C_p$ is the difference between the specific heat capacity of liquid water and ice. $\Delta T_f$ is the freezing point depression.

The thermal stability of the dried membranes in bromide ion form was studied using thermogravimetric analysis (TGA) on a TA Instruments Q50 analyzer. The temperature was ramped at 10° C./min up to 800° C. in a nitrogen atmosphere.

Membrane electrode assembly (MEA) fabrication and single-cell testing: One of the best performing membrane in this study (PNB-$X_{62}$-$Y_{38}$) was selected for testing in an alkaline exchange membrane fuel cell (AEMFC). The AEM anode and cathode were fabricated via the slurry method and were identical. A lower molecular weight (20.5 kg/mol) version of the poly(BuNB-b-BPNB-b-BuNB-b-BPNB) tetrablock copolymer anion-exchange ionomer powder was first synthesized using the same method as the membranes discussed in this disclosure. Low molecular weight ionomer material was previously found to be advantageous for use as a polymeric binder in fuel cell and electrolyzer electrode fabrication (Ahlfield, J. et al., J. Electrochem. Soc. 164 (2017) F1648-F1653). The dry ionomer powder and 50% platinum on Vulcan XC-72 (carbon) catalyst was ground together with a mortar and pestle in 1.5 mL of isopropyl alcohol (IPA) for 10 minutes to produce finer particles. An additional 2 mL of IPA was added and the mixture and ground for another 5 minutes to achieve the proper slurry viscosity for spraying. The catalyst and ionomer slurry was further sonicated in a water bath at room temperature for 30 min to ensure even dispersion. The homogenized catalyst and ionomer slurry was sprayed onto 1% water-proofed Toray TGPH-060 carbon paper and dried for 24 h at room temperature. The platinum loading was approximately 2.1 mg/cm$^2$ and an ionomer/carbon ratio of 40% was used. The high metal loading was chosen intentionally to minimize any kinetic losses caused by the non-optimized catalyst.

Prior to MEA testing, the electrodes and membranes were soaked in 1 M NaOH for 1 h (replacing the solution every 20 mins) in a nitrogen atmosphere to convert the membrane and ionomer to hydroxide form. The MEA was placed into Fuel Cell Technologies hardware between single-pass serpentine graphite plates with 6 mil PTFE gaskets. The MEAs were tested in a Scribner 850e Fuel Cell Test Station at a cell temperature of 60° C. Humidified $H_2$ and $O_2$ gas feeds were supplied at the anode and cathode, respectively, at 0.5 L/min. The dew points of the anode and cathode streams were adjusted throughout the course of testing in order to optimize the water balance within the AEMFC.

Synthesis and characterization of tetrablock copolymer: The monomers (BuNB and BPNB) were synthesized by a previously described procedure (Martínez-Arranz, S. et al., Macromolecules 43 (2010) 7482-7487. The catalyst, ($\eta^3$-allyl)Pd($^i$Pr$_3$P)Cl was prepared in high yield and purity following a previous report (Lipian, J. et al., Macromolecules 35 (2002) 8969-8977). The reactivity of the BuNB monomer ($[M]_0/[Pd]$=100:1) was higher than that of the BPNB monomer. The reaction time for each block varied (20 min for BuNB and 3 h for BPNB) in order to achieve complete conversion for each block. A one-to-one mole ratio of Li[FABA] to the catalyst was sufficient to generate the cationic Pd complex for the polymer initiation. The absence of olefinic protons in the $^1$H NMR spectra of the polymer produced shows that the polymerization reaction proceeded through the vinyl addition pathway, eliminating the occurrence of ring-opening metathesis polymerization (ROMP), FIG. 1A. The $^1$H NMR spectrum of the other materials is shown in FIGS. 2-6. The polymerization time for the individual monomers for the different monomer-to-initiator feed ratios ([M]o/[Pd]) was optimized in order to avoid branching side-reactions (Kim, D. G. et al., Chem. Mater. 27 (2015) 6791-6801). Incomplete conversion of the polymer into monomer would also create problems in synthesizing the block copolymer via the sequential addition of different monomers (Kim, D. G. et al., ACS Macro Lett. 4 (2015) 327-330).

Scheme 1. Synthesis of tetrablock copolymer.

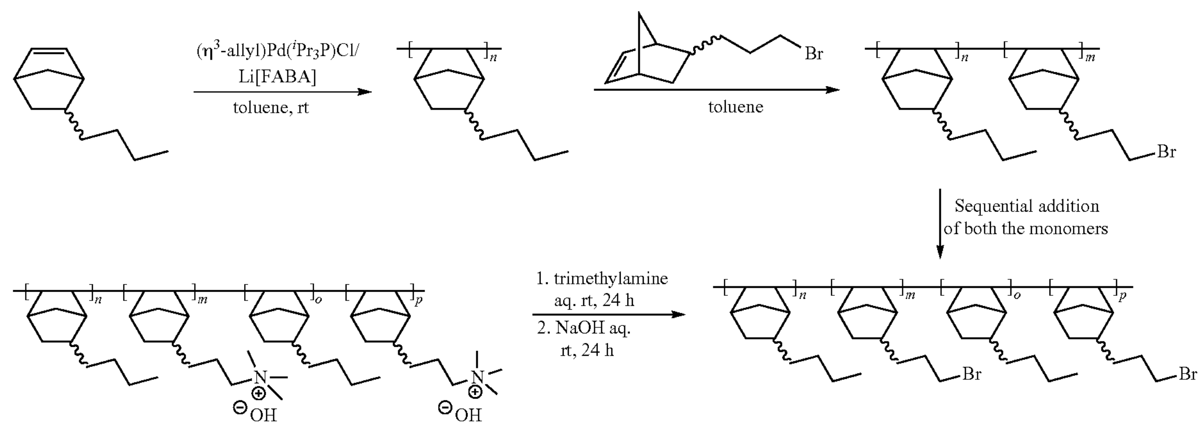

Figure 7:
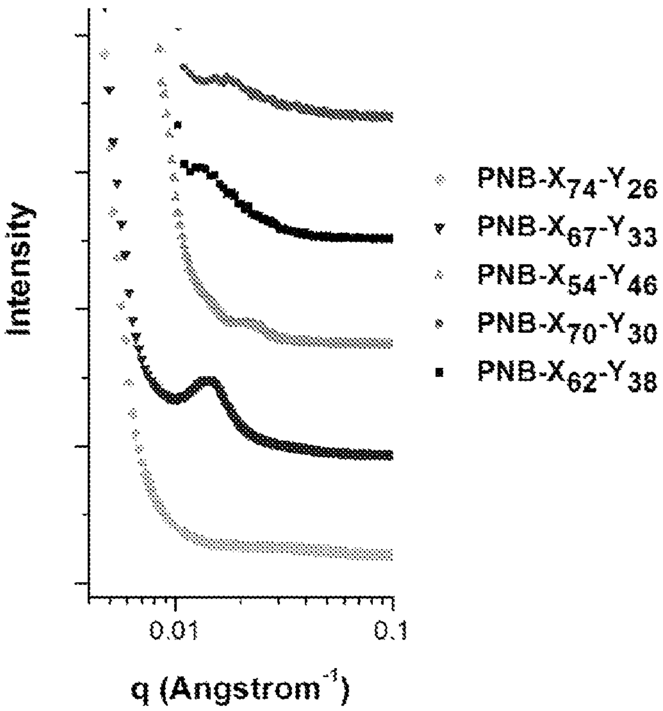
FIG. 7. Representative GPC trace of PNB-$X_{67}$-$Y_{33}$ showing the sequential growth of each block during the formation of tetrablock copolymer.

A series of tetrablock copolymers (PNB-$X_a$-$Y_b$; PNB is polynorbornene, a is the mole percent of combined hydrophobic blocks, X, and b is the mole percent of combined hydrophilic blocks, Y) were synthesized by varying the length of the hydrophobic block (BuNB) and the hydrophilic block (BPNB). The block sizes were changed by adjusting the monomer-to-initiator feed ratio ([M]o/[Pd]) in toluene during polymerization, Scheme 1. A representative GPC trace of PNB-$X_{67}$-$Y_{33}$ is shown in FIG. 7 to demonstrate the sequential growth of each block in the formation of the tetrablock copolymer. The number average molecular weight ($M_n$) of the first block (BuNB) was determined by GPC analysis. $M_n$ was found to be 12.32 kDa, FIG. 7. The second monomer was then added to the reaction mixture and allowed to react for 3 h. The $M_n$ of the combined first and second block was 19.80 kDa, making the $M_n$ of the second block 7.48 kDa. Similarly, the $M_n$ of the third and fourth blocks were found to be 9.25 kDa and 9.81 kDa, respectively. The properties of the various membranes are given in Table 1. The $M_n$ of the synthesized polymers ranged from 38 to 114.9 kDa with polydispersity of 1.28 to 1.55. The IEC value was determined by $^1H$ NMR spectroscopy and found to be 1.55 to 2.60 meq/g, as discussed later. The methyl protons of the hydrophilic block resonate at 0.89 ppm. The methylene protons adjacent to the bromine atom in the hydrophilic block appear at 3.41 ppm. The X and Y values within poly(BuNB-b-BPNB-b-BuNB-b-BPNB) was analyzed via NMR by comparing the integration ratio of $H_a$ and $H_b$, FIG. 1A. The mol % and wt % of the combined hydrophilic and hydrophobic blocks in the tetrablock copolymer were calculated via the NMR spectra.

TABLE 1

Properties of poly(butyl norbornene-b-quaternary ammonium propyl norbornene-b-butyl norbornene-b-quaternary ammonium propyl norbornene) membranes in hydroxide form.

| Block copolymer | Molecular Weight[a] (kg/mol) | $M_w/M_n$ | IEC (Ion Exchange Capacity) (meq./g)[b] | $OH^-$ Conductivity (mS/cm)[c] 25° C. | 80° C. | σ/IEC[d] | Water Uptake[e] (%) | Hydration number λ | $N_{free}$ | $N_{bound}$ | Inter-domain spacing, d (nm)[f] |
|---|---|---|---|---|---|---|---|---|---|---|---|
| PNB-$X_{74}$-$Y_{26}$ | 39.58 | 1.42 | 1.55 | 23.4 | 61.3 | 39.5 | 26.2 | 9.41 | 0.91 | 8.50 | ND |
| PNB-$X_{70}$-$Y_{30}$ | 37.97 | 1.29 | 1.77 | 27.0 | 67.4 | 38.1 | 59.6 | 18.71 | 5.42 | 13.29 | 37.2 |
| PNB-$X_{67}$-$Y_{33}$ | 38.86 | 1.28 | 1.92 | 32.2 | 71.8 | 37.4 | 68.8 | 19.91 | 7.81 | 12.10 | 44.2 |
| PNB-$X_{62}$-$Y_{38}$ | 50.77 | 1.54 | 2.21 | 50.9 | 101.9 | 46.1 | 71.0 | 17.85 | 7.61 | 10.24 | 49.9 |
| PNB-$X_{54}$-$Y_{46}$ | 45.33 | 1.55 | 2.60 | 44.9 | 80.0 | 30.8 | 133.6 | 28.55 | 10.65 | 17.90 | 86.4 |
| PNB-$X_{68}$-$Y_{32}$ | 114.9 | 1.42 | 1.88 | 62.0 | 122.7 | 65.2 | 63.0 | 18.62 | 6.74 | 11.88 | ND |

[a]Measured in bromopropyl form by gel permeation chromatography at RT in THF relative to polystyrene standards.

[b]IEC (Ion Exchange Capacity) was calculated via $^1H$ NMR results in bromopropyl form.

[c]$OH^-$ conductivity was measured by four-probe conductivity cell.

[d]Ionic conductivity at 80° C./IEC.

[e]Water uptake was measured at room temperature.

[f]Inter-domain spacing measured using small angle X-ray scattering (SAXS) in bromide form;

ND = not determined. PNB = polynorbornene; X = hydrophobic block; Y = hydrophilic block; numbers in the subscript indicate the molar ratio of each block.

Figure 8:
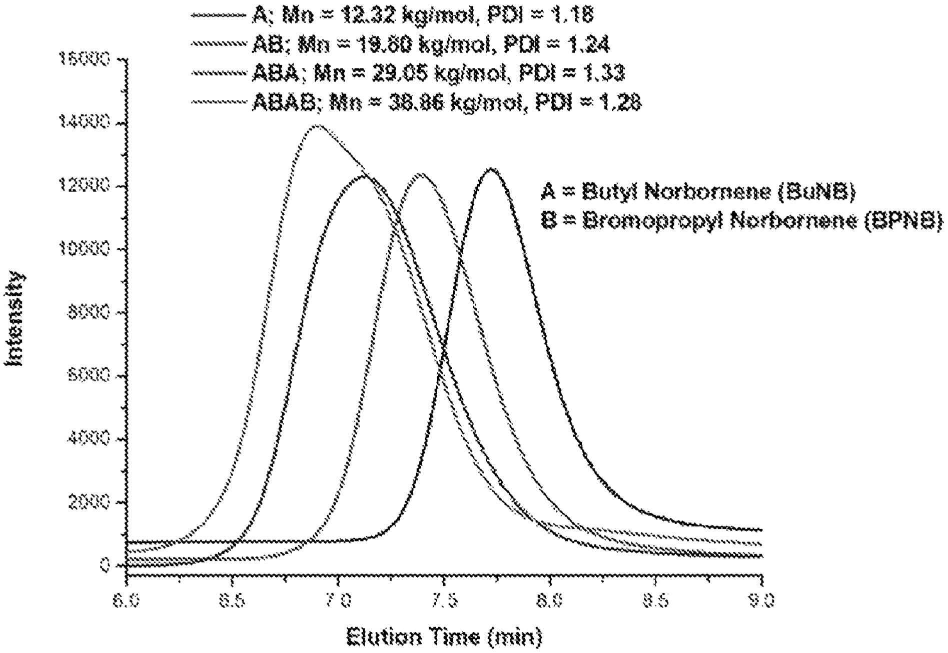
FIG. 8. SAXS spectra of tetrablock copolymer poly (BuNB-b-BPNB-b-BuNB-b-BPNB) membranes in bromide form.

Morphological characterization: SAXS and/or TEM were used to investigate the microstructure of the polynorbornene membranes synthesized here. The inter-domain spacing (d), or the average separation length between inhomogeneities in the membranes, was determined from the Bragg spacing of the primary scattering peak in the SAXS spectra, as shown in FIG. 8. The inter-domain spacing values are listed in Table 1. The domain size range was 37.2 to 86.4 nm, which directly correlated with water uptake. More specifically, it can be seen that the number of unbound waters tracks with the domain size. Larger domains provide regions where free (unbound) water can populate. For example, PNB-$X_{54}$-$Y_{46}$ showed a very high water uptake, 133.6%, and a d-spacing, 86.4 nm. By comparison, these values are about twice as large as the ones for PNB-$X_{67}$-$Y_{33}$, which had a water uptake of 68.8% and a d-spacing of 44.2 nm.

Figure 1B:
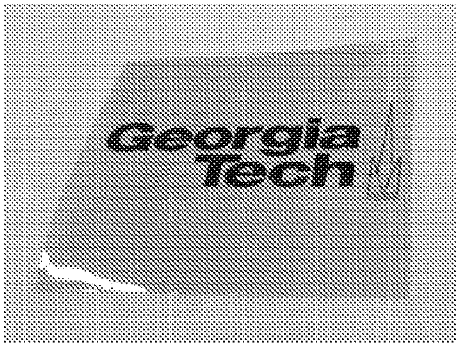
FIG. 1B. AEM films of PNB-$X_{70}$-$Y_{30}$-PFTE and PNB-$X_{70}$-$Y_{30}$-PO.
Figure 1B:
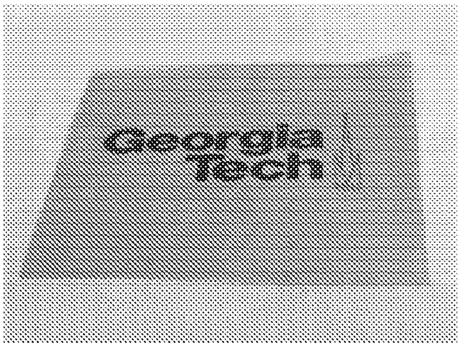
Figure 2:
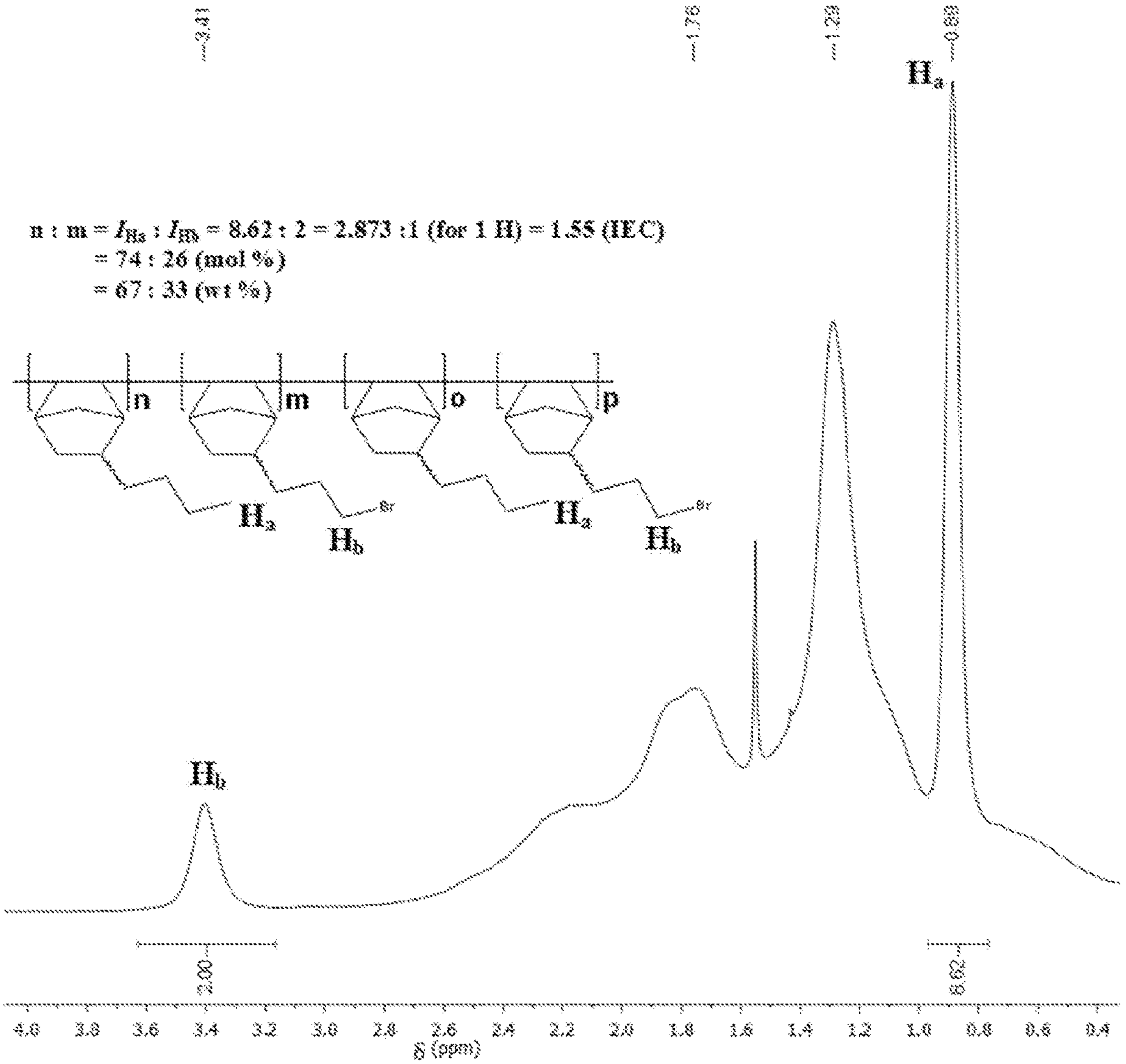
FIG. 2. $^1$H NMR spectrum of tetrablock PNB-$X_{74}$-$Y_{26}$ in $CDCl_3$.
Figure 3:
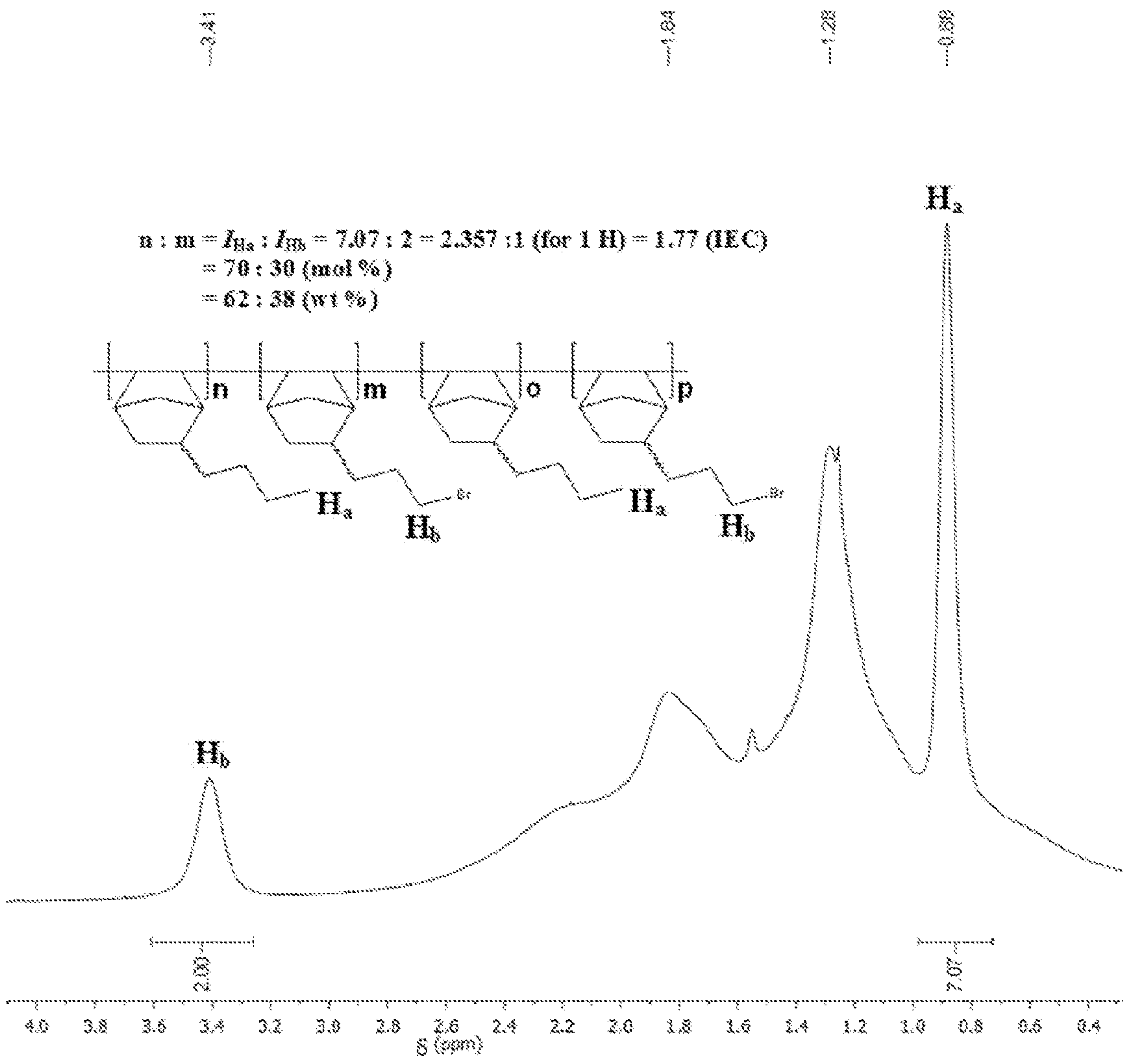
FIG. 3. $^1$H NMR spectrum of tetrablock PNB-$X_{70}$-$Y_{30}$ in $CDCl_3$.
Figure 4:
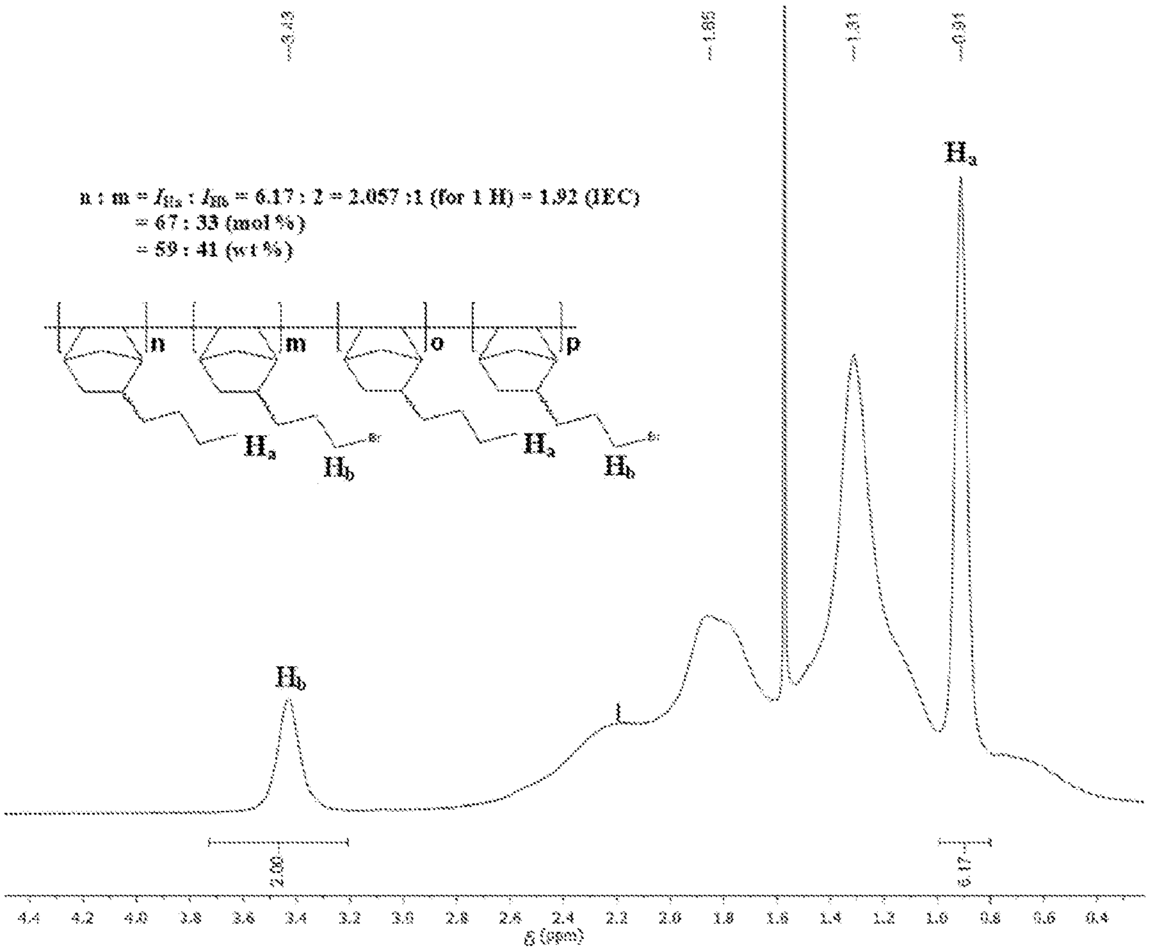
FIG. 4. $^1$H NMR spectrum of tetrablock PNB-$X_{67}$-$Y_{33}$ in $CDCl_3$.
Figure 5:
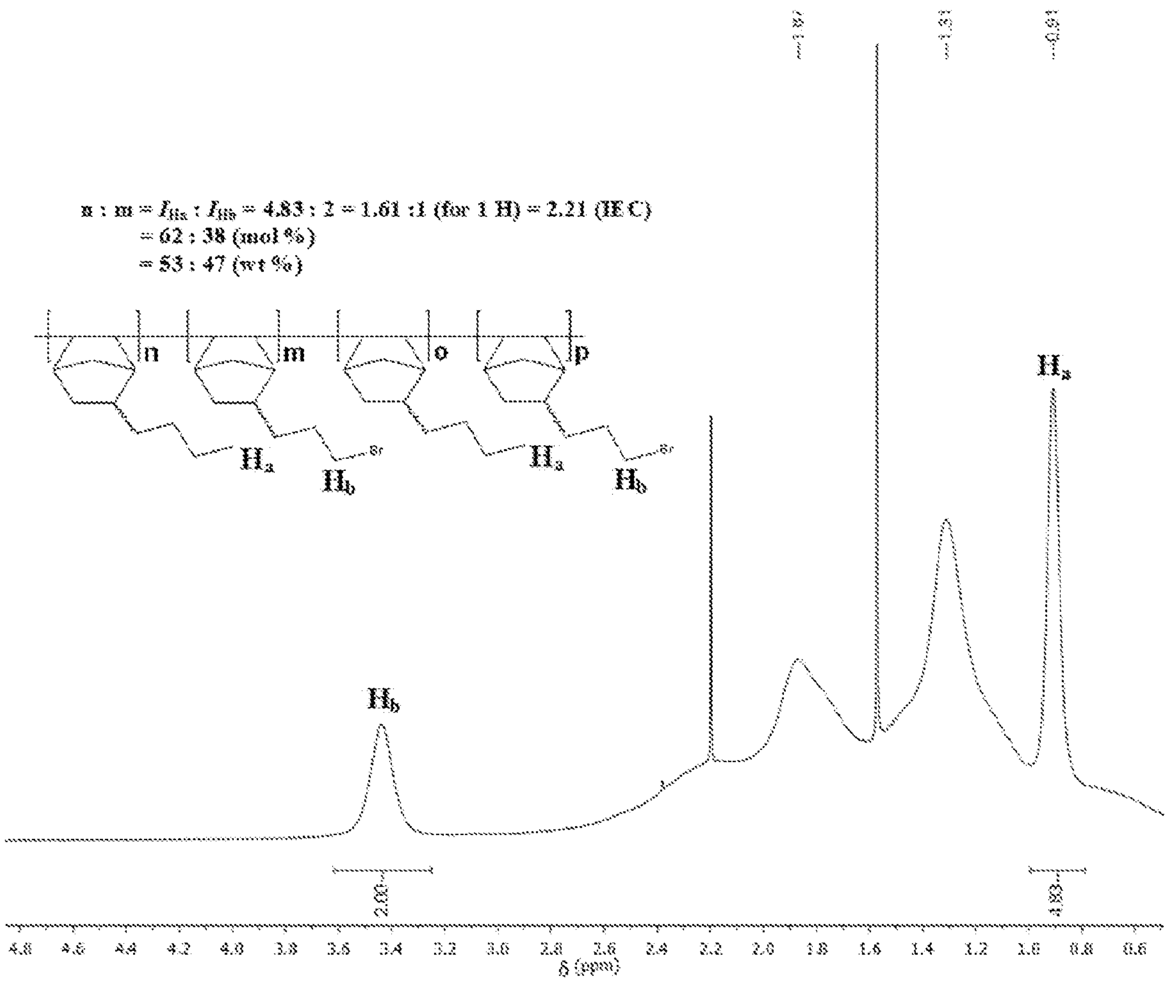
FIG. 5. $^1$H NMR spectrum of tetrablock PNB-$X_{62}$-$Y_{38}$ in $CDCl_3$.
Figure 6:
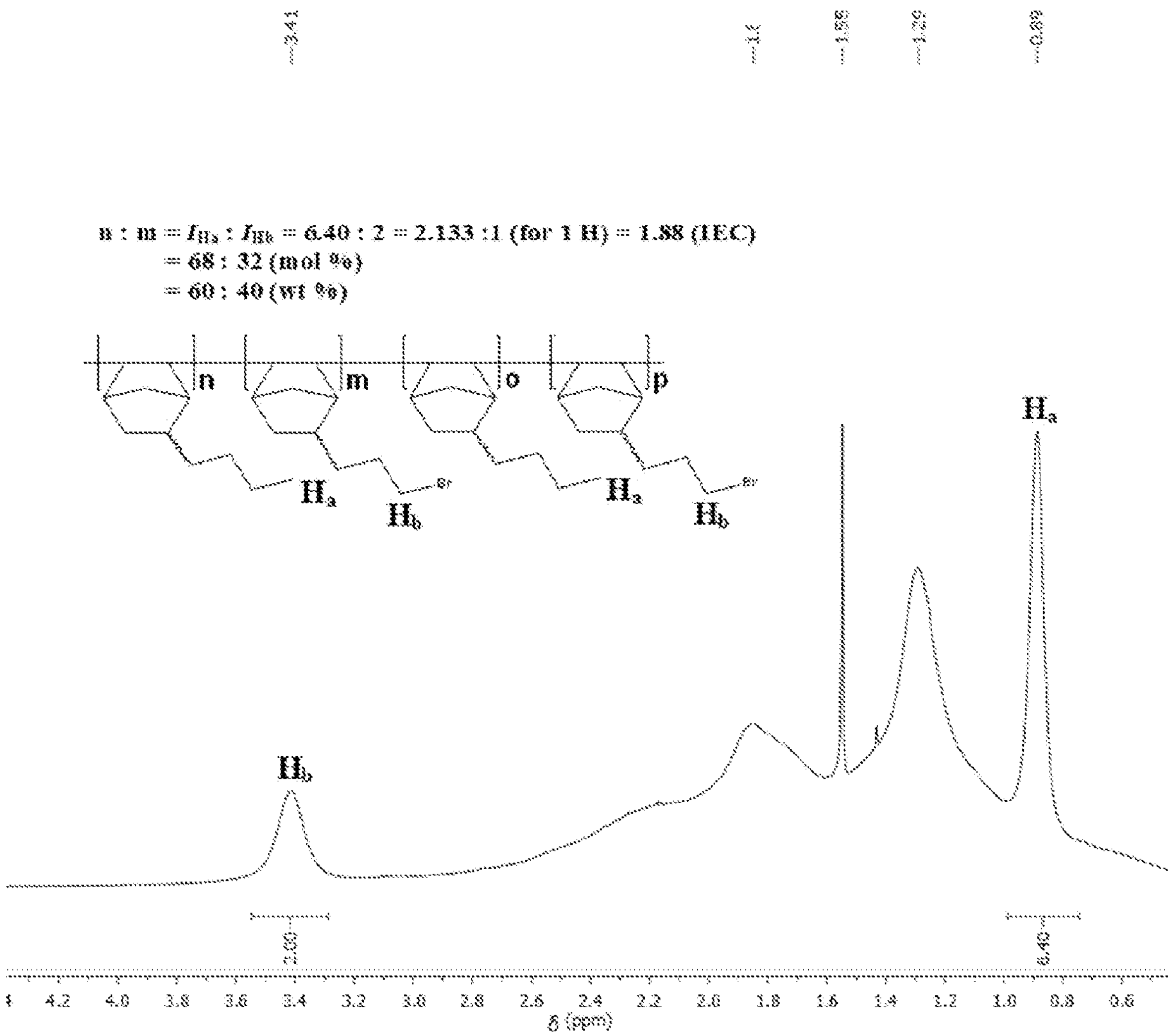
FIG. 6. $^1$H NMR spectrum of tetrablock PNB-$X_{68}$-$Y_{32}$ in $CDCl_3$.
Figure 9:
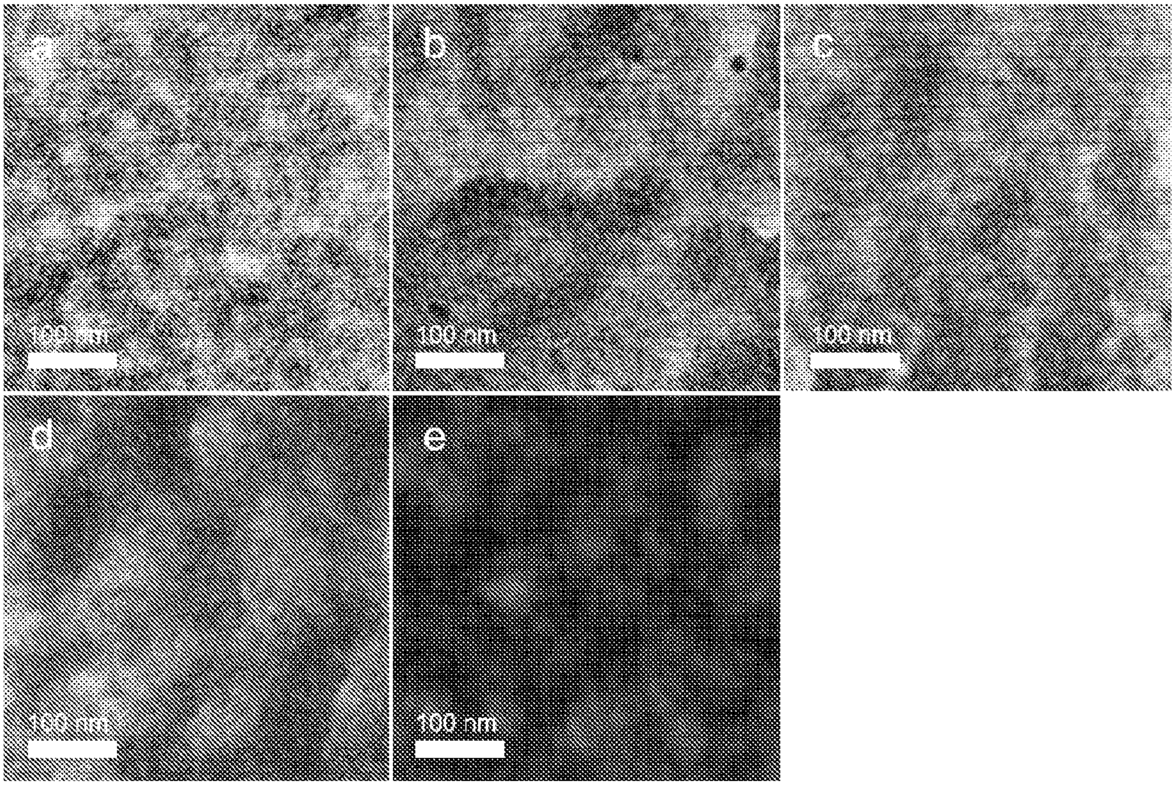
FIG. 9. TEM micrographs of the PNB-$X_{74}$-$Y_{26}$ (panel a), PNB-$X_{70}$-$Y_{30}$ (panel b), PNB-$X_{67}$—$Y_{33}$ (panel c), PNB-$X_{62}$-$Y_{38}$ (panel d), PNB-$X_{54}$-$Y_{46}$ (panel e).

PNB-$X_{74}$-$Y_{26}$, was examined using transmission electron microscopy (TEM) because the X-ray scattering was not as definitive as with other samples. TEM analysis was performed in bromide form rather than in hydroxide form to avoid inadvertent degradation of the membranes due to concentrated hydroxide in dry membranes. It was observed that the size of the phases increased with the hydrophilicity of the membranes. This is consistent with the increasing inter-domain spacing observed by SAXS. The ion channels also appear to lose their definition and well-defined structure as the channel size became larger. FIG. 9 shows TEM micrographs for five of the membranes. The dark regions correspond to the hydrophilic domains with bromide counter ions and the bright regions correspond to hydrophobic domains. Membranes with higher hydrophilicity also contain more dark regions in the TEM micrographs. It should be noted that trends observed using TEM in the dry state would likely be more pronounced if the membranes could be observed swollen with water as in the SAXS measurements. Table 2 shows a comparison of the properties of free-standing AEM films and ones which have been reinforced with perfluorinated tetrafluoroethylene (PTFE) or a polyolefin (PO). FIG. 1B shows an image of the two membranes on a lettered background. The membranes are clear and colorless

TABLE 2

| Membrane | IEC | OH− Conductivity (mS/cm) 25° C. | 80° C. | σ/IEC (80° C.) | Water uptake (%) | Hydration number λ | $N_{free}$ | $N_{bound}$ | Channel size (nm) | Tensile strength (MPa) | Elongation at break (%) | Young's modulus (GPa) |
|---|---|---|---|---|---|---|---|---|---|---|---|---|
| PNB-$X_{67}$-$Y_{33}$ | 1.92 | 32.2 | 71.8 | 37.40 | 92.4 | 26.7 | 8.8 | 17.9 | 9 ± 1 | — | — | — |
| PNB-$X_{54}$-$Y_{46}$ | 2.60 | 44.9 | 80 | 30.77 | 133.6 | 28.5 | 10.6 | 17.9 | 14 ± 1 | — | — | — |
| PNB-$X_{70}$-$Y_{30}$ | 1.77 | 23.9 | 59.9 | 33.84 | 65.6 | 20.6 | 5.63 | 14.96 | TBD | — | — | — |
| PNB-$X_{70}$-$Y_{30}$-PTFE | 1.77 | 12.2 | 39 | 22.03 | 25.4 | 7.97 | 1.4 | 6.57 | TBD | 14.2 | 47.25 | 0.0089 |
| PNB-$X_{70}$-$Y_{30}$-PO | 1.77 | 13.4 | 41.9 | 23.67 | 26.2 | 8.22 | 1.17 | 7.06 | TBD | 43.7 | 152.8 | 0.0177 |

Ion exchange capacity (IEC), hydroxide conductivity: The IEC is an important parameter in determining the membrane ionic conductivity and water uptake. The IEC was evaluated from $^1H$ NMR spectroscopy and found to be between 1.55 and 2.60 meq/g. Taking PNB-$X_{54}$-$Y_{46}$ as the representative sample, the IEC was calculated by comparing the integration ratio of the methylene protons adjacent to the bromine atom of the hydrophilic block at 3.41 ppm and methyl protons of the hydrophobic block at 0.89 ppm. From FIG. 1A, the integration ratio of $H_a$ to $H_b$ was 3.46:2 which is equal to 1.153:1 (for 1 proton). To further confirm the extent of the quaternization reaction, the IEC was measured by titration. The titration procedure involved converting the counter anion in the membrane to chloride, followed by titration of the amount of chloride present in the membrane, as described in the Experimental Section. An excellent correlation for IEC was found between the two methods, titration and NMR. For PNB-$X_{67}$-$Y_{33}$, the measured IECs by titration and NMR were found to be 1.90 meq/g and 1.92 meq/g, respectively.

Figure 10:
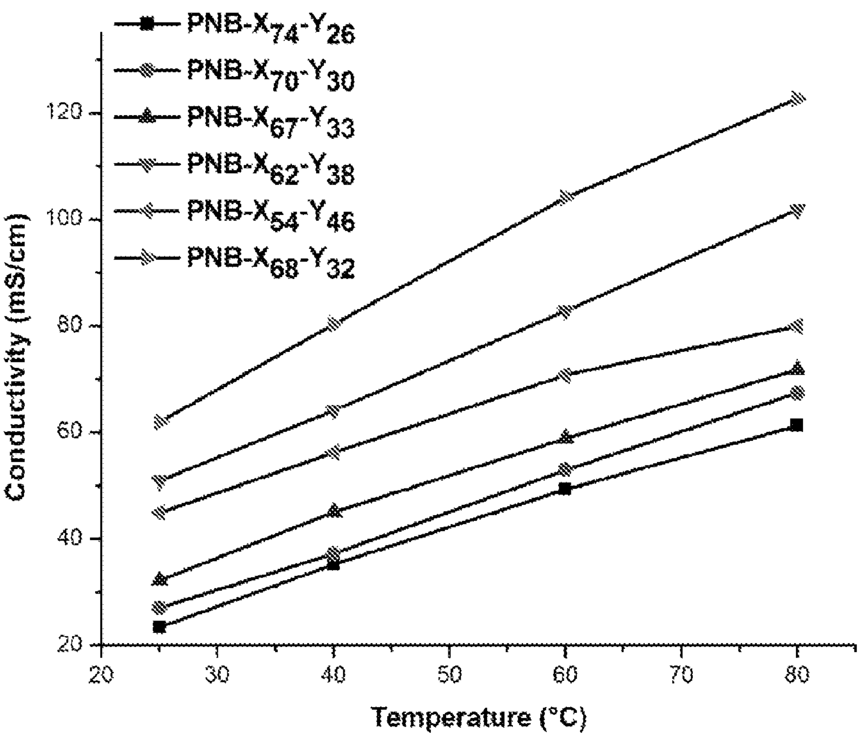
FIG. 10. Ionic conductivity of polynorbornene AEMs at different temperature.
Figure 11:
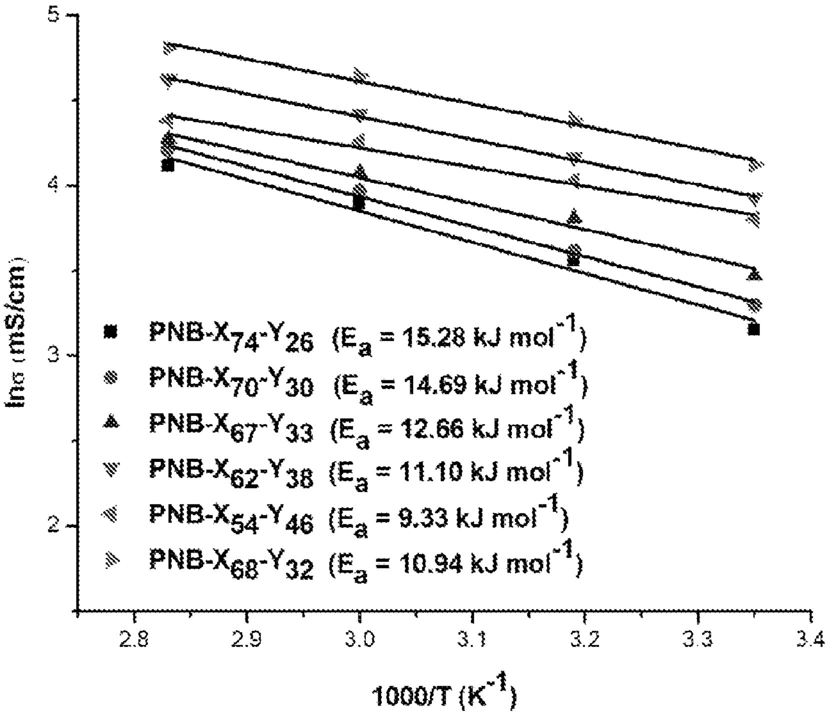
FIG. 11. Arrhenius plot of lnσ vs. inverse temperature for polynorbornene AEMs.

High hydroxide conductivity (a) is desired in membranes used in electrochemical devices (Wang, Y. J. et al., Chem. Soc. Rev. 42 (2013) 5768-5787). FIG. 10 shows that the hydroxide conductivity increased with temperature from 25° C. to 80° C. and followed an Arrhenius relationship. In the case of PNB-$X_{68}$-$Y_{32}$, the conductivity was 122.7 mS/cm at 80° C. Membrane (PNB-$X_{54}$-$Y_{46}$) had the highest IEC, 2.60 meq/g, but a modest conductivity, 80 mS/cm at 80° C., in comparison to PNB-$X_{68}$-$Y_{32}$ (IEC=1.88 meq/g). FIG. 11 shows the plot of Ina vs. 1000/T for all the membranes. The hydroxide transport activation energy ($E_a$) was calculated from the slope in FIG. 11 and was found to be 9.33 to 15.28 kJ $mol^{-1}$. These $E_a$ values are close to that of Nafion-117, 12.75 kJ $mol^{-1}$ (Lin, B. et al., Chem. Mater. 22 (2010) 6718-6725).

The σ/IEC ratio is a measure of the hydroxide mobility. By this metric, PNB-$X_{68}$-$Y_{32}$ had the highest hydroxide mobility, despite having a more modest IEC (Table 1). Conversely, the hydroxide mobility in PNB-$X_{54}$-$Y_{46}$ was the lowest among the membranes even though the IEC was the highest (Table 1). A higher IEC may be expected to have higher mobility because there would be a greater tendency for phase segregation. A possible explanation for the high anion mobility with PNB-$X_{68}$-$Y_{32}$ is its molecular weight. The higher molecular weight of PNB-$X_{68}$-$Y_{32}$, compared to the other samples, contributed to its lower water uptake and greater chain entanglement, compared to the other samples. The effect of molecular weight is particularly clear when comparing the PNB-$X_{68}$-$Y_{32}$ (last line of Table 1) to the third and fourth lines (–$Y_{33}$ and —$Y_{38}$, respectively). The number of blocks is the same and the IEC values are close (ca. 1.88 to 2.21). However, the a/IEC is almost double for PNB-$X_{68}$-$Y_{32}$ due to its longer block length which enables better ion channel formation. Further investigation of the effect of molecular weight is underway.

Water uptake (WU), hydration number (2), number of freezable water molecules ($N_{free}$) and bound, non freezable water molecules ($N_{bound}$): Water uptake is a key parameter in determining the conductivity and mechanical stability of the AEMs. An adequate amount of water is necessary for ion hydration and conduction. However, excess water in the form of free water can lead to swelling and poor performance of the membrane electrode assembly (MEA) due to membrane softening and channel flooding. Hence, an optimum amount of bound water in the membrane is required to form the ion solvent shell (Liu, L. et. al., J. Polym. Sci. Part A: Polym. Chem. 56 (2018) 1395-1403; Liu, L. et. al., J. Mater. Chem. A 4 (2016) 16233-16244; Liu, L. et. al., J. Mater. Chem. A 6 (2018) 9000-9008). As shown in Table 1, the water uptake of the membranes increased with increasing IEC, reaching up to 133.6%. The best performing membrane, PNB-$X_{68}$-$Y_{32}$ had 63% WU and conductivity of 122.7 mS/cm at 80° C. PNB-$X_{54}$-$Y_{46}$ had the highest IEC and consequently the highest WU of 133.6% but lower ionic conductivity (80 mS/cm at 80° C.) compared to PNB-$X_{68}$-$Y_{32}$. The hydration number (λ) is the number of water molecules per ionic head-groups. The high hydration number of PNB-$X_{54}$-$Y_{46}$ was the result of the presence of unproductive water and larger channel size. The inter-domain spacing was 86.4 nm, as measured by SAXS. The free water content increased with domain size, as shown in Table 1. More specifically, it can be seen that the number of unbound waters tracks with the domain size. This shows that the unproductive, free-water can populate ion channels when they are larger than the optimum size (Park, D. Y. et al., J. Phys. Chem. C 117 (2013) 15468-15477). Previously, it was shown that ion channels that are too small had low water uptake resulting in poor ion mobility and conductivity.

Differential scanning calorimetry was used to measure the number of freezable water molecules ($N_{free}$) and bound, non-freezable water molecules ($N_{bound}$) in the membrane. In the DSC thermogram, free water freezes just below 0° C. Using the hydration number, the number of free water $N_{free}$ can be obtained by subtracting the number of bound waters. The results of all the membranes are shown in Table 1. In the case of PNB-$X_{68}$-$Y_{32}$, the amount of $N_{free}$ and $N_{bound}$ in the membrane was 6.7 and 11.9, respectively. This was close to the optimum number of bound waters (9 to 10 per ionic pair), as previously reported. Consequently, this membrane also showed the highest conductivity, 122.7 mS/cm at 80° C. The presence of higher free (10.6) and bound (17.9) water for PNB-$X_{54}$-$Y_{46}$ resulted in a decrease in the conductivity, 80 mS/cm at 80° C., although the IEC (2.60 vs. 1.88) was higher than PNB-$X_{68}$-$Y_{32}$. This can be attributed to the formation of overly large ion conducting channels flooded with unproductive water. The lower free water content (0.9) for PNB-$X_{74}$—$Y_{26}$ was not sufficient to support effective ion transport. Hence, the conductivity was lower (61.3 mS/cm at 80° C.). In case of PNB-$X_{67}$-$Y_{33}$, even though the free water (7.8) was acceptable, the higher bound water (12.1) resulted in lower conductivity due to the larger number of waters of hydration. The lower free water (5.4) and higher bound water (13.3) for PNB-$X_{70}$-$Y_{30}$ was the reason for lower ionic conductivity in the membrane.

Figure 12:
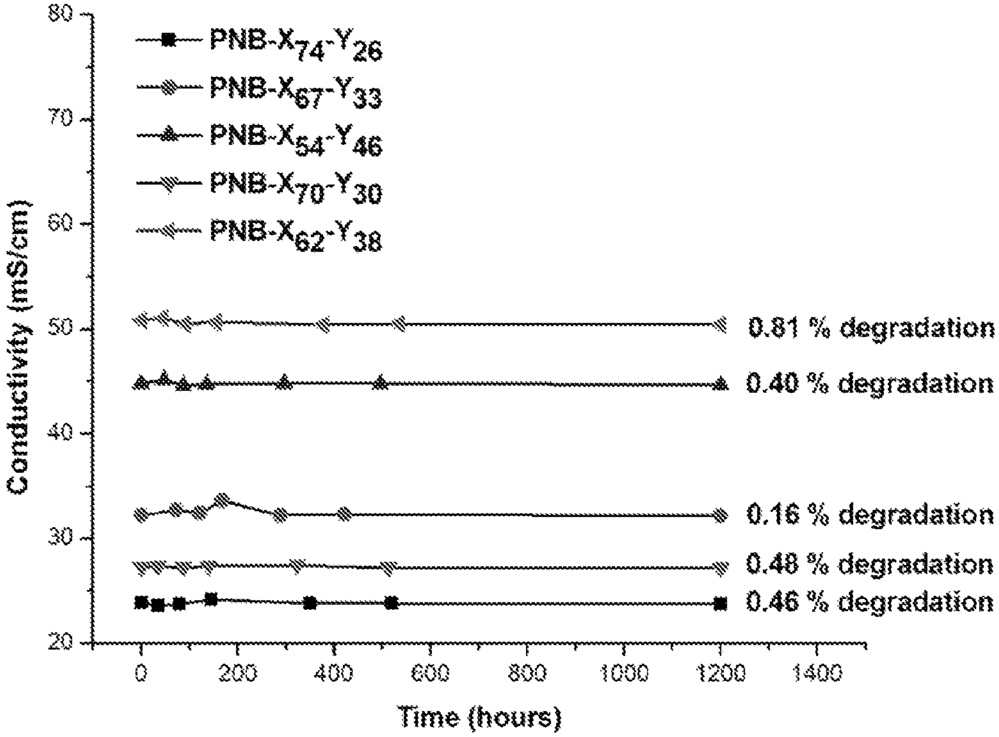
FIG. 12. The alkaline stability of polynorbornene AEMs in 1 M NaOH solution at 80° C.

Alkaline and thermal stability: Membrane durability is essential for long operational life in electrochemical devices. The alkaline stability assessment of the current AEMs was performed by soaking the membranes in 1 M NaOH solution at 80° C. The loss of ionic conductivity was measured vs. time for 1200 h. No detectable (<1%) loss was observed in the ionic conductivity over 1200 h, FIG. 12. Hence, it can be concluded that the non-hydrolysable polymer backbone with cations tethered via long side chains displays adequate alkaline stability compared to hydrolysable polymer backbones (e.g. polysulfone, polyketone, polyethers) and the benzyl attachment of cations to the polymer chains.

Figure 13:
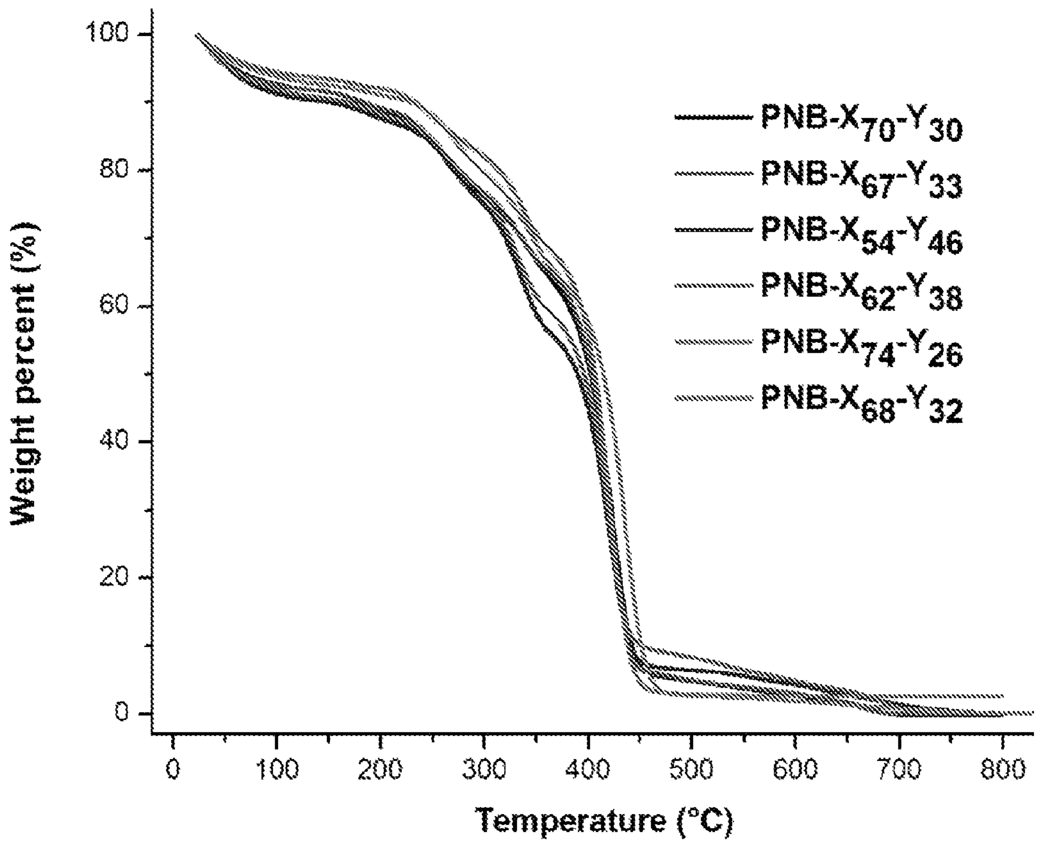
FIG. 13. TGA traces of the polynorbornene AEMs under nitrogen atmosphere.

The thermal stability of the membranes was investigated by thermogravimetric analysis (TGA), FIG. 13. Four degradation stages were observed. The first stage of decomposition, below 100° C., was due to water loss from the membrane. The second stage around 250° C. was due to the decomposition of the quaternary ammonium group. The third stage from 300° C. to 400° C. resulted from the degradation of the alkyl side chains in the polymer. The fourth stage, above 400° C., was due to the decomposition of polymer backbone (Price, S. C. et al., Polym. Chem. 8 (2017) 5708-5717). These results suggest that the membranes were sufficiently stable at the operating conditions for low temperature AEM fuel cells or electrolyzers, which typically operate below 80° C.

Fuel cell testing: PNB-$X_{62}$-$Y_{38}$ was selected for single-cell alkaline exchange membrane fuel cell testing because of its high ionic conductivity and excellent alkaline stability. The free-standing membrane was also mechanically robust and withstood compression in the fuel cell hardware without damage.

The fuel cell was operated at 60° C. to be comparable to many other AEMFCs found in literature. The MEA underwent a break-in startup procedure, where the cell was discharged at 0.5 V for one hour followed by an additional hour at 0.2 V. The anode and cathode dew point were set to 50° C. (69.51% RH) to avoid flooding of the catalyst layer. The open circuit voltage (OCV) was found to be 1.028 V after break-in.

Figure 14:
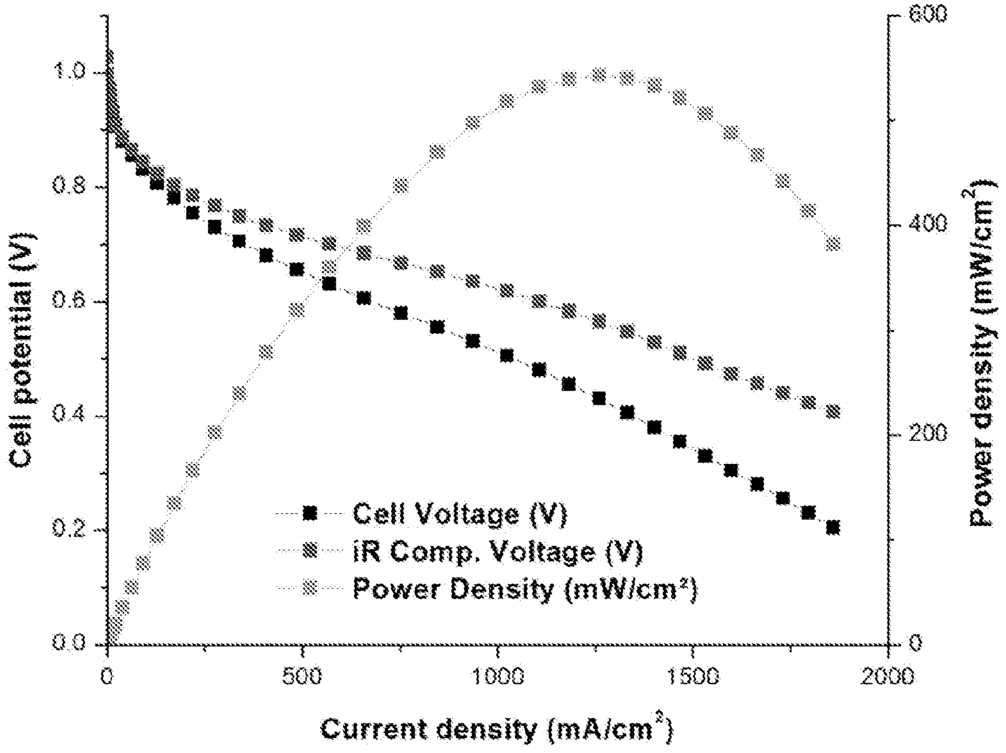
FIG. 14. Polarization data for PNB-$X_{62}$-$Y_{38}$ AEMFC (2.1 mg $cm^{-2}$ Pt, 40% ionomer to carbon ratio) with and without iR correction. Cell temperature was 60° C. with anode and cathode dewpoints both set at 46° C. Flow rates of humidified $H_2$ and $O_2$ were both 0.5 L/min.

After the initial conditioning period, water balance within the cell was optimized by adjusting the dew point of the humidified $H_2$ and $O_2$ streams at a constant cell voltage of 0.2 V. After each dew point adjustment, a discharge curve from open circuit to 0.2 V was recorded. Omasta et al. previously found that proper water management was important for both stability and performance in AEMFCs (Omasta, T. J. et al., J. Power Sources 375 (2018) 205-213). Because the hydrogen oxidation reaction at the anode produces water and some of it diffuses through the AEM to hydrate the cathode, excess water content (<100% RH) in the $H_2$ input stream should be avoided. After adjusting the anode and cathode dew points, it was found that both anode and cathode dew points of 46° C. (59.83% RH) provided the optimal stability and power output. As seen in FIG. 14, a peak power density of 542.57 mW/$cm^2$ was obtained at 0.43 V and 1.26 A/$cm^2$. When corrected for iR loss across the membrane (HFR=123 mΩ $cm^2$), the iR-corrected peak power density of the AEMFC was 713.04 mW/$cm^2$. This ohmic resistance is higher than that reported by Omasta et al. (ca. HFR=50 mΩ $cm^2$) and can also be attributed to other factors such membrane thickness (t=115 μm) and interfacial contact resistance due to a non-optimized ionomer and catalyst layer. Nonetheless, these results are promising and refinements to the MEA could lead to even higher performance.

In conclusion, a series of tetrablock copolymers containing all-hydrocarbon backbone based on vinyl addition polymerization of norbornene were synthesized for anion-exchange membranes. To the inventors' knowledge, this is the first anion exchange membrane based on vinyl addition-type polynorbornene. These membranes displayed high thermal stability up to 400° C. For PNB-$X_{68}$-$Y_{32}$, the ionic conductivity was 122.7 mS/cm at 80° C. with an IEC (1.88 meq/g), which was less than PNB-$X_{54}$-$Y_{46}$ (2.6 meq/g). This shows the importance of optimizing the bound and unbound water content in the membrane. Water content in PNB-$X_{68}$-$Y_{32}$ was measured by DSC analysis and it was found that 6,7 unbound water molecules and 11.9 bound water molecules in the membrane leading to the best ionic conductivity among the synthesized samples. The long-term alkaline stability test in 1 M NaOH solution at 80° C. showed exceptional chemical stability with no detectable degradation (<1%) over a 1200 h period. PNB-$X_{62}$-$Y_{38}$ was used to fabricate an MEA for an alkaline fuel cell test which achieved excellent performance with a peak power density of 542.57 mW/$cm^2$ at 0.43 V and 1.26 A/$cm^2$.

Example 2: Highly Conductive Anion-Exchange Membranes Based on Cross-Linked Poly(Norbornene): Vinyl Addition Polymerization Fuel cells are a clean energy conversion technology with the potential to reduce the use of fossil fuels (Mekhilef, S. et al., *Renewable Sustainable Energy Rev.* 2012, 16, 981-989). Fuel cells can be used in stationary power generation, portable electronics, and transportation (Carrette, L. et al., *Fuel Cells* 2001, 1, 5-39; Winter, M. et al., *Chem. Rev.* 2004, 104, 4245-4269). In addition, fuel cells are environmentally friendly, can be easy to refuel, and can have high energy conversion efficiency (Steele, B. C. et al., *Nature* 2001, 414, 345-352). Solid polyelectrolyte membranes, such as anion-exchange membranes (AEMs) and proton-exchange membranes (PEMs), simplify the fabrication of electrodes with a three-phase boundary because liquid/gas pressures do not have to be balanced like in liquid electrolyte devices. High pH AEMs have facile oxygen reaction kinetics compared to acid conducting PEMs and offer the opportunity to use non-precious metal catalysts, and reduced fuel crossover (Varcoe, J. R. et al., *Energy Environ. Sci.* 2014, 7, 3135-3191; Lu, S. et al., *Proc. Natl. Acad. Sci. U.S.A.* 2008, 105, 20611-20614; Yu, E. H. et al., *Energy Environ. Sci.* 2012, 5, 5668-5680; Hickner, M. A. et al., *J. Polym. Sci. Part B: Polym. Phys.* 2013, 51, 1727-1735; Zhou, J. et al., *J. Electrochem. Soc.* 2013, 160, F573-F578). However, early membranes suffered from low ion conductivity, poor chemical stability at high pH, and high water-uptake (Mohanty, A. D. et al., *J. Mater. Chem. A* 2014, 2, 17314-17320; Liu, L. et al., *J. Mater. Chem. A* 2016, 4, 16233-16244; Mandal, M. et al., *J. Membr. Sci.* 2019, 570-571, 394-402; Mohanty, A. D. et al., *J. Electrochem. Soc.* 2017, 164, F1279-F1285). More recently, higher conductivity (e.g. 100 mS/cm at 80° C.) and chemical stability (80° C. in 1 M NaOH) has been achieved by a number of researchers, as reviewed by Arges (Arges, C. G. et al. *ACS Appl. Energy Mater.* 2018, 1, 2991-3012). This notable progress has shown that certain structural moieties can be used to address pervious AEM deficiencies.

The structure of the polymer backbone, the position of the cations in the polymer architecture and the nature of the cations determine the conductivity and long-term alkaline stability of AEMs. Polymer backbones containing polysulfone, polyketone and poly(aryl ether) moieties are susceptible to hydroxide attack and polymer backbone degradation (Zhang, X. et al., *Polym. Chem.* 2018, 9, 699-711; Shi, Q. et al., *Polymer* 2017, 121, 137-148; Weiber, E. A. et al., *Polym. Chem.* 2015, 6, 1986-1996; Akiyama, R. et al., *Macromolecules* 2016, 49, 4480-4489; Shimada, M. et al., *J. Polym. Sci. Part A: Polym. Chem.* 2016, 54, 935-944; Fujimoto, C. et al., *J. Membr. Sci.* 2012, 423-424, 438-449; Nuñez, S. A. et al., *ACS Macro Lett.* 2013, 2, 49-52; Arges, C. G. et al., *Proc. Natl. Acad. Sci. U.S.A.* 2013, 110, 2490-2495). Backbone degradation problems are mitigated by the use of a polymer with an all-hydrocarbon backbone and head-group tether. Cation degradation can be mitigated by positioning the head-group at the end of a long alkyl chain tether, typically 4 to 6 carbons long (Long, H. et al., *J. Phys. Chem. C* 2012, 116, 9419-9426). In addition, the alkyl tether can isolate the cation head-group from the electron withdrawing inductive effect of aromatic groups in the tether or polymer backbone (if aromatic groups are present). Hence, stable AEMs under realistic operating conditions (e.g. 80° C. and 1 M KOH) can be synthesized by combining an all-hydrocarbon backbone with tethered cations on long alkyl chains (Lee, W. H. et al., *ACS Macro Lett.* 2015, 4, 453-457; Ono, H. et al., *J. Mater. Chem. A* 2017, 5, 24804-24812; Lee, W. H. et al., *ACS Macro Lett.* 2015, 4, 814-818).

In addition to alkaline stability, electrochemical devices require AEMs with high conductivity to achieve low ohmic resistance losses. Hydroxide conductivity is a function of the ion mobility and ion exchange capacity (IEC). The IEC of the AEM is often kept to a modest value in an effort to avoid high water uptake which can result in swelling of the membrane and low ion mobility. The mobility can be improved by the formation of efficient ion conducting channels (such as by the use of block copolymers) and preventing excess water uptake within the membrane (Park, D. Y. et al., *J. Phys. Chem. C* 2013, 117, 15468-15477). Thus, membranes face the conundrum of striving to achieve high IEC but suffering the consequences that come from the water that the ions attract. Cross-linking can be used to address excess water uptake but often at the expense of low ion mobility.

Phase segregation within block copolymers aids in the formation of hydrophobic and hydrophilic regions within the polymer. The quaternary ammonium head-groups within the hydrophilic phase is where hydroxide transport occurs. It is now evident that carbonate conductivity is very important in AEM (vs. hydroxide conductivity) because of the uptake of carbon dioxide from the ambient air. In a fuel cell, the carbon dioxide at the air cathode is readily absorbed and converts the hydroxide produced at the cathode to bicarbonate or carbonate. Once the bicarbonate or carbonate is transported to the hydrogen anode in a fuel cell, the evolved carbon dioxide will build-up within the recycled hydrogen fuel along with the water produced at the anode. Both carbon dioxide and water can diffuse back through the membrane continuing to process of hydroxide neutralization and carbonate migration. Fuel cell tests using fresh feed hydrogen avoid facing this critical issue of carbon dioxide build-up and carbonate conduction. Thus, it is imperative that the IEC and ion mobility be as high as possible for efficient carbonate conduction. Carbonate mobility is much lower than hydroxide mobility.

One of the remaining challenges in the design of stable, high conductivity AEMs is water uptake. Excessive water uptake can occur at high IEC causing channel flooding and membrane swelling. This leads to mechanical distortion and softening of the membranes. Materials with high IEC have a tendency to adsorb large quantities of water. Some water is needed to form the ion solvent-shell as well as dilution of the hydroxide salt within the membrane. The absorbed water must be adequate for ion solvation, however, excess free-water is not productive or desired. Thus, the water content can be divided into bound water (for forming the solvent shell) and free water. Hence, it is necessary to choose an IEC which balances the amount of free and bound water inside the membranes to yield maximum ion mobility (i.e. conductivity) while maintaining AEM mechanical properties. Although this study does not deal with polymers with a different number of blocks, it too has an impact on conductivity (Chen, X. C. et al., *Nano Lett.* 2014, 14, 4058-4064; Inceoglu, S. et al., *ACS Macro Lett.* 2014, 3, 510-514; Sun, J. et al., *J. Am. Chem. Soc.* 2014, 136, 14990-14997; Sun, J. et al., *Macromolecules* 2016, 49, 3083-3090; Price, S. C. et al., *Macromolecules* 2013, 46, 7332-7340; Meek, K. M. et al., *Macromolecules* 2015, 48, 4850-4862).

A previous report of using vinyl addition poly(norbornene) in an AEM only produced a very low conductivity (4 mS/cm at 80° C.) and showed a modest decline in conductivity after soaking in 6 M NaOH at room temperature (He, X. et al., *RSC Adv.* 2015, 5, 63215-63225) It should be noted that the ion exchange capacity (1.83 meq/g) was significantly less than what is reported in this paper, the backbone was not a block copolymer, and the head-group tethers contained ether linkages which are known to be susceptible to hydroxide attack. In another report, a block copolymer form of poly(norbornene) was synthesized by vinyl addition polymerization for use as a pervaporization membrane (Kim, D.-G. et al., *Chem. Mat.* 2015, 27, 6791-6801). It was not ion conductive, did not have tethered cation head-groups, and did not face the same challenges of balancing ion conductivity, water uptake and chemical stability in base.

A strategy to avoid the unwanted water swelling issue is to utilize cross-linking to increase the mechanical stability. Previously, several research groups have reported the synthesis of crossed-linked AEMs with improved alkaline stability, dimensional stability and swelling resistance (He, S. Q. et al., *J. Membr. Sci.* 2016, 509, 48-56; Xu, W. et al., *Adv. Funct. Mater.* 2015, 25, 2583-2589; Wang, J. et al., *J. Membr. Sci.* 2012, 415-416, 205-212; Tibbits, A. C. et al., *J. Electrochem. Soc.* 2015, 162, F1206-F1211; Gu, S. et al., *Chem. Commun.* 2011, 47, 2856-2858; Zhu, L. et al., *Polym. Chem.* 2016, 7, 2464-2475; Cheng, J. et al., *J. Membr. Sci.* 2016, 501, 100-108; Hu, E. N. et al., *ACS Appl. Energy Mater.* 2018, 1, 3479-3487). While many of these cases showed high hydroxide conductivity, the reported AEMs did not have adequate long-term alkaline stability. Zhang et al. synthesized crossed-linked AEMs with hydroxide conductivity of −200 mS/cm at 80° C., however, the long-term alkaline stability was not measured (Zhang, W. et al., *J. Polym. Sci. Part A: Polym. Chem.* 2018, 56, 618-625). Recently, Zhu et al. reported crossed-linked AEMs with high ionic conductivity (200 mS/cm at 80° C.) however there was 27% degradation when the membrane was aged in 1 M NaOH solution at 80° C. for 500 h (Zhu, L. et al., *Polym. Chem.* 2016, 7, 2464-2475). Recently, Wang et al. synthesized highly conductive (>200 mS/cm at 80° C.) AEMs with 6.2% conductivity loss after 500 h in 1 M hydroxide solution at 80° C. (Wang, L. et al., *J. Mater. Chem. A* 2018, 6, 15404-15412).

A further consideration is the need for exceptionally high conductivity in fuel cell membranes. Conductivity tests are often performed with only hydroxide conductive ions.

Although hydroxide may be produced at the alkaline fuel cell cathode, under steady-state operating conditions, it quickly forms carbonate due to the accumulation of carbon dioxide in the recycled hydrogen at the anode. The only means to remove the carbon dioxide is to vent unused hydrogen (a very undesirable process) or let the carbon dioxide diffuse back across the membrane, which converts hydroxide to carbonate. Thus, under steady-state conditions, carbonate conductivity will dominate. Carbonate mobility is much less than hydroxide mobility. Thus, extra conductivity is needed.

In this study, the benefits of light polymer cross-linking are investigated as a means of implementing polymers with very high IEC yet maintaining high hydroxide mobility (with proven stability) without excessive water uptake or membrane swelling. Poly(norbornene) is a favorable polymer backbone for low-cost AEMs because of its all-hydrocarbon backbone and inexpensive starting material, dicyclopentadiene. This study shows that very high IEC polymers can be obtained (through the use of low molecular weight for norbornene monomers) and used to achieve record hydroxide conductivity via light cross-linking. Poly(norbornene)s can be polymerized through several different synthetic routes. In this study, the results of vinyl addition polymerization of norbornenes are explored. The results from ring-opening metathesis polymerization (ROMP) of norbornenes are disclosed herein (Chen, W. et al., *ACS Appl. Energy Mater.* 2019). The methods of synthesis and resulting properties of ROMP and vinyl addition polymer are different. Especially notable is the glass transition temperature ($T_g$). We note that several types of ion conducting polymer can be useful in electrochemical devices (e.g. fuel cells, electrolyzers, flow batteries). The membrane separating the two electrodes should have highest possible ion conductivity and low fuel cross-over. The ionomer used to make the electrodes should be compatible with catalyst and electrode fabrication methods. There is also the need for ion conducting adhesion layers between the electrode and membrane. Thus, there is interest in ion conducting polymers with different properties. Vinyl addition polymerized norbornenes have a high glass transition temperature (Grove, N. R. et al., *J. Polym. Sci., Part B. Polym. Phys.* 1999, 37, 3003-3010; Shin, B.-G. et al., *Macromol. Res.* 2007, 15, 185-190; Tetsuka, H. et al., *Polym. J.* 2009, 41, 643-649; Dorkenoo, K. D. et al., *J. Polym. Sci., Part B: Polym. Phys.* 1998, 36, 797-803). Vinyl addition poly(norbornene) itself has a $T_g$ of 390° C. while poly(hexylnorbornene) has a $T_g$ of 265° C. A variety of norbornene copolymers were shown to have a $T_g$ between 340° C. and 355° C.,[47] 203° C. and 331° C.,[48] 293° C. and 360° C., and over 380° C. for poly(methylnorbornene).

It was shown previously that the vinyl addition polymerization route produces AEMs with high hydroxide conductivity (123 mS/cm) and excellent alkaline stability (<1% loss of conductivity in 1,200 h in 1M NaOH at 80° C.). For AEMs, there is a compromise between the polydispersity of the blocks, overall molecular weight of the polymer, and product yield. Tetrablock copolymer was chosen for study because it has a sufficiently high molecular weight and good yield. In this study, it was found that light cross-linking of post-polymerized norbornene extended the usable IEC range to very high values without unwanted water uptake or swelling. To the best of the inventors' knowledge, the hydroxide conductivity reported here (198 mS/cm at 80° C.) is the highest reported for a chemically stable polymer (at 80° C. in 1 M NaOH).

Materials: The chemicals used in this study are as follows: 1-hexene, 5-bromo-1-pentene and dicyclopentadiene were obtained from Alfa Aesar (used as-received); the butyl norbornene (BuNB) and bromopropyl norbornene (BPNB) monomers were prepared by a Diels-Alder reaction, following a previously published procedure (Martínez-Arranz, S. et al., Macromolecules 2010, 43, 7482-7487). The monomers were purified by distillation over sodium in three freeze-pump-thaw cycles. The synthesis reactions were carried out in a dry argon glove box with care to limit the exposure to air and moisture. The toluene was heating at reflux for 6 h over sodium and benzophenone to remove water. Freshly distilled toluene was used in the synthesis. Triisopropylphosphine and $[(\eta^3\text{-allyl})Pd(Cl)]_2$ were (Sigma-Aldrich) were used as-received. (Allyl)palladium(triisopropylphosphine)chloride $((_7{}^3\text{-allyl})Pd(^iPr_3P)Cl)$, was used as the catalyst and was prepared as described previously (Lipian, J. et al., Macromolecules 2002, 35, 8969-8977) Lithium tetrakis(pentafluorophenyl)-borate.$(2.5Et_2O)$ (Li[FABA]) (Boulder Scientific Co.) was used as-received. N,N,N',N'-Tetramethyl-1,6-hexanediamine (TMHDA), α,α,α-trifluorotoluene (TFT), anhydrous, >99% and tetrahydrofuran (THF) (Sigma-Aldrich) were used as-received.

Synthesis of tetrablock copolymer [Poly(BuNB-b-BPNB-b-BuNB-b-BPNB)]: Tetrablock PNB-$X_{34}$-$Y_{66}$ (PNB=polynorbornene, $X_{34}$=mole percent of combined hydrophobic blocks, $Y_{66}$=mole percent of combined halogenated blocks) was prepared as described in Example 1. The catalyst was made by dissolving $(\eta^3\text{-allyl})Pd(Pr_3P)Cl$ (26 mg, 0.074 mmol) and Li[FABA] (65 mg, 0.074 mmol) in 0.5 g TFT and 0.5 g toluene. BuNB (0.28 g, 1.86 mmol) and toluene (6 mL) were then added and stirred. The catalyst was added under vigorous stirring. The BuNB polymerization reaction was complete in 10 min. The product was checked by gel permeation chromatography (GPC). BPNB (1.6 g, 7.44 mmol) and toluene (32 mL) were added to the catalyst-containing solution and stirred for 3 h to add the BPNB block to the BuNB block. After consumption of BPNB, the product was checked by GPC analysis. The third block was formed by adding BuNB (0.28 g, 1.86 mmol) and toluene (6 mL) and allowed to react for 10 min. Finally, BPNB (1.6 g, 7.44 mmol) and toluene (32 mL) were added and stirred for 3 h to form the fourth block on the polymer. The reaction product was quenched by precipitation in methanol. The polymer was purified over activated charcoal and filtered to remove catalyst residue. The polymer product was precipitated twice in methanol and vacuum dried at 60° C.

Nuclear magnetic resonance (NMR) and GPC: The polymers were studied using $^1H$ NMR (Bruker Avance 400 MHz instrument) in $CDCl_3$. The number average molecular weight ($M_n$) and polydispersity index ($M/M_n$) of PNB-$X_{34}$-$Y_{66}$ were found by GPC (Shimadzu with LC-20 AD HPLC pump and a refractive index detector, RID-20 A, 120 V). The GPC sample was in THF with the eluent flow rate of 1.0 mL/min at 30° C. with polystyrene standard.

Membrane casting and ion-exchange: The tetrablock copolymer, PNB-$X_{34}$-$Y_{66}$ (0.1 g) was taken up in 5 mL of chloroform. In-situ cross-linking was performed by adding a crosslinking agent to the polymer/solvent mixture when the membrane was cast, followed by reaction after casting. The cross-linking agent, TMHDA, was added to the solution at different mole ratios: 4 mol %, 5 mol %, 7 mol %, 10 mol %, 20 mol % and 50 mol %, with respect to the moles of brominated monomer in the polymer (i.e. those monomers which were capable of forming a quaternary ammonium head-group). The cross-linker concentration in this paper is given in terms of mol % TMHDA crosslinker added to the polymer. For example, 5 mol % TMHDA means that the up to 10% of the available head-groups are consumed by TMHDA cross-linker. It is noted that even if all the cross-linker were to react, the fraction of intramolecular cross-linking vs. intermolecular cross-linking would be difficult to evaluate. The solution was filtered through a 0.45 μm poly(tetrafluoroethylene) (PTFE) membrane syringe filter and a film was cast and dried at 60° C. for 24 h. The film was colorless, transparent, and flexible. The membranes were aminated by immersed in 50 wt % aqueous trimethylamine solution (48 h at room temperature). The quaternized membranes were washed with DI water. The bromide ions were converted to hydroxide ions by soaking the membranes in 1 M NaOH solution under nitrogen for 24 h.

Hydroxide conductivity: The membrane conductivity was measured using four-point probe electrochemical impedance spectrometry with a PAR 2273 potentiostat. The conductivity of the membranes was measured in HPLC-grade water in a nitrogen atmosphere. The membranes were allowed to sit for 30 min before each measurement. The in-plane ionic conductivity was calculated, Equation 1.

$$\sigma = \frac{L}{WTR} \tag{1}$$

In Eq. 1, σ is the ionic conductivity in S/cm, L is the length between sensing electrodes in cm, W and T are the width and thickness of the membrane in cm, respectively, and R is the resistance measured in Ohms. The long-term (>1000 h) alkaline stability testing was performed by immersing the membrane in 1 M NaOH solution at 80° C. in a teflon-lined Parr reactor. Prior to each measurement, the membranes were taken out of solution and thoroughly washed with DI water. After each measurement, the membranes were stored in the reactors with a freshly prepared NaOH solution. The change in ionic conductivity was used to evaluate the long-term alkaline stability. During measurement, each data point was measured in triplicate and the average value was reported. The deviation in the measurements of each data point was <1%. In addition, the alkaline stability was further analyzed by characterizing the chemical structure using a Nicolet 6700 FT-IR spectrometer.

Ion exchange capacity (IEC), water uptake (WU), number of freezable water ($N_{free}$) and bound, nonfreezable water ($N_{bound}$) molecules, and hydration number (λ): $^1$H NMR was performed on the pre-aminated samples to determine the IEC of the membranes. Further, titration was used to show that the quaternization reaction was quantitative. The titration involved converting the counter anion to chloride, followed by titration of the chloride in the membrane. It was previously found that IEC measurements obtained via $^1$H NMR (pre-aminated samples) and titration (post-aminated samples) were the same (within experimental error). For example, the IEC of PNB-$X_{67}$-$Y_{33}$, was found by titration and NMR and results were 1.90 meq/g and 1.92 meq/g, respectively. The fact that they match shows that each bromoalkyl group was quantitatively converted into a quaternary ammonium head-group. That is, each available bromoalkyl group available was reacted with trimethyl amine.

$^1$H NMR was found to be the more dependable method and will be reported here for the materials. The water uptake of the membranes was calculated using Equation 2.

$$WU\ (\%) = \frac{M_w - M_d}{M_d} \times 100 \tag{2}$$

In Eq. 2, $M_d$ is the dry mass and $M_w$ is the wet mass of the membrane after removing surface water. The membranes were measured at room temperature in $OH^-$ form. The number of water molecules per ionic group (λ), was calculated using Equation 3.

$$\lambda = \frac{1000 \times WU\ \%}{IEC \times 18} \tag{3}$$

The number of freezable water ($N_{free}$) and bound water ($N_{bound}$) per ion pair in the membrane was found by differential scanning calorimetry (DSC). DSC measurements were performed with a Discovery DSC with autosampler (TA Instruments). The membranes were hydrated and excess water was removed from the surface. A 5 to 10 mg sample was sealed in a DSC pan. The sample was cooled to −50° C. and then heated to 30° C. at a rate of 5° C./min under $N_2$ (20 mL/min). The amount of freezable and non-freezable water was calculated, Equations 4 to 6 (Lue, S. J. et al., *J. Macromol. Sci. Part B: Phys.* 2009, 48, 114-127; Mecheri, B. et al., *J. Phys. Chem. C* 2012, 116, 20820-20829; Moster, A. L. et al., *J. Appl. Polym. Sci.* 2009, 113, 243-250).

$$N_{free} = \frac{M_{free}}{M_{tot}} \times \lambda \tag{4}$$

$M_{free}$ is the mass of freezable water and $M_{tot}$ is the total mass of water in the membrane. The weight fraction of freezable water was calculated, Equation 5.

$$\frac{M_{free}}{M_{tot}} = \frac{H_f / H_{ice}}{(M_W - M_d)/M_w} \tag{5}$$

$M_w$ is the wet membrane mass and $M_d$ is the dry mass of the membrane. $H_f$ is the enthalpy found by the integration of the DSC freezing peak and $H_{ice}$ is the enthalpy for fusion for water, corrected for the subzero freezing point, Equation 6.

$$H_{ice} = H_{ice}{}^{\circ} - \Delta C_p \Delta T_f \tag{6}$$

$\Delta C_p$ is the difference between the specific heat capacity of liquid water and ice. $\Delta T_f$ is the freezing point depression.

Small angle X-ray scattering (SAXS): SAXS was used to analyze the phase segregation of block copolymer AEMs. Hydrated membranes in bromide form were tested in air using the NSLS-II beamline at the Center for Functional Nanomaterials (Brookhaven National Laboratory, Upton, N.Y.). The wave vector (q) was calculated using Equation 7, where 2θ is the scattering angle.

$$q = \frac{4\pi}{l \sin 2\theta} \tag{7}$$

The characteristic separation length or inter-domain spacing (d) (i.e. the Bragg spacing) was calculated, Equation 8.

$$d = \frac{2\pi}{q} \tag{8}$$

Fuel cell testing: The XL5-PNB-$X_{34}$-$Y_{66}$ membrane was selected for electrochemical testing in an alkaline fuel cell (AEMFC). The anode and cathode were fabricated using the slurry method as described previously. A low molecular weight form of the poly(BuNB-b-BPNB-b-BuNB polymer (20.5 kDa) was used as the ionomer based on results from a previous investigation (Ahlfield, J. et al., *J. Electrochem. Soc.* 2017, 164, F1648-F1653). The ionomer and 50% platinum on Vulcan XC-72 catalyst were ground together in isopropanol. The catalyst/ionomer slurry was then sonicated at room temperature to ensure uniform mixing. The slurry was sprayed coated onto 1% water-proofed Toray TGPH-060 carbon paper and allowed to dry at ambient temperature. The platinum loading was 2.1 mg/$cm^2$ and the ionomer-to-carbon ratio was 40%. This metal loading was intentionally used to avoid kinetic losses in the non-optimized electrode.

The electrode-membrane assembly was soaked in 1 M NaOH for 1.5 h to exchange the bromide for hydroxide. A Fuel Cell Technologies test station with single-pass serpentine graphite plates and PTFE gaskets was used. The tests were performed on a Scribner 850e Fuel Cell Test Station operated at 60° C. using humidified $H_2$ and $O_2$ gases, each at 0.5 L/min. The dew points of the anode and cathode gas streams were adjusted during the experiments.

Results: The catalyst, ($\eta^3$-allyl)Pd)($^i$Pr$_3$P)Cl, and the two monomers (butyl norbornene (BuNB) and bromopropyl norbornene (BPNB)) were prepared. The catalyst was synthesized using ($\eta^3$-allyl)Pd($^i$Pr$_3$P)Cl and Li[FABA] in one-to-one ratio, sufficient for generating the cationic Pd for initiating the polymerization. The BuNB-to-catalyst ratio was 25:1 ($[M]_0/[Pd]=25$). The reaction was allowed to proceed for 10 min. The second block of the tetrablock polymer was formed by adding BPNB at a monomer-to-catalyst ratio of 100-to-1 ($[M]_0/[Pd]=100$) and allowed to reaction for 3 h. The final two blocks of the tetrablock polymer were synthesized by repeating the two steps described above.

Figure 15:
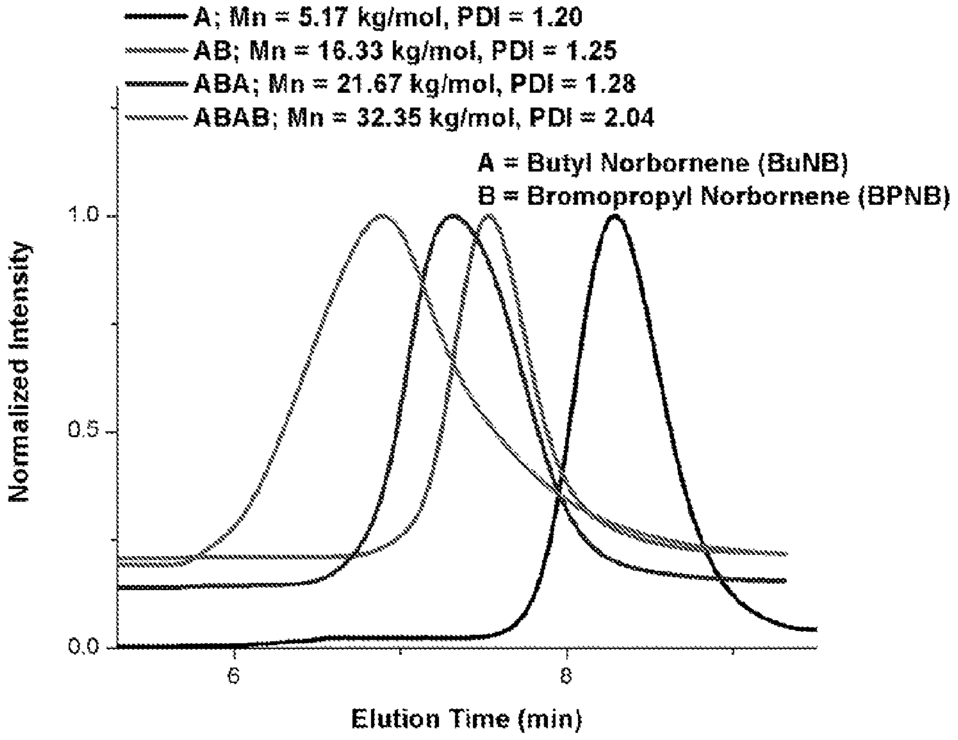
FIG. 15. GPC trace of PNB-$X_{34}$-$Y_{66}$, showing the sequential growth of each block during the formation of tetrablock copolymer.

The number average molecular weight ($M_a$) of the first, second, third and fourth blocks of PNB-$X_{34}$-$Y_{66}$ were 5.17 kDa, 11.16 kDa, 5.34 kDa and 10.68 kDa, respectively, based on the GPC analysis of the polymer samples extracted during synthesis, FIG. 15. The $M_n$ of the tetrablock copolymer was 32.35 kDa with a polydispersity index (PDI) of 2.04.

Figure 16:
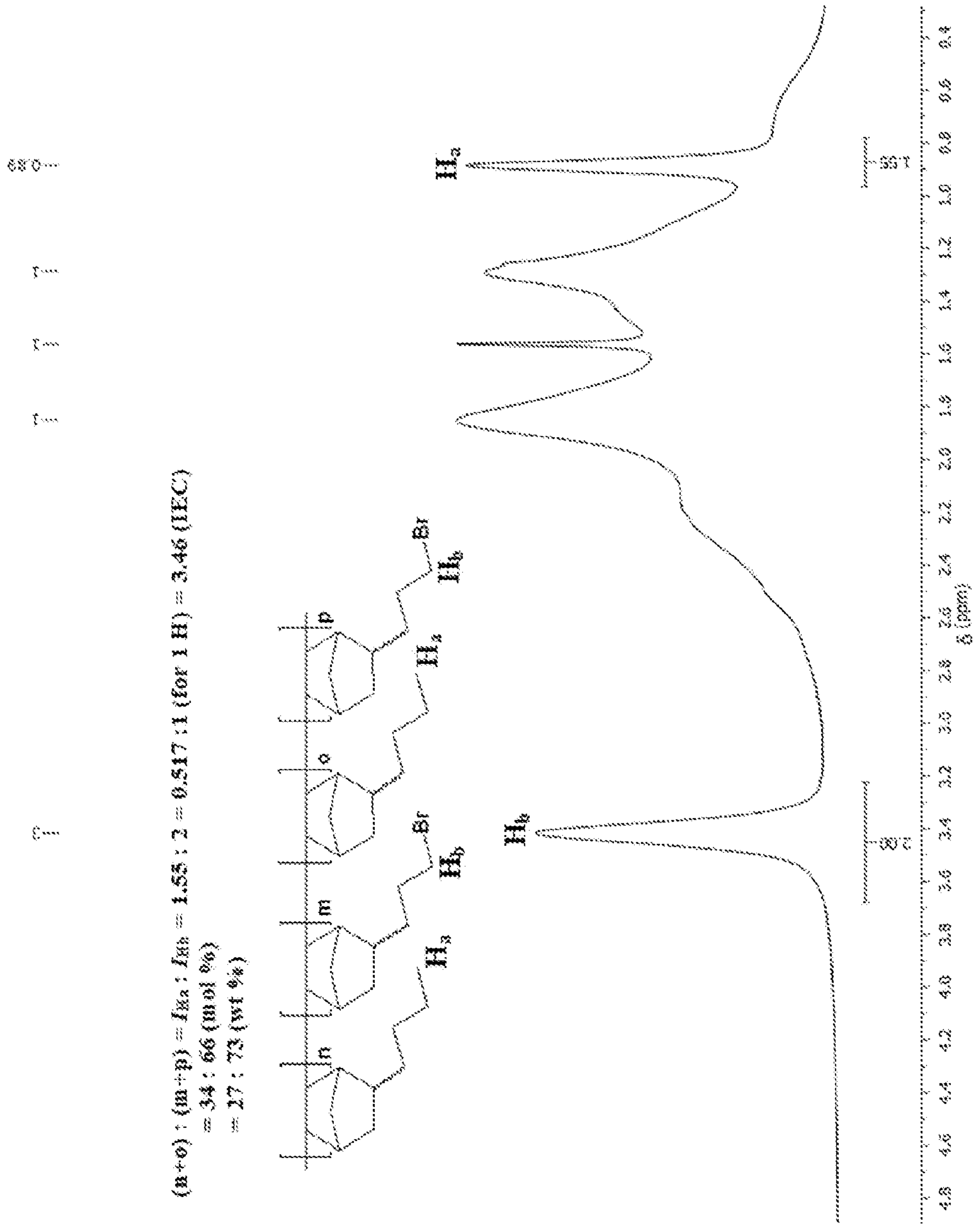
FIG. 16. $^1$H NMR spectrum of tetrablock PNB-$X_{34}$-$Y_{66}$ in $CDCl_3$.

The IEC was evaluated via $^1$H NMR analysis by integration of the terminal methyl protons ($H_a$) of the hydrophobic block which resonate at 0.89 ppm and the methylene protons ($H_b$) adjacent to the bromine atom of the halogenated block which appear at 3.42 ppm. $^1$H NMR is a more accurate means of determining IEC because of the quantitative nature of solution NMR. The integration ratio of $H_a$ and $H_b$ was used to calculate the IEC (FIG. 16). The $H_a$:$H_b$ ratio was 1.55:2, as shown in FIG. 16. This value was used to calculate the molar ratio between the hydrophobic and halogenated blocks by recognition of the fact that the hydrophobic block has three methyl protons and the halogenated block has two methylene protons. Using $^1$H NMR spectroscopy, the combined fraction of hydrophobic blocks and halogenated blocks was 34 mol % and 66 mol %, respectively. Next, the IEC was calculated from the ratio of the masses of the two types of blocks. The IEC was 3.46 meq/g for the block copolymer in hydroxide form without cross-linking, PNB-$X_{34}$-$Y_{66}$. The IEC is slightly lower with the addition of the cross-linking agent, as shown in Table 2. The IEC values obtained by titration and NMR were previously found to be the same, which shows quantitative conversion of the bromoalkyl end-group to the quaternary ammonium form, as described above.

The precursor polymer, PNB-$X_{34}$-$Y_{66}$ was cross-linked with N,N,N',N'-tetramethyl-1,6-hexanediamine (TMHDA) at different cross-linker concentrations (4-50 mol %) by adding a specific mol % TMHDA with respect to the total moles of the halogenated monomer in the tetrablock polymer (Scheme 2). The membranes without light cross-linking were soft and not able to be handled in membrane form without breaking. This result shows one reason why the IEC of non-cross-linked polymers must be kept to modest values. High IEC values do not yield usable membranes. Attempts to form and handle membranes without any cross-linking failed because the membrane was too delicate. Thus, one immediate benefit of light cross-linking was that usable high-IEC membranes could be fabricated and tested. Table 3 includes a summary of the membrane properties.

Scheme 2. Synthesis of cross-linked AEMs.

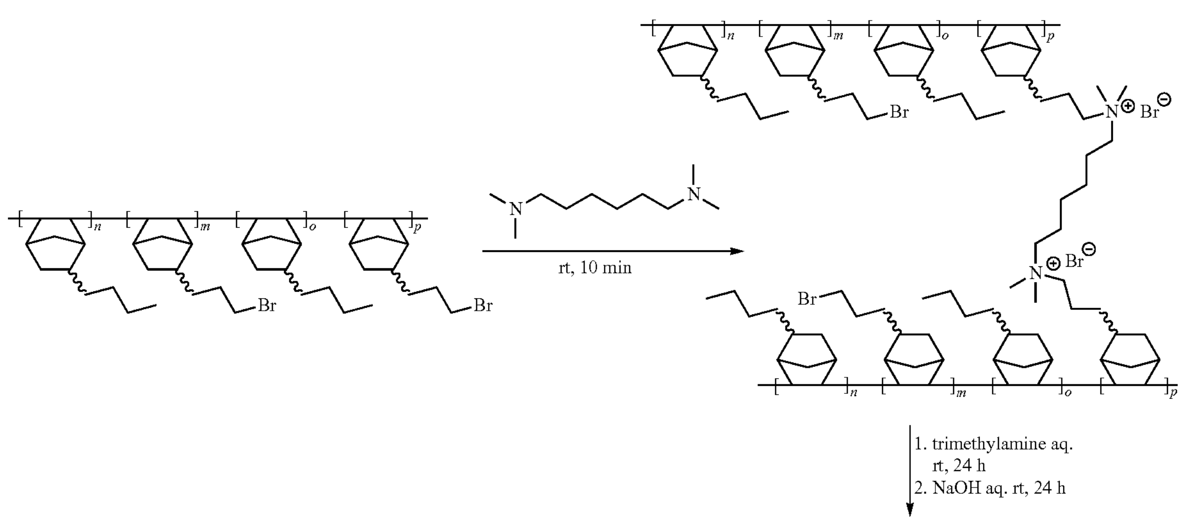

-continued

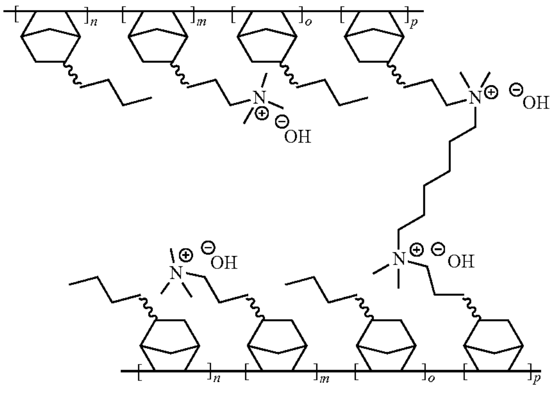

TABLE 3

Properties of cross-linked poly(butyl norbornene-b-bromopropyl norbornene-b-butyl norbornene-b-bromopropyl norbornene) (PNB-X34-Y66) membranes in hydroxide form.

| Block copolymer | Crosslinker Concentration (mol. %) | $OH^-$ Conductivity $(mS/cm)^a$ 25° C. | 80° C. | IEC $(meq/g)^b$ | $\sigma/IEC^c$ | Ionic $ASR^d$ ($Ohm\text{-}cm^2$) | Water $Uptake^e$ (%) | Hydration number λ | $N_{free}$ | $N_{bound}$ | d-spacing (nm) |
|---|---|---|---|---|---|---|---|---|---|---|---|
| XL50-PNB-$X_{34}$-$Y_{66}$ | 50 | 29.0 | 74.0 | 3.15 | 23.5 | 0.092 | 42.0 | 7.39 | 0.00 | 7.40 | 49.7 |
| XL20-PNB-$X_{34}$-$Y_{66}$ | 20 | 45.9 | 111 | 3.33 | 33.3 | 0.065 | 50.8 | 8.47 | 0.96 | 7.52 | 51.8 |
| XL10-PNB-$X_{34}$-$Y_{66}$ | 10 | 74.8 | 167 | 3.39 | 49.3 | 0.033 | 52.9 | 8.67 | 2.31 | 6.35 | 51.8 |
| XL7-PNB-$X_{34}$-$Y_{66}$ | 7 | 81.2 | 175 | 3.41 | 51.4 | 0.040 | 66.2 | 10.8 | 4.22 | 6.56 | 48.6 |
| XL5-PNB-$X_{34}$-$Y_{66}$ | 5 | 95.2 | 198 | 3.43 | 57.8 | 0.032 | 69.1 | 11.2 | 5.21 | 6.00 | 48.9* |
| XL4-PNB-$X_{34}$-$Y_{66}$ | 4 | 86.8 | 184 | 3.43 | 53.5 | 0.033 | 73.7 | 11.9 | 6.20 | 5.73 | 49.0 |

[a]$OH^-$ conductivity was measured by four-probe conductivity cell.
[b]IEC was determined by $^1H$ NMR
[c]Ionic conductivity at 80° C./IEC.
[d]Ionic ASR was calculated using the following equation: ASR = L/σ where L = film thickness in cm; σ = ion conductivity in S/cm (at 80° C.).
[e]Water uptake was measured at room temperature.
XL = cross-linked, PNB = polynorbornene;
*d-spacing was estimated via linear interpolation.
X = hydrophobic block; Y = halogenated block; numbers in the subscript indicate the molar ratio of each block.

Glass transition temperature ($T_g$): Vinyl addition poly (norbornene) copolymers are known to have high $T_g$ (250° C. to 400° C.). The addition of flexible alkyl side-chains tends to lower the $T_g$ of the polymer. DSC experiments were performed on the tetrablock copolymers used in this study. The AEM samples were heated from 25° C. to 400° C. However, a $T_g$ was not detected below the decomposition temperature of the polymer (<300° C.). The quaternary ammonium head-groups are known to break-down at or below 250° C.[12] The $T_g$ of the polymer in other forms (e.g. non-quaternized form) is of no interest because forming the ionic head-groups and absorbing water will affect the $T_g$ of the final polymer.

Figure 17:
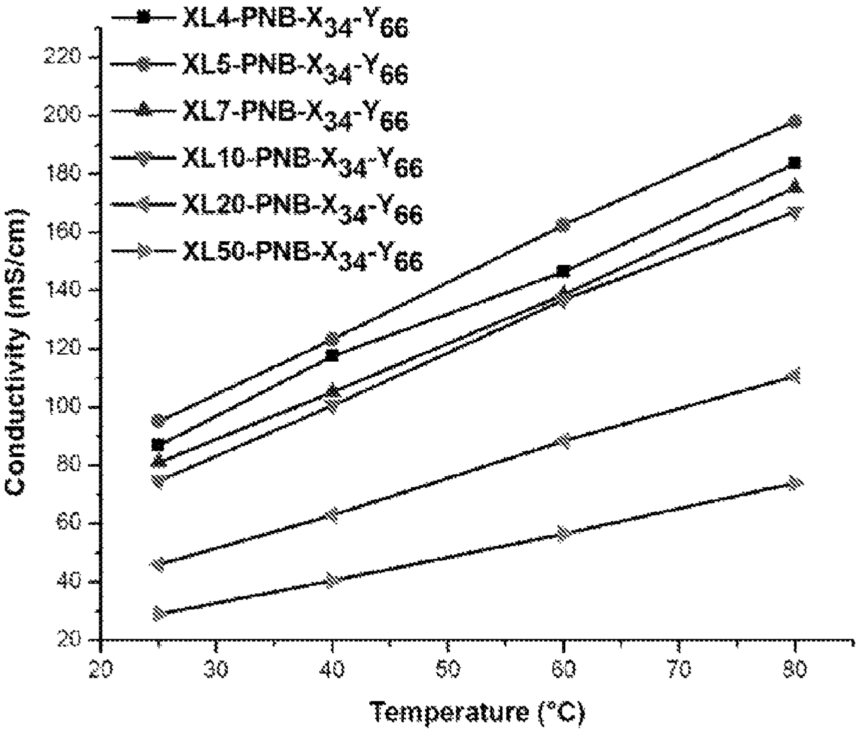
FIG. 17. Plot of ionic conductivity of XL AEMs at different temperature.

Hydroxide conductivity (σ) and ionic area specific resistance (ASR): High hydroxide conductivity is needed for membranes used in electrochemical devices. FIG. 17 shows the increase in conductivity with temperature from 25° C. to 80° C. This phenomenon is due to greater thermal motion of the ions at elevated temperature (Li, Q. et al., *Chem. Commun.* 2014, 50, 2791-2793). The apparent activation energy ($E_a$) was estimated from the slope of ln(σ) vs. 1/T and found to be 11.7 to 14.9 kJ/mol. The $E_a$ values are comparable to previously reported high performance AEMs and PEMs, such as Nafion-117 (Dang, H.-S. et al., *Macromolecules* 2015, 48, 5742-5751; Pan, J. et al., *Adv. Funct. Mater.* 2010, 20, 312-319; Lin, B. et al., *Chem. Mater.* 2010, 22, 6718-6725).

Figure 18:
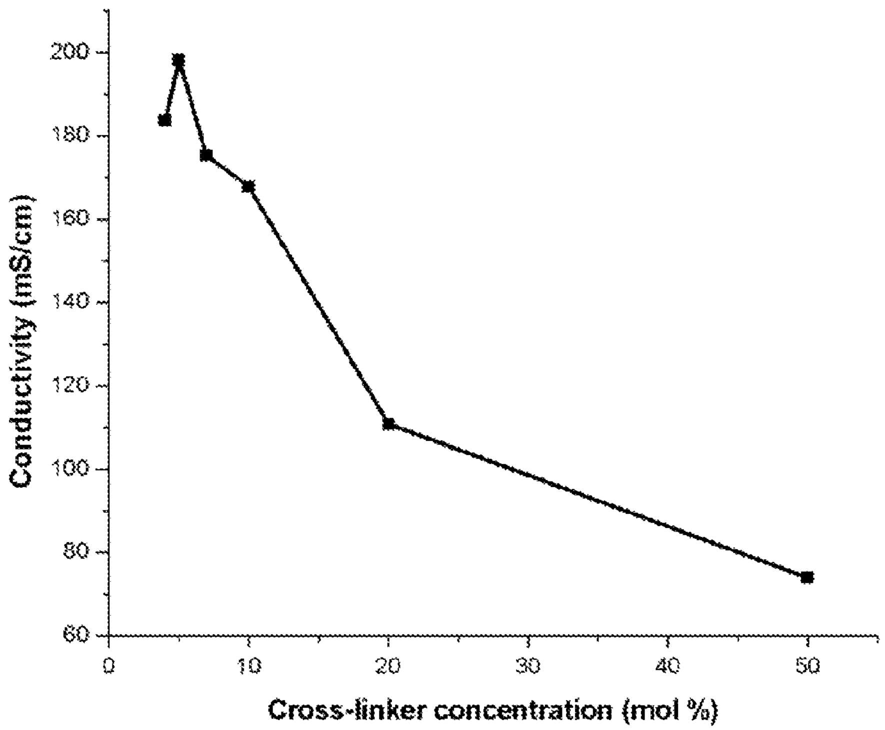
FIG. 18. The variation of hydroxide ion conductivity with cross-linker concentration.

FIG. 18 shows the effect of cross-linker concentration on ionic conductivity. A high degree of cross-linking can stabilize polymer membranes and inhibit excess water swelling, but often at the expense of ion mobility. It was observed that the ionic conductivity increased slightly with light cross-linking, 5 mol % cross-linker concentration, and then decreased at higher cross-linking. For XL5-PNB-$X_{34}$-$Y_{66}$ (5 mol % cross-linker concentration), the hydroxide conductivity at 25° C. and 80° C. was 95.2 mS/cm and 198 mS/cm, respectively. XL50-PNB-$X_{34}$-$Y_{66}$ (50 mol % cross-linker concentration) had lower ionic conductivity: 29 mS/cm and 74 mS/cm at 25° C. and 80° C., respectively. Without cross-linking, the water uptake was so high that stable films could not be made because of excessive swelling. The trend can be seen in the slightly lower conductivity and higher water uptake with the 4% cross-linker sample, although the 4% and 5% samples are quite close in water uptake values. At high cross-linker concentration, the membrane is too tightly cross-linked, which limits mechanical deformation and inhibits ion mobility.

The hydroxide conductivity normalized by the IEC (σ/IEC) is representative of the hydroxide ion mobility in the membrane. It measures the average effectiveness of the cations within the membrane to contribute to hydroxide conduction. Since the IEC value of each membrane is approximately the same (the only mass change is due to the added cross-linker), the hydroxide mobility tracks with conductivity. The data in Table 3 shows that XL5-PNB-$X_{34}$-$Y_{66}$ had the highest efficiency whereas, XL50-PNB-$X_{34}$-$Y_{66}$ displayed lowest efficiency.

Lastly, ionic ASR is a key membrane metric. Based on the polymer conductivity at 80° C. and membrane thickness, ionic ASR was calculated using the following equation: ASR=L/σ, where L is the film thickness and σ is the ion conductivity. The ASR of the XL5-PNB-$X_{34}$-$Y_{66}$ membrane is 0.032 ohm-$cm^2$ which meets the ARPA-E IONICS (Department of Energy, USA) target of ≤0.04 ohm-$cm^2$. The ionic ASR values for the other membrane samples can be found in Table 3.

Water uptake (WU), hydration number (λ), number of freezable water molecules ($N_{free}$) and bound, non freezable water molecules ($N_{bound}$): For each polymer there is an optimum amount of water uptake needed for ion hydration and efficient channel conduction. Excess water in the form of free water can lead to over swelling of the ion conduction channels and poor performance due to membrane softening and channel flooding. As shown in Table 3, the WU of the membranes had a power law relationship with cross-linker concentration. The best performing membrane, XL5-PNB-$X_{34}$-$Y_{66}$, had 69.1% WU with a conductivity of 198 mS/cm at 80° C. At a slightly lower cross-linker concentration, XL4-PNB-$X_{34}$-$Y_{66}$, the membrane had slightly higher WU (73.7%) and also lower conductivity (184 mS/cm at 80° C.). The membrane with the highest cross-linker concentration, XL50-PNB-$X_{34}$-$Y_{66}$, had the lowest WU (42%) and also the lowest conductivity (74 mS/cm at 80° C.) due to poor ion mobility.

Figure 42:
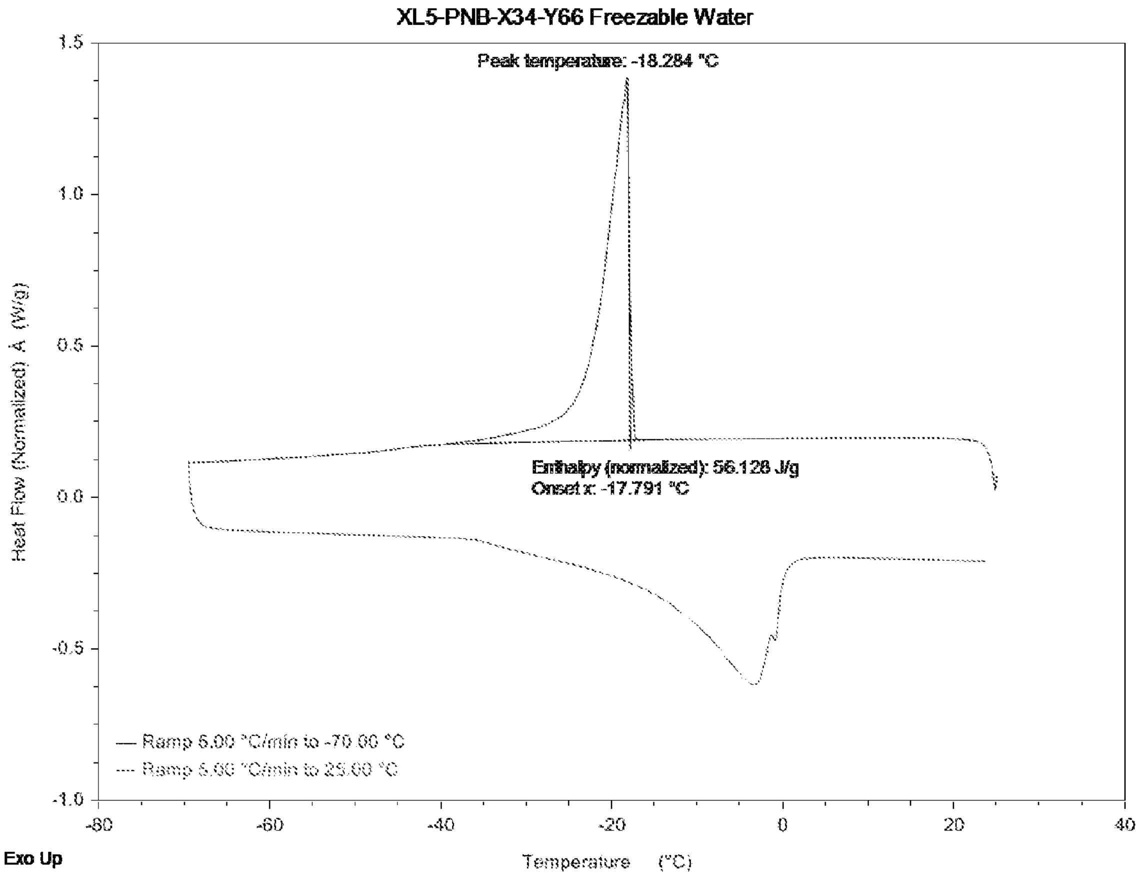
FIG. 42. Representative DSC cooling and heating curves with enthalpy integration of an AEM with low cross-linking concentration (XL5-PNB-$X_{34}$-$Y_{66}$).
Figure 43:
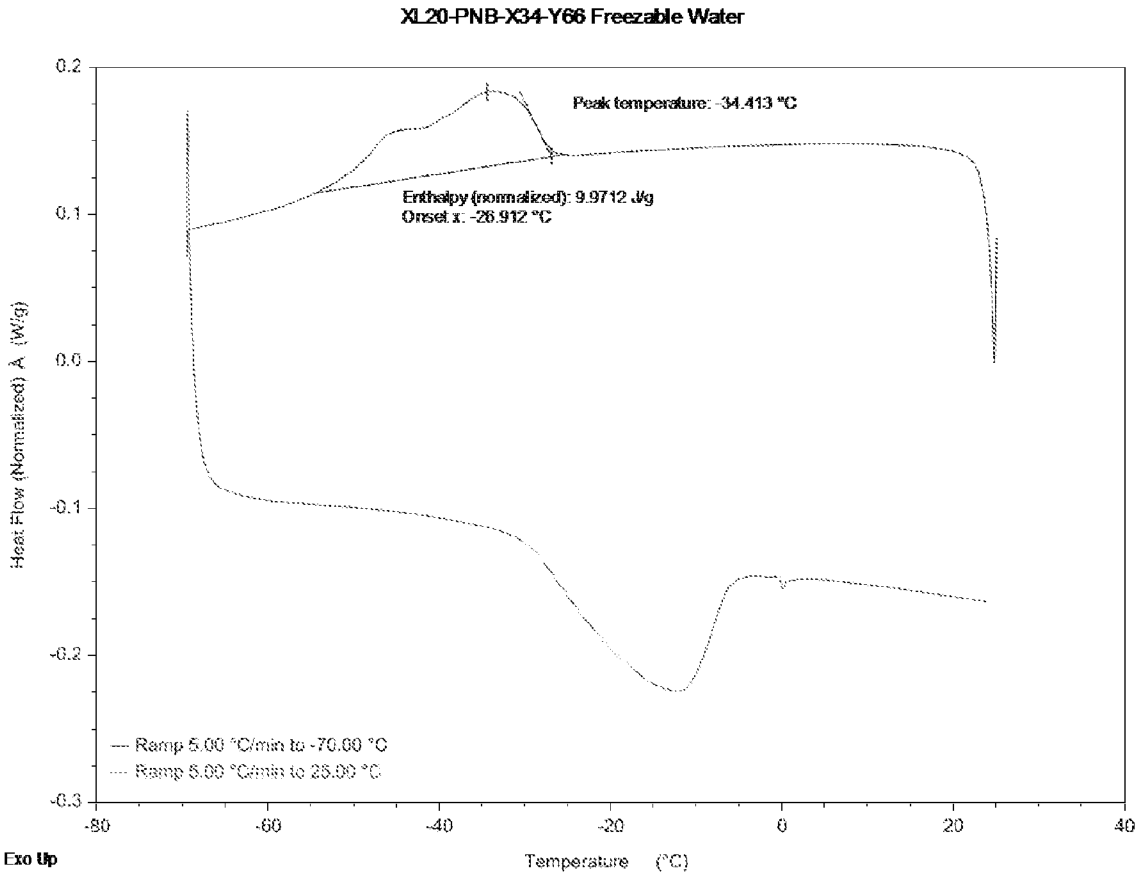
FIG. 43. Representative DSC cooling and heating curves with enthalpy integration of an AEM with high cross-linking concentration (XL20-PNB-$X_{34}$-$Y_{66}$).

The number of water molecules per ion pair (head-group and mobile counter ion) and hydration number (λ) can be further parsed into bound or non-freezable ($N_{bound}$) water and unbound or freezable ($N_{free}$) water. The amount of each can be determined in DSC freezing point measurements. As shown in Table 3, the hydration numbers for the samples tested increased with decreasing cross-linker concentration, similar to the WU. The bound water was calculated by subtracting the free water from hydration number. The results of all the membranes are given in Table 3. All of the membrane samples, regardless of their conductivity, had 6 to 7 bound water molecules per ion pair, while the number of free water molecules ranged from 0 to 6.20 per ion pair. The membrane with highest conductivity (XL5-PNB-$X_{34}$-$Y_{66}$, 198 mS/cm at 80° C.) had 5.21 $N_{free}$ water molecules and 6.00 $N_{bound}$ water molecules per ion pair. On the other hand, the worst performing membrane (XL50-PNB-$X_{34}$—$Y_{66}$, 70.4 mS/cm at 80° C.), had 0.00 $N_{free}$ and 7.40 $N_{bound}$ water molecules per ion pair in the membrane. Representative DSC curves for samples with high and low cross-linking concentration are shown in the supporting information (FIGS. 42-43). Enthalpy integrations of the peak in the cooling curves are annotated in FIGS. 42-43. These peaks were used for calculating the number of freezable waters.

As shown in a previous report for PNB-$X_{54}$-$Y_{46}$, water is able to freely populate high IEC membranes without cross-linking, and the number of $N_{free}$ and $N_{bound}$ water molecules can be as large as 10.6 and 17.9, respectively. At high cross-link density, it is increasingly difficult for water molecules, especially free water, to populate the membranes because of the lack of flexibility within the tightly cross-linked membrane. For uncross-linked membranes that had less than 6 free water molecules per ion pair, the conductivity was less than 70 mS/cm. The conductivity of XL50-PNB-$X_{34}$-$Y_{66}$ was low due to the lack of free water. This shows that some free water is essential for channel hydration and high ion mobility. It is also noted that the number of free waters decreased with higher cross-link density, which is likely due to the restricted connectivity between hydrophilic domains. It is also noted that the domain distance was little changed for the samples with different cross-link density. Hence, an optimization of free and bound water molecules in the membranes is necessary to obtaining maximum efficiency (Liu, L. et al., *J. Polym. Sci. Part A: Polym. Chem.* 2018, 56, 1395-1403; Liu, L. et al., *J. Mater. Chem. A* 2018, 6, 9000-9008)

Figure 19:
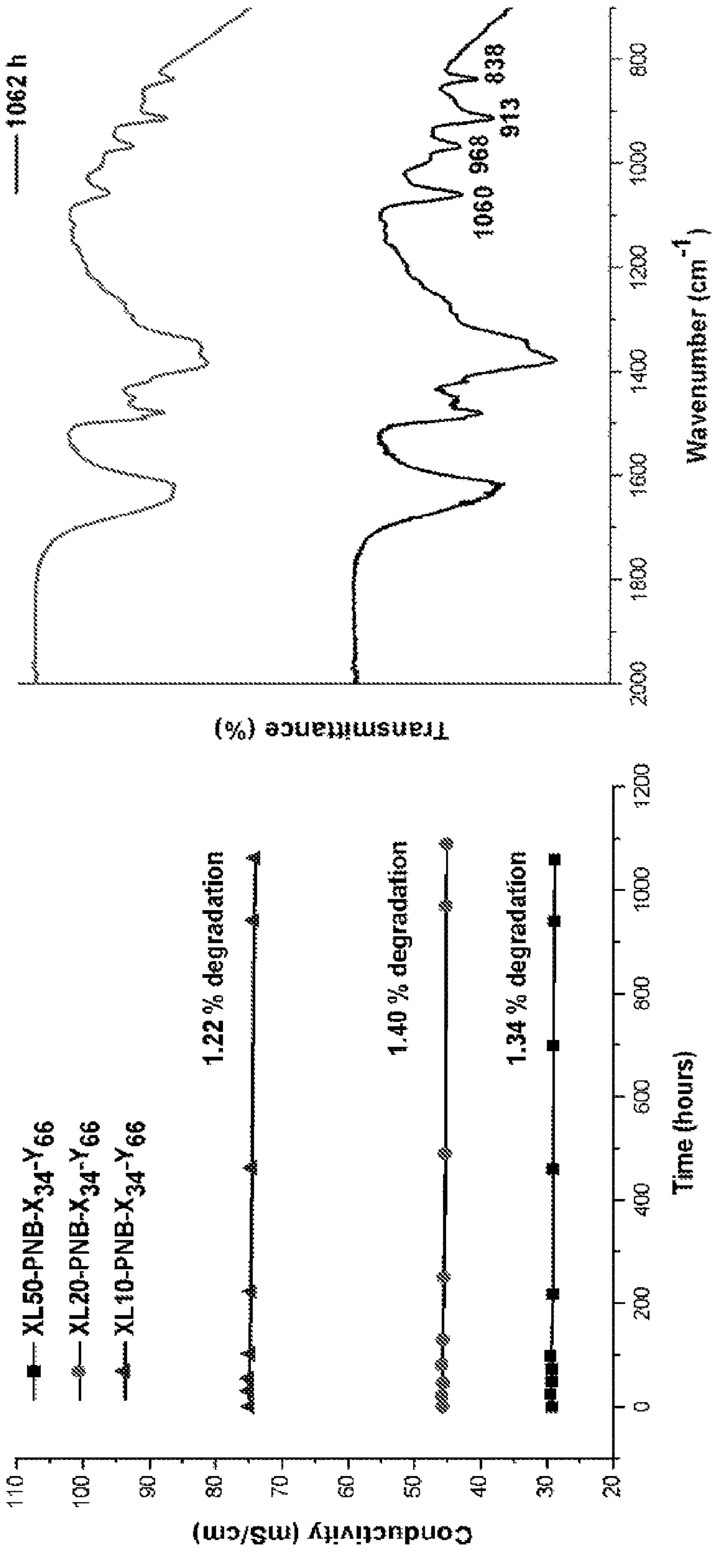
FIG. 19. The alkaline stability of crossed-linked AEMs in 1 M NaOH solution at 80° C. Monitoring the drop in $OH^-$ conductivity over time (left). FT-IR spectra of XL10-PNB-$X_{34}$-$Y_{66}$ for characterization of the chemical structure (right).

Alkaline stability: The long-term alkaline resistance of AEMs is a concern, especially for electrochemical devices operating for thousands of hours at high pH and temperature. The stability measurements were performed by soaking the membranes in freshly prepared 1 M NaOH solution at 80° C. for more than 1000 h. The conductivity was measured periodically during the aging process. It was found that the AEMs lost between 1.22% and 1.40% over the >1000 h aging period, as shown in FIG. 19 (left). Each data point in FIG. 19 is the average of three individual measurements. There was <1% deviation between the individual measurements of each data point. The three measurements varied only in the third significant figure. This value of conductivity loss is low and acceptable for ARPA-E IONICS targets. The conductivity loss for PNB-$X_{68}$-$Y_{32}$ without cross-linking was 0.81% compared to 1.22% loss here for XL10-PNB-$X_{34}$-$Y_{66}$ with 10 mol % cross-linker. Although the loss in conductivity is slightly higher for the samples tested here compared to the values reported previously for poly(norbornene) AEMs without cross-linking, the cross-linked AEMs in this study have significantly higher IEC and less water uptake per ion-pair making the pH inside the membranes higher than for uncross-linked samples. That is, although all the samples were soaked in 1 M NaOH, the local hydroxide concentration within the membranes is different. The hydroxide concentration inside the membrane is better described by $\lambda^{-1}$, the number of hydroxide ions per water molecule. This comparison shows that the hydroxide is 68% more concentrated in the cross-linked AEMs than the previous uncross-linked AEMs. A lower WU per ion pair creates a more alkaline environment within the membrane, which can accelerate the degradation. Additional attempts were made to analyze the AEMs for hydroxide degradation. FTIR analysis of the chemical structure before and after the alkaline aging showed no new peaks, FIG. 19 (right). The C-N stretching frequencies at 838 $cm^{-1}$, 913 $cm^{-1}$, 968 $cm^{-1}$ and 1060 $cm^{-1}$ show that the chemical structure of the membrane is indeed intact (Amel, A. et al., *J. Electrochem. Soc.* 2018, 165, F1133-F1138; Amel, A. et al., *J. Electrochem. Soc.* 2015, 162, F1047-F1055). However, it is noted that FTIR is only semi-quantitative and structural changes at the 1% level are difficult to analyze by this method. It is also noted that quantitative solution NMR analysis is not possible because the samples are no longer soluble due to the cross-linking.

Figure 20:
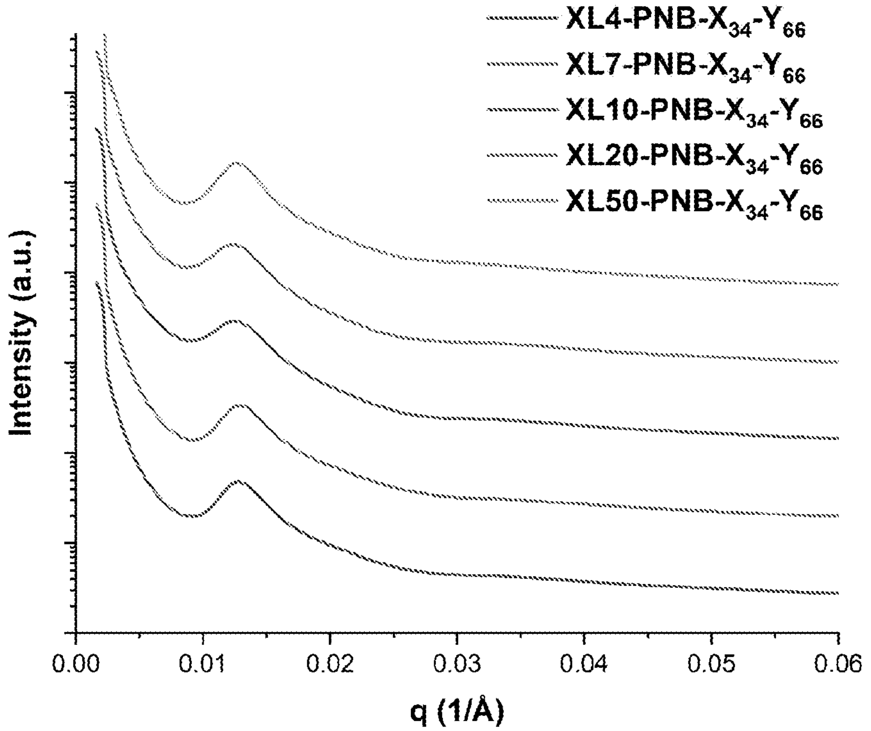
FIG. 20. SAXS spectra of cross-linked tetrablock copolymer poly(BuNB-b-BPNB-b-BuNB-b-BPNB) membranes in bromide form.

Morphological characterization: SAXS was used to investigate the phase segregation and microstructure of the cross-linked poly(norbornene) membranes. During casting, the poly(norbornene) block copolymers phase segregate into ion conduction channels based on the thermodynamic dissimilarities between the halogenated and hydrophobic blocks. Once cross-linking begins to occur, the crosslinking agent further limits the self-assembly, thereby locking in the microstructure of the membrane upon curing. The inter-domain spacing (d-spacing), or the average separation length between inhomogeneities in the membranes, was determined from the Bragg spacing of the primary scattering peak in the SAXS spectra, as shown in FIG. 20. The inter-domain spacing values were determined by a Lorentz curve fitting function and are listed in Table 3. It was found that the domain distance for the polymers with different cross-link densities were all similar, ranging only from 48.6 to 51.8 nm. This is unlike the domain distance for the membranes without crosslinking, which are unhindered and can range from 37.2 to 86.4 nm.

Fuel cell testing: The XL5-PNB-$X_{34}$-$Y_{66}$ was chosen for demonstration is an alkaline fuel cell because it had high ionic conductivity and was chemical stability. The membrane was mechanically robust and easily assembled into the fuel cell hardware. The fuel cell tests were performed at 60° C., which is a common operating temperature. The fuel cell was first conditioned at a cell voltage of 0.5 V for one hour followed by one hour at 0.2 V. After conditioning, the open circuit voltage (OCV) was 1.042 V. A current-voltage voltammogram and impedance spectrum at 0.4 V were periodically recorded. The dew point of the anode and cathode feed gases were set at 52° C. (i.e. 74.8% RH) and 56° C. (i.e. 86.6% RH), respectively.

Figure 21:
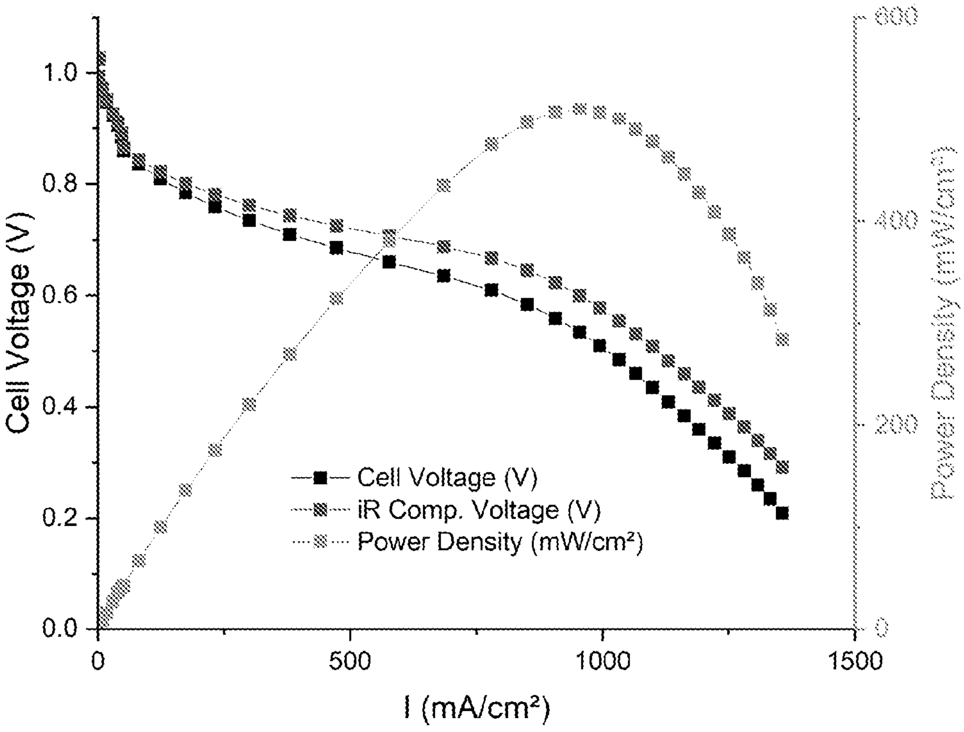
FIG. 21. Polarization data for XL5-PNB-$X_{34}$-$Y_{66}$ AEMFC (2.1 mg $cm^{-2}$ Pt, 40% ionomer to carbon ratio) with and without iR correction. Cell temperature was 60° C. with anode and cathode dew points both set at 52° C. and 56° C., respectively. Flow rates of humidified $H_2$ and $O_2$ were both 0.5 L/min.

FIG. 21 shows the cell voltage and power as a function of the current density. The peak power density was 510 $mW/cm^2$ at 0.534 V and 954 $mA/cm^2$. FIG. 21 also shows the voltage as a function of current density after correction for the iR drop across the membrane. The membrane resistance was 95 mΩ $cm^2$, as obtained from the high frequency intercept of the impedance plot. The iR corrected cell power was 573 $mW/cm^2$. While the power output is modest compared to the 2 $W/cm^2$ cell reported by Wang et al., the membrane electrode assembly used here was not optimized for ionomer and catalyst layer content, the operating temperature was lower (60° C. here vs 80° C. by Wang et al.) and the membrane was thicker than necessary, 64 μm (Wang, L. et al., *J. Mater. Chem. A* 2018, 6, 15404-15412). These fuel cell results show that the membrane can be successful integrated into a working electrochemical device.

In summary, cross-linked anion conductive polymers synthesized via vinyl addition polymerization of norbornenes were studied. The membranes had very high ionic conductivity, up to 198 mS/cm at 80° C. It was found that only light cross-linking was needed to mitigate water swelling problems which have plagued other high IEC AEMs. The cross-linking was light enough so as not to cause problems encountered by highly cross-linked AEMs. The dimensional stability was attributed to cross-link density, which can be tuned to balance the free and bound water content within the membrane. There were 5.21 free water molecules and 6.00 bound water molecules per ion pair within the optimized membrane. Excellent alkaline stability in 1 M NaOH solution at 80° C. was demonstrated (<1.5% conductivity loss in >1000 h at 80° C.). The hydrogen/oxygen fuel cell tests at 60° C. had a peak power density of 510 $mW/cm^2$ at 0.534 V and 954 $mA/cm^2$. These tetrablock copolymers with very high ionic conductivity and alkaline resiliency are excellent candidates for high performance electrochemical devices.

Example 3: Highly Conductive Anion-Exchange Membranes Based on Cross-Linked Poly(Norbornene): Ring Opening Metathesis Polymerization Poly(norbornene) is an attractive polymer backbone for AEMs because a variety of monomers can be synthesized by Diels-Alder reactions (Yang, Z. et al., *Polymer* 2008, 49, 5128-5136). The low molecular weight of the norbornene monomer allows for high IEC. Norbornenes can be polymerized through vinyl addition polymerization or ring-opening metathesis polymerization (ROMP). Coates et al. carried out the ROMP of dicyclopentadiene and tetraalkylammonium-functionalized norbornene to synthesize AEMs with a hydroxide conductivity of 18 mS/cm at 20° C. and IEC of 1.4 meq/g (Clark, T. J. et al., *J. Am. Chem. Soc.* 2009, 131, 12888-12889). The polymer was crosslinked via a metal-cation based route using a bis(terpyridine)Ru(II) complex. The resulting hydroxide conductivity was 28.6 mS/cm at 30° C. with IEC of 1.4 meq/g (Zha, Y. et al., *J. Am. Chem. Soc.* 2012, 134, 4493-4496; Wang, C. et al., *J. Membr. Sci.* 2018, 556, 118-125). In an effort to increase the conductivity, the IEC was increased and crosslinking was introduced to enhance the properties. Wang et al. reported an alkyl cross-linked AEM with an IEC of 2.89 meq/g resulting in a hydroxide conductivity of 64.79 mS/cm at 25° C., however, long-term alkaline stability was not shown. The diphenyloxide crosslinked AEM with IEC of 2.79 meq/g and $OH^-$ conductivity of 40 mS/cm at 30° C. had poor alkaline stability (34% conductivity loss after immersion in 2 M NaOH for 16 days at 50° C.) along with material brittleness (Wang, C. et al., *Macromol. Mater. Eng.* 2018, 303, 1700462). Another hydrogenated poly(norbornene) membrane with an ether-linkage and flexible tether was prepared by Price et al (Price, S. C. et al., *Polym. Chem.* 2017, 8, 5708-5717). The resulting conductivity was 69 mS/cm at 20° C. and 133 mS/cm at 80° C. However, the conductivity degraded by about 50% after soaking in 0.1 M NaOH for 239 h at 90° C. In summary, the state-of-the-art AEMs based on ROMP prepared poly(norbornene)s have generally had low conductivity and/or poor long-term alkaline stability.

In this study, AEMs with all-hydrocarbon backbones using bromopropyl norbornene (BPNB) and butyl norbornene (BuNB) have been created by two different synthetic routes. Both vinyl addition polymerization and ROMP routes have been explored. In this study, the ROMP of norbornene homopolymers and diblock copolymers are disclosed as well as a flexible alkyl tether and a trimethylammonium cation, which was used. The combination of a hydrocarbon poly(norbornene) backbone and tethered quaternary ammonium head-group is shown to produce excellent alkaline stability and high ionic conductivity. In this study, polymers with high IEC, up to 4.73 meq/g, were synthesized and cast into membranes using N,N,N',N'-Tetramethyl-1,6-hexanediamine (TMHDA) as a crosslinking agent. Consequently, a conductivity of 99 mS/cm at 25° C. and 195 mS/cm at 80° C. was achieved with no loss in conductivity after 792 h in 1 M NaOH at 80° C. This is higher than previously reported hydroxide conductivity membranes at 80° C., for chemically stable AEMs.

Materials: Dicyclopentadiene, 5-bromo-1-pentene and 1-hexene were purchased from Alfa Aesar and used as-received. The functionalized monomers, i.e., bromopropyl norbornene (BPNB) and butyl norbornene (BuNB), were synthesized, as described previously (Martínez-Arranz, S. et al., Macromolecules 2010, 43, 7482-7487; Mandal, M. et al., *J. Membr. Sci.* 2019, 570-571, 394-402). The polymerizations were conducted in a glove box (dry nitrogen atmosphere) to avoid moisture and air. Prior to polymerization, the monomers were purified by distillation over sodium and degassed by three freeze-pump-thaw cycles. Tetrahydrofuran (THF), dichloromethane (anhydrous, DCM), sodium bicarbonate ($NaHCO_3$), methanol, tosyl hydrazide, sodium hydroxide, N,N,N',N'-tetramethyl-1,6-hexanediamine (TMHDA), ethyl vinyl ether, trimethylamine solution (TMA, 50 wt %) and toluene were purchased from Sigma-Aldrich and used as-received. The Grubbs' third-generation catalyst (Grubbs' 3rd, G3) was synthesized from Grubbs' second-generation catalyst (purchased from Sigma-Aldrich) and pyridine (Bates, C. M. et al., *Macromolecules* 2015, 48, 4967-4973).

Synthesis of the diblock copolymers and poly(BPNB) homopolymers: The poly(BuNB-b-BPNB) diblock copolymers were synthesized by the sequential addition of the monomers at room temperature in a glove box, as shown in Scheme 3. The materials are designated rPNB-$X_m$-$Y_n$, where rPNB stands for ROMP norbornene, X and Y are the hydrophobic BuNB and hydrophilic BPNB monomers in the polymer, respectively, and m and n are the mol % of the BuNB and BPNB monomers, respectively, as calculated by $^1$H NMR. The homopolymers are designated as rPNB$Y_{100}$ and rPNB-L$Y_{100}$, where $Y_{100}$ stands for homopolymer of BPNB and L$Y_{100}$ stands for homopolymer of BPNB with higher molecular weight.

Scheme 3. Synthesis of the XL-rBPM-$Y_{100}$ homopolymer and XL-rBPN-$X_m$-$Y_n$ diblock AEMs.

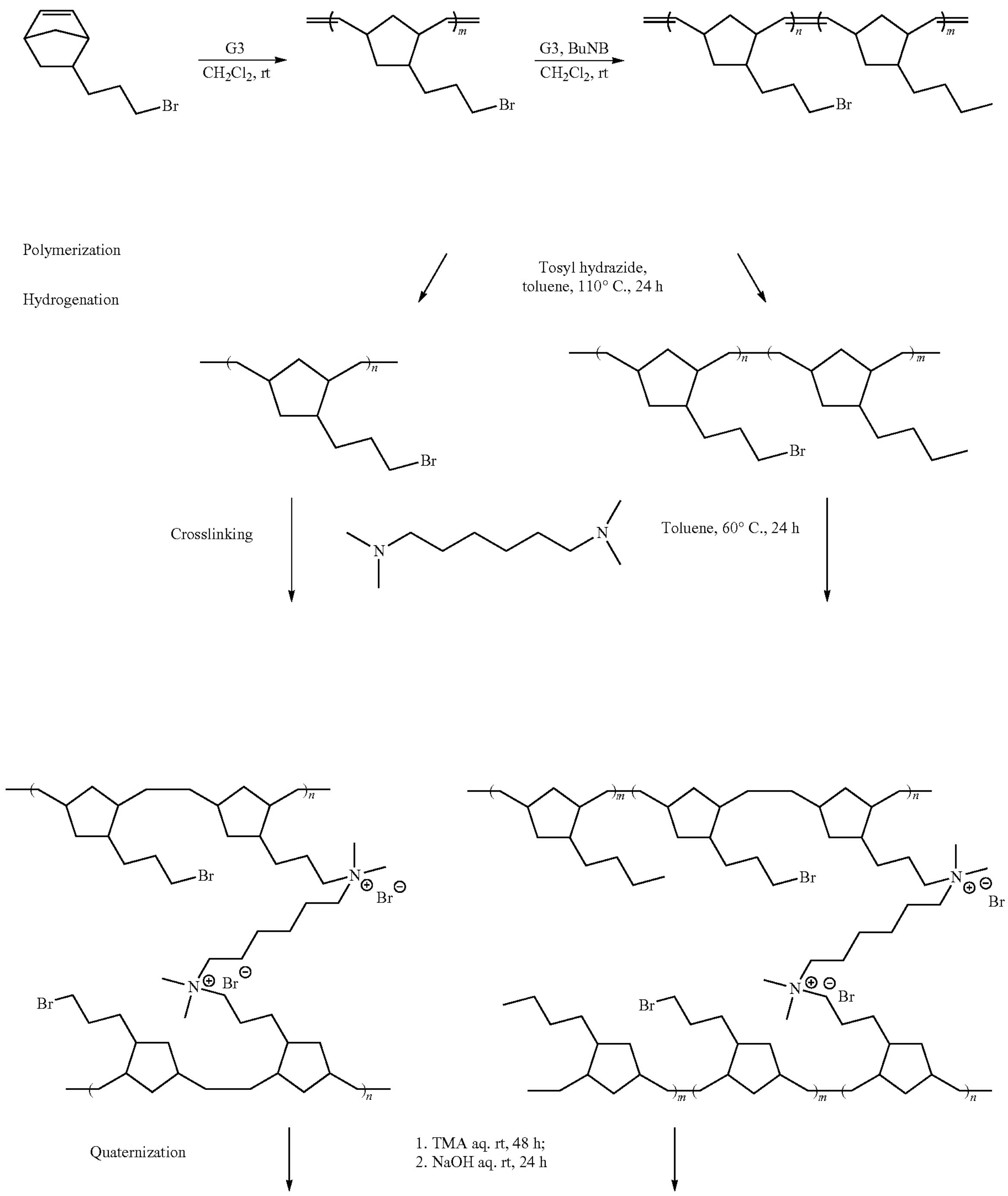

-continued

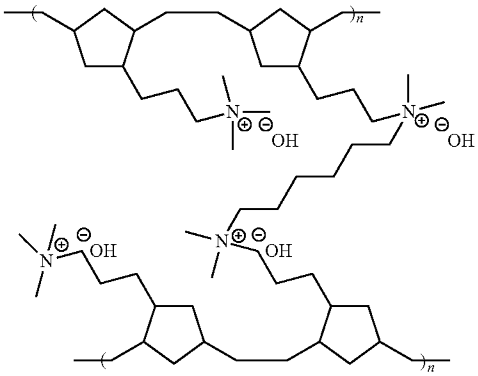

XL-rPNB-$Y_{100}$

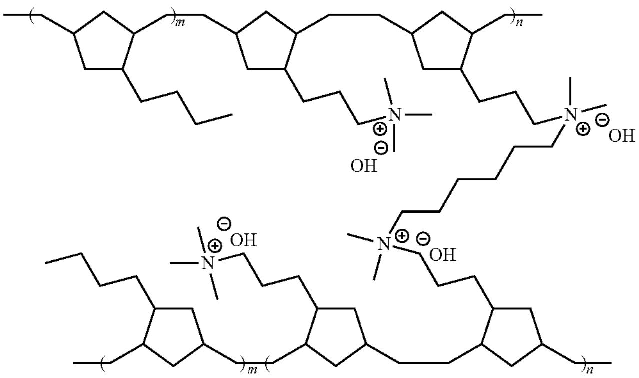

XL-rPNB-$X_m$-$Y_n$

All monomers were purified by distillation and degassed by three freeze-pump-thaw cycles before the polymerization. Grubbs' $3^{rd}$ was dissolved in DCM to make a 0.01 g/ml solution and then stirred for 10 min. The monomer solution (0.01 M) was obtained by dissolving BuNB or BPNB in DCM and stirring for 10 min. The catalyst solution was injected into the BPNB monomer solution under vigorous stirring to prepare the first block, poly(BPNB). After 10 min reaction time, the BPNB polymerization was complete. A small aliquot was removed and quenched with ethyl vinyl ether for gel permeation chromatography (GPC) analysis. A BuNB solution was then added to the reaction solution and stirred for 5 min to add the BuNB block onto the poly (BPNB). After the reaction was complete, ethyl vinyl ether was added to the reaction mixture to quench the polymerization. The mixture was stirred for 30 min. Excess solvent was allowed to evaporate in air and the concentrated polymer solution was precipitated in methanol. The resulting product was precipitated in methanol twice and dried at room temperature overnight. The procedure for poly(BPNB) homopolymers was similar to that for the diblock polymer without the addition of the second, BuNB block.

Hydrogenation of double bonds: The unsaturated ROMP polymer (0.4 g) was dissolved in toluene (50 ml) at room temperature in a two-necked round bottom flask with a reflux condenser (Hayes, C. O. M. Directly-Patternable Benzocyclobutene Dielectric Materials. Ph.D. Thesis, The University of Texas at Austin, Tex., USA, 2016; Yoon, K.-H. et al., *Polymer* 2012, 53, 2290-229). A stoichiometric amount of tosyl hydrazide (1:6 ratio of the double bond to hydrazide) was added to the polymer solution. The solution was purged with nitrogen gas for 30 min to remove dissolved oxygen. The mixture was stirred at 110° C. for 24 h under nitrogen gas. The solution was then cooled to room temperature and washed three times with saturated $NaHCO_3$ solution (500 mL each time) until the reaction solution was transparent. The polymer solution was concentrated by removing toluene at room temperature overnight and the product was precipitated in methanol.

Preparation of the crosslinked AEMs: The hydrogenated polymer (0.15 g) was dissolved in 6 mL toluene. The crosslinking reagent, TMHDA, was dissolved in 1.5 ml toluene and added to the polymer solution. The mixture was stirred for 30 min at room temperature and then filtered through a 0.45 μm poly(tetrafluoroethylene) membrane syringe filter into an aluminum dish. The solution was dried at 60° C. for 24 h, by which time the crosslinking reaction was completed. The term 'cross-linker concentration' is the mol % of cross-linking compound (i.e. TMHDA) added to the polymer mixture with respect to the number of cross-linkable sites within the polymer. It is noted that while the cross-linking agent may fully react with sites on the polymer, it was not determined what fraction of the cross-linking reaction occurred between intramolecular sites vs. intermolecular sites. The membranes were peeled off the aluminum dish and immersed in TMA at room temperature for 48 h to quaternize the bromopropyl head groups. The quaternized membrane in bromide form was washed thoroughly with DI water and soaked in 1 M NaOH for 24 h under nitrogen to exchange the Bf ions for Off ions. The crosslinked AEMs are denoted as XLp-rPNB-$X_m$-$Y_n$ and XLp-rPNB-$Y_{100}$ for the diblock and homopolymer membranes, respectively, where XL means cross-linking and p is the cross-linker concentration.

Material characterization: $^1$H NMR spectroscopy was performed using a Bruker Avance 400 MHz NMR spectrometer, tetramethylsilane as an internal standard and $CDCl_3$ as the solvent. The number average molecular weight ($M_n$) and polydispersity index ($M_w/M_n$) of the polymers were obtained by GPC analysis (Shimadzu) equipped with a LC-20 CE HPLC pump and a refractive index detector (RID-20 A, 120 V). All the measurements were performed in THF with the eluent flow rate of 1.0 mL $min^{-1}$ at 30° C. A polystyrene standard was used. The in-plane hydroxide conductivity was measured using a four-electrode probe and an electrochemical impedance spectrometry (1 Hz to 1 MHz) with a PAR 2273 potentiostat. HPLC-grade water with a nitrogen purge was used. Water uptake (WU), swelling ratio (SR) and hydration number (λ) were determined, as described in the accompanying paper. The numbers of bound water (nonfreezable, $N_{bound}$) and freezable water ($N_{free}$) were determined by differential scanning calorimetry (DSC). DSC measurements were carried out on a Discovery DSC with autosampler (TA Instruments). The fully-hydrated membrane without surface water (5 to 10 mg) was sealed in an aluminum pan, cooled to −50° C. and then heated to 30° C. at a rate of 5° C./min under 20 mL/min $N_2$ flow to determine $N_{bound}$ and $N_{free}$. DSC was also used to measure the glass transition temperature ($T_g$) of the AEMs at a heating rate of 20° C./min. Each membrane was temperature cycled between 20° C. and 200° C. to obtain $T_g$.

Thermogravimetric analysis (TGA) was conducted on a TA Instruments Q50 analyzer with 5 to 10 mg dry membrane in bromide form. The temperature was ramped from room temperature to 800° C. at a heating rate of 10° C./min in a nitrogen atmosphere. The mechanical properties of the fully hydrated and dry membranes were measured with a SANS CMT8102 stretching tester (Xinsansi Co., China) at a stretch rate of 5 mm/min Alkaline stability was tested by soaking the AEMs in 1 M NaOH solution at 80° C. in a teflon-lined Parr reactor. The conductivity of the treated AEMs was measured at 25° C. vs. time after the complete removal of the residual NaOH. Moreover, the AEMs were also studied by FTIR before and after alkali treatment to further confirm the chemical structures.

Transmission electron microscopy (TEM): TEM was performed on dry AEM samples in $Br^-$ form to qualitatively observe the phase segregated microstructure of the membranes. Each membrane was embedded in epoxy and sectioned by Microtone. The membranes were stained with F by immersing in a NaI solution (2.0 M) for 2 days at 80° C. and measured by a JEOL JEM-2000EX microscope (Lee, K. H. et al., *Energy Environ. Sci.* 2017, 10, 275-285).

Small angle X-ray scattering (SAXS): SAXS was also used to analyze the phase segregation of block copolymer AEMs. Hydrated membranes in bromide form were tested in air using the NSLS-II beamline at the Center for Functional Nanomaterials (Brookhaven National Laboratory, Upton, N.Y.). The wave vector (q) was calculated using Equation 1, where 2θ is the scattering angle.

$$q = \frac{4\pi}{l \sin 2\theta} \tag{1}$$

The characteristic separation length, or inter-domain spacing (d) (i.e. the Bragg spacing) was calculated using Equation 2.

$$d = \frac{2\pi}{q} \tag{2}$$

$H_2/O_2$ fuel cell measurements: The AEM anode and cathode were fabricated via a previously used slurry method and were identical in composition (Ahlfield, J. et al., *J. Electrochem. Soc.* 2017, 164, F1648-F1653). A poly(norbornene) ionomer powder with lower molecular weight (20.5 kDa) was first synthesized according to the previous work. The dry ionomer powder and 50% platinum on Vulcan XC-72 (carbon) catalyst were ground together with a mortar and pestle in isopropyl alcohol (IPA) to achieve the proper slurry for spraying. After sonicating for 30 min, the homogenized catalyst and ionomer slurry was sprayed onto 1% water-proofed Toray TGPH-060 carbon paper and dried for 24 h at room temperature. The metal loadings on electrodes were ~2.1 mg/cm and an ionomer/carbon ratio of 40% was used. The electrodes were converted to $OH^-$ form by soaking in 1 M NaOH for 2 h with a $N_2$ purge. The NaOH solution was refreshed every 20 min. The electrodes and ROMP poly(norbornene) diblock AEMs were placed into Fuel Cell Technologies hardware for the test in a Scribner 850e Fuel Cell Test Station at 60° C. The dew points of the $H_2$ and $O_2$ gas feeds (0.5 L $min^{-1}$) were adjusted throughout the testing to optimize the water balance within the fuel cell.

Figure 22:
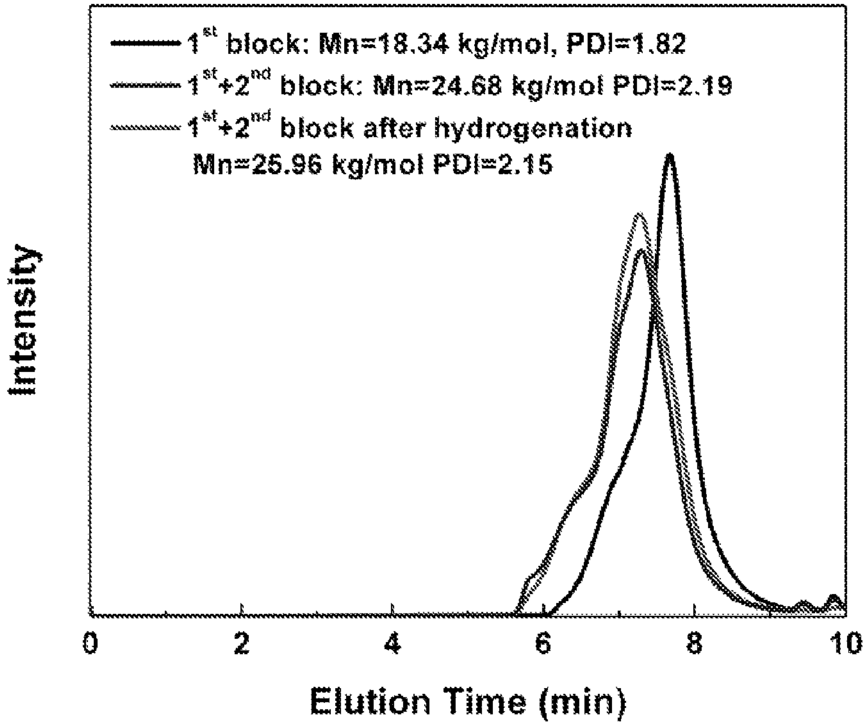
FIG. 22. GPC-R1 traces of the rPNB-$X_{60}$-$Y_{40}$ for the first block and diblock aliquot (before and after hydrogenation).

Experimental Results: rPNB-$X_m$-$Y_n$ diblock copolymers and rPNB-$Y_{100}$/rPNB-$LY_{100}$ (poly(BPNB)) hydrophilic homopolymers were synthesized in this study. The monomers (BuNB and BPNB) were prepared according to previous reports. The Grubbs' third-generation catalyst (G3) was synthesized from Grubbs' second-generation catalyst and pyridine. BPNB ($[M]_0$/[G3]=100:1) was reacted for 10 min, whereas BuNB ($[M]_0$/[G3]=20:1) was reacted for 5 min to grow the diblock copolymers. The polymerization time was optimized for the individual monomer additions and their feed ratios. The representative GPC traces of rPNB-$X_{60}$-$Y_{40}$ are shown in FIG. 22 to demonstrate the sequential growth of each block during the formation of the diblock copolymer. After completion of the first block, the $M_n$ was 18.34 kDa and $M_n/M_w$ was 1.82. The addition of the second monomer led to a higher $M_n$, 24.68 kg/mol and $M_n/M_w$ of 2.19, showing the successful addition of the second block. The GPC traces of the diblock copolymer before and after hydrogenation had a similar trend and $M_n$ (24.68 vs. 25.96 kg/mol). This shows that no side reactions occurred during hydrogenation. The $M_n$ values of the synthesized polymers were kept constant in order to study the relationship between the different copolymers. The mechanical properties of the homopolymer (rPNB-$Y_{100}$) were poor. Thus, a higher $M_n$ homopolymer (rPNB-$LY_{100}$) was also synthesized, as shown in Table 4. For [BPNB]/[G3]=200:1, the length consisted of 129 repeat units (25 min reaction time). A higher molecular weight homopolymer was produced by using a higher BPNB-to-G3 ration (i.e. 500:1) and extending the reaction time to 2 h. The resulting homopolymer had 198 repeat units.

TABLE 4

Molecular weight and $IEC_{NMR}$ of the synthesized polymers.

| Polymers | Expected Y/X monomer ratio[a] | Actual Y/X monomer ratio[b] | Mol % of BPNB/BuNB[c] | $M_n$ (kDa)[d] | $M_w/M_n$[d] | $IEC_{NMR}$ (meq/g)[c] |
|---|---|---|---|---|---|---|
| rPNB-$X_{60}$-$Y_{40}$ | 100/100 | 85/42 | 40/60 | 24.68 | 2.20 | 2.31 |
| rPNB-$X_{22}$-$Y_{78}$ | 100/20 | 98/22 | 78/22 | 24.08 | 2.37 | 3.95 |
| rPNB-$Y_{100}$ | 200/0 | 129/0 | 100/0 | 27.73 | 1.63 | 4.73 |
| rPNB-$LY_{100}$[f] | 500/0 | 198/0 | 100/0 | 42.47 | 2.54 | 4.73 |

[a]Calculated from the feed ratio of monomers;
[b]GPC results;
[c]Mol % and IEC determined by $^1H$ NMR;
[d]GPC data in THF versus polystyrene standards.

Figure 23:
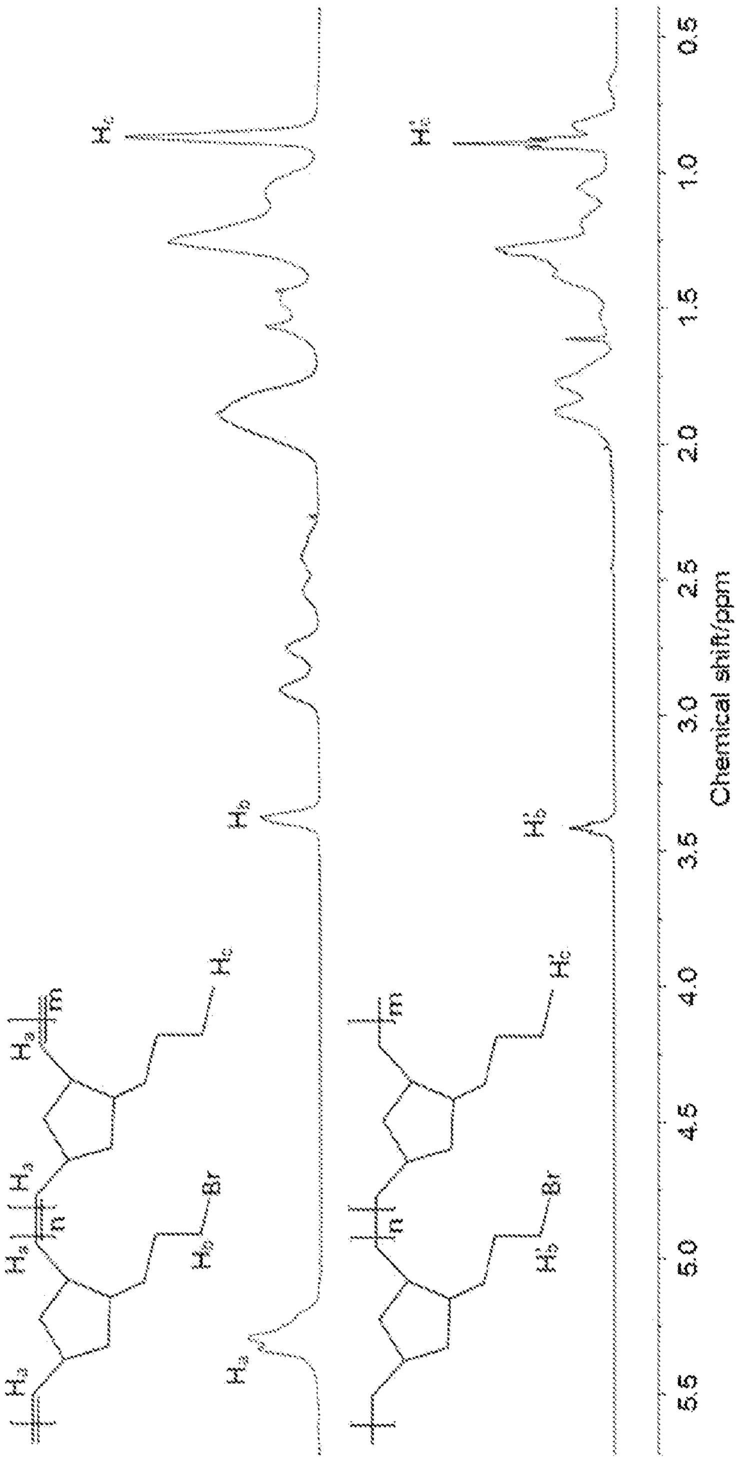
FIG. 23. $^1$H NMR spectra of the diblock copolymer before and after hydrogenation.

The $^1H$ NMR spectra of the diblock copolymer before and after hydrogenation are shown in FIG. 23. The signal at 5.33 ppm ($H_a$) is from the protons in the double bond on the polymer backbone. The characteristic signal of the protons in the terminal methyl group of the butyl side-chain is at 0.89 ppm ($H_e$), and the methylene protons (—$CH_2Br$) adjacent to the bromine atom in bromopropyl side-chain are at 3.40 ppm ($H_b$). The mole ratio (R) of the BuNB-to-BPNB block was calculated by comparing the NMR integration ratio for the $H_c$ and $H_b$ protons ($R=2I(H_c)/3I(H_b)$). The IEC values for the polymers in $OH^-$ form were determined by $IEC_{NMR}=1000/(150R+213)$, where 150 and 213 are the molecular weights of the BuNB and quaternized BPNB (in $OH^-$ form) repeat units, respectively. The $IEC_{NMR}$ for the synthesized polymers ranged from 2.31 to 4.73 meq/g (Table 4).

The carbon-carbon double bond in the poly(norbornene) backbone was hydrogenated to improve the chemical stability of the polymer (Zhu, T. et al., *Angew. Chem., Int. Ed.* 2018, 57, 2388-2392). After hydrogenation, the NMR peak corresponding to the protons at the double bond ($H_a$) was absent, which shows complete hydrogenation of the double bonds.

Figure 24:
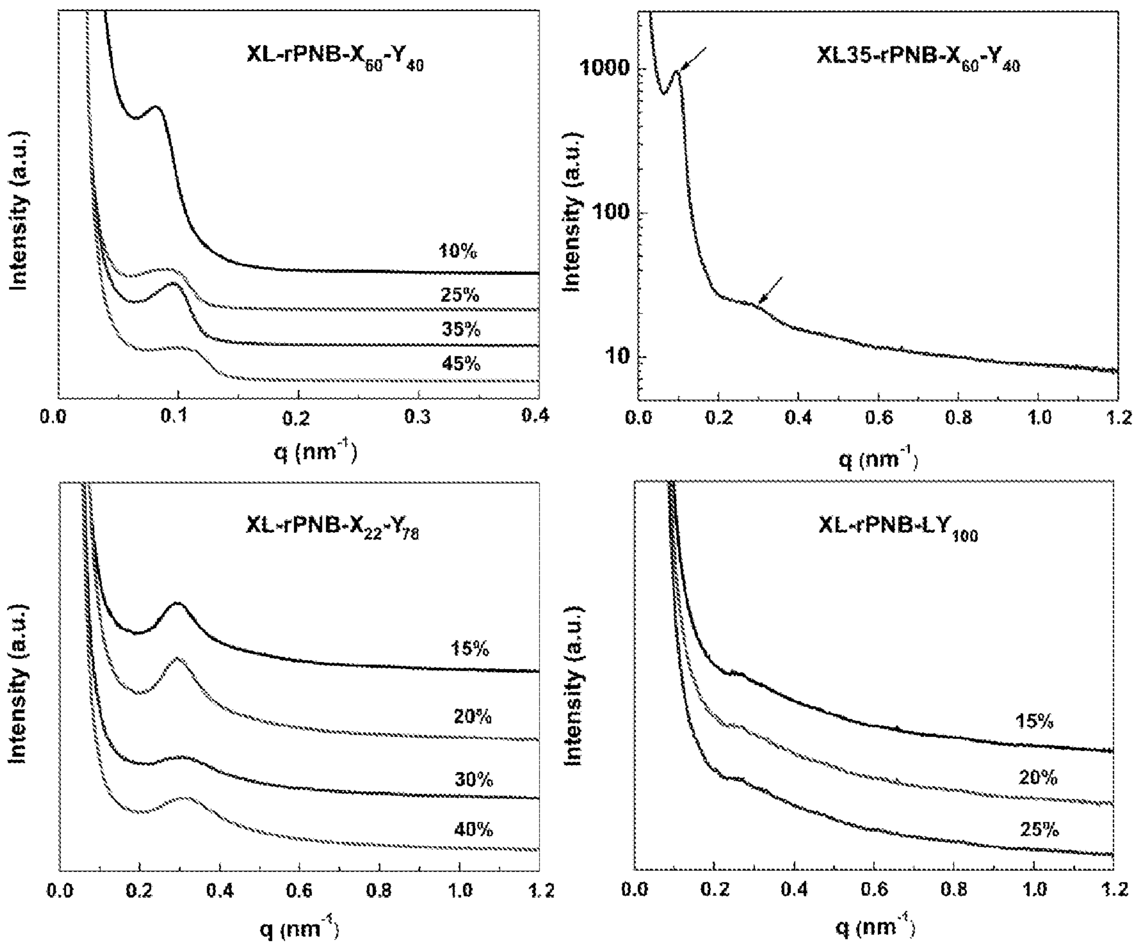
FIG. 24. SAXS spectra of the dry membranes in $Br^-$ form (the numbers are the cross-linker concentrations).
Figure 25:
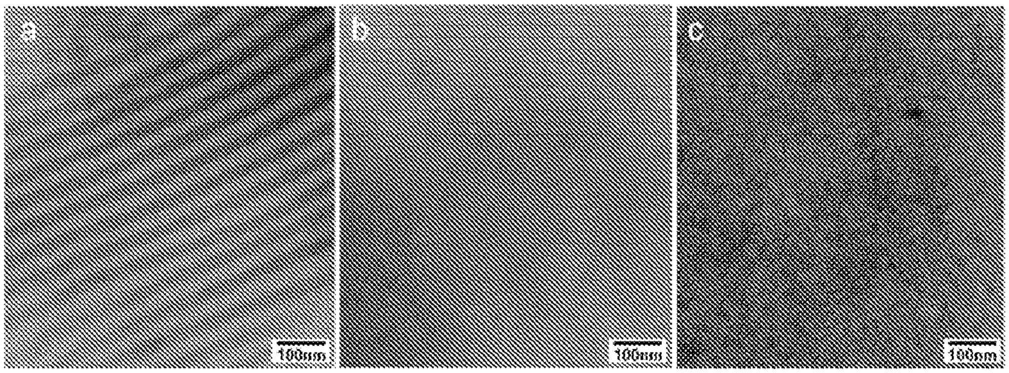
FIG. 25. TEM micrographs of the XL35-rPNB-$X_{60}$-$Y_{40}$ (a), XL20-rPNB-$X_{22}$-$Y_{78}$ (b) and XL20-rPNB-$LY_{100}$ (c) membranes in $Br^-$ form.

Micro phase segregation: The segregation of the hydrophilic and hydrophobic regions of the cross-linked polymer was investigated by SAXS and TEM (FIGS. 24 and 25, respectively). The inter-domain spacing (d) was established to be $2\pi/q$ and listed in Table 5. Well-resolved peaks were observed in the cross-linked diblock rPNB-$X_{60}$-$Y_{40}$ membranes. The SAXS peak shifted from 0.08 $nm^{-1}$ to 0.10 $nm^{-1}$ when the cross-linker concentration was changed from 10 mol % to 45 mol %. This corresponds to a decrease in domain size (d) from 78.64 to 62.71 nm (Table 5). This suggests that the higher cross-linker concentration slightly narrows the size of the ionic channels. Close inspection of XL35-rPNB-$X_{60}$-$Y_{40}$ shows that there are two peaks and the q vector ratio is 1:2, which indicates a lamellar polymer morphology. The XL-rPNB-$X_{22}$-$Y_{78}$ membrane had only one peak at a higher q value (~0.30 $nm^{-1}$), corresponding to a smaller domain size (~21 nm) and less micro-phase segregation. These results are consistent with the TEM images shown in FIG. 25. In FIG. 25, the dark regions correspond to the hydrophilic domains and lighter regions correspond to hydrophobic domain.

clusters decreased from 25.68 nm to 23.05 nm, which is larger than those in the AEMs with low IEC values (Chen, W. et al., *J. Membr. Sci.* 2016, 514, 613-621; Wu, X. et al., *J. Mater. Chem. A* 2014, 2, 12222-12231).

3.1.9. Ion exchange capacity (IEC) and water uptake (WU): High IEC can contribute to high anion conductivity within the membrane, assuming the anion-cation pairs are ionized and the anions have high mobility. Unfortunately, high IEC can also cause high, unacceptable water uptake and ion channel flooding, which decreases hydroxide mobility. The IEC of the polymers in this study varied from 2.31 to 4.73 meq/g, Table 4. The relatively low molecular weight of bromopropyl norbornene allowed for the synthesis of an all-hydrocarbon polymer backbone with exceptionally high IEC. There is a general trend of higher WU with a lower degree of cross-linking. Polymer with high IEC and low cross-linker concentration was soluble in aqueous TMA during amination. Thus, the focus of this study is on the cross-linked polymers.

WU is necessary for ion solvation and conduction. There is a general correlation between WU and swelling ratio for a particular polymer backbone at a specific cross-linker concentration, as shown here in FIG. 26. The WU more inversely correlates with cross-linking WU also correlates with IEC (at the same cross-linker concentration) but to a lesser extent than cross-linking. For each series of AEMs, WU values were similar, for the same cross-linker concentration. For example, at 20 mol % cross-linker concentration, the highest water uptake was 157% for XL20-rPNB-$X_{22}$-$Y_{78}$ (3.78 meq/g), while the lowest value was 115% for XL20-rPNB-$LY_{100}$ (4.51 meq/g). However, for AEMs based on the same polymer, WU dramatically changed with the cross-linker concentration. For instance, XL-rPNB-$LY_{100}$ showed the lowest WU of 79% at 25 mol % cross-linker concentration, whereas the highest WU was 224% at 15 mol % cross-linker concentration. For all prepared AEMs, WU varied from 40% to 400%, while the swelling ratio varied

TABLE 5

Properties of the XL-rPNB membranes.

| AEMs | XL, mol % | $IEC_{NMR}$, meq/g | WU, % | λ | $N_{free}$ | $N_{bound}$ | σ/IEC (80° C.) | $\sigma_{OH}$, mS/cm 25° C. | $\sigma_{OH}$, mS/cm 80° C. | SR, % | d, nm |
|---|---|---|---|---|---|---|---|---|---|---|---|
| XL10-rPNB-$X_{60}$-$Y_{40}$ | 10 | 2.26 | 216 | 53 | 5.64 | 47.45 | 30.97 | 36 | 70 | 40 | 78.64 |
| XL35-rPNB-$X_{60}$-$Y_{40}$ | 35 | 2.20 | 100 | 25 | 5.76 | 19.49 | 49.55 | 53 | 109 | 28 | 66.07 |
| XL45-rPNB-$X_{60}$-$Y_{40}$ | 45 | 2.17 | 57 | 15 | 2.50 | 12.09 | 31.34 | 33 | 68 | 20 | 62.71 |
| XL20-rPNB-$X_{22}$-$Y_{78}$ | 20 | 3.78 | 157 | 23 | 6.59 | 16.48 | 45.24 | 92 | 171 | 46 | 21.64 |
| XL30-rPNB-$X_{22}$-$Y_{78}$ | 30 | 3.71 | 103 | 15 | 3.95 | 11.47 | 43.40 | 81 | 161 | 27 | 21.09 |
| XL40-rPNB-$X_{22}$-$Y_{78}$ | 40 | 3.63 | 93 | 14 | 2.60 | 11.63 | 42.70 | 77 | 155 | 26 | 20.57 |
| XL15-rPNB-$LY_{100}$ | 15 | 4.56 | 224 | 27 | 4.98 | 22.31 | 31.14 | 75 | 142 | 45 | 25.68 |
| XL20-rPNB-$LY_{100}$ | 20 | 4.51 | 115 | 14 | 5.68 | 8.48 | 43.24 | 99 | 195 | 28 | 25.42 |
| XL25-rPNB-$LY_{100}$ | 25 | 4.45 | 79 | 10 | 3.72 | 6.14 | 33.71 | 74 | 150 | 18 | 23.05 |

XL is cross-linker concentration; IEC was calculated based on $^1H$ NMR (including the mass of the TMHDA); λ is hydration number; $N_{free}$ is the number of freezable water molecules; $N_{bound}$ is the number of bound, non-freezable water molecules; SR is swelling ratio; d-spacing (nm) was calculated from SAXS data.

As expected, the homopolymer, XL-rPNB-$LY_{100}$, showed very little sign of phase segregation. Only one weak peak (forming a shoulder in the SAXS) was observed. These small peaks are due to isolated ionic clusters, as shown in FIG. 24. This lack of obvious phase segregation is in contrast to the results for block copolymers which can be highly effective in creating phase segregated, high-mobility ion conduction channels. This was also concluded in the accompanying paper concerning vinyl-addition poly(norbornene). When the cross-linker concentration was increased from 15 mol % to 25 mol %, the size of ionic from 18% to 53% at room temperature. It was not possible to test the swelling ratio of XL-rPNB-$Y_{100}$ AEMs due to membrane brittleness.

Figure 26:
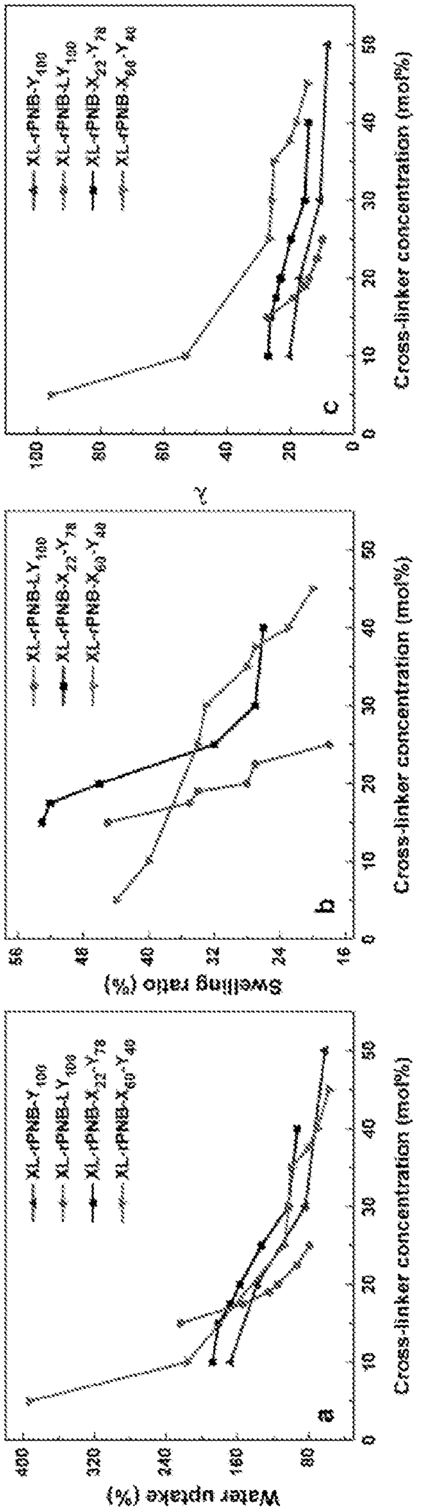
FIG. 26. Water uptake (panel a), swelling ratio (panel b) and X (panel c) of the membranes as a function of cross-linker concentration at 25° C.

The hydration number (λ), the average number of water molecules per ion pair, for each polymer is tabulated in Table 5. FIG. 26 shows the degree of solvation of each ion pair within the polymer versus the cross-linker concentration. At the similar molecular weight and cross-linker concentration, the X, value for the different AEMs (i.e. XL-rPNB-$X_{60}$-$Y_{40}$, XL-rPNB-$X_{22}$-$Y_{78}$ and XL-rPNB-$Y_{100}$) is analyzed. The diblock XL-rPNB-$X_{60}$-$Y_{40}$ AEM with the lowest IEC had the highest value compared to the other two AEMs, showing that well-ordered hydrophilic lamellar domains in the XL-rPNB-$X_{60}$-$Y_{40}$ aided in water absorption. The highest IEC polymer, XL-rPNB-$Y_{100}$, had the lowest λ, showing that the ion channels did not swell as easily as the others.

The hydration numbers were further parsed into the number of freezable (or free) waters ($N_{free}$) and bound water molecules ($N_{bound}$) by DSC freezing point measurements. A higher degree of crosslinking caused both the $N_{free}$ and $N_{bound}$ waters to decrease, which is consistent with established trends. For each polymer, there is an optimum cross-linker concentration to achieve the highest mobility. Insufficient WU (i.e. high cross-linker concentration) leads to low mobility while excessive WU (low cross-linker concentration) enables ion channel flooding (Liu, L. et al., *J. Mater. Chem. A* 2018, 6, 9000-9008). For example, XL15-rPNB-$LY_{100}$ (15 mol % cross-linker concentration) had 4.98 $N_{free}$ and 22.31 $N_{bound}$ waters. High WU caused flooding of the ion channels and dilution of the hydroxide resulting in only 75 mS/cm conductivity and relatively low ion mobility, as measured by σ/IEC=31.14. Increasing the cross-linker concentration from 15 mol % to 20 mol % resulted in about the same $N_{free}$ (5.68), however, $N_{bound}$ was lower (8.48) which gave higher conductivity, 99 mS/cm at 25° C. The conductivity increase is due to higher ion mobility, σ/IEC=43.24. Further increasing the cross-linker concentration to 25 mol % resulted in insufficient WU with $N_{free}$=3.72 and $N_{bound}$=6.14. This level of WU was less effective in terms of mobility and 6/IEC decreased to 33.71. The result is similar to that of the 15 mol % cross-linker concentration sample.

The diblock AEMs with the highest conductivity, XL35-rPNB-$X_{60}$-$Y_{40}$ and XL20-rPNB-$X_{22}$-$Y_{78}$ had similar $N_{free}$ (5.76 and 6.59, respectively) and $N_{bound}$ (19.49 and 16.48, respectively). However, the homopolymer (XL20-rPNB-$LY_{100}$) with the lowest $N_{free}$ (5.68) and $N_{bound}$ (8.48) had the highest conductivity among all the AEMs. The mobility was high as evidenced by σ/IEC=43.24. This shows that the ROMP homopolymer with 20 mol % cross-linker concentration made effective use of the WU with adequate water for high mobility without channel flooding.

Figure 27:
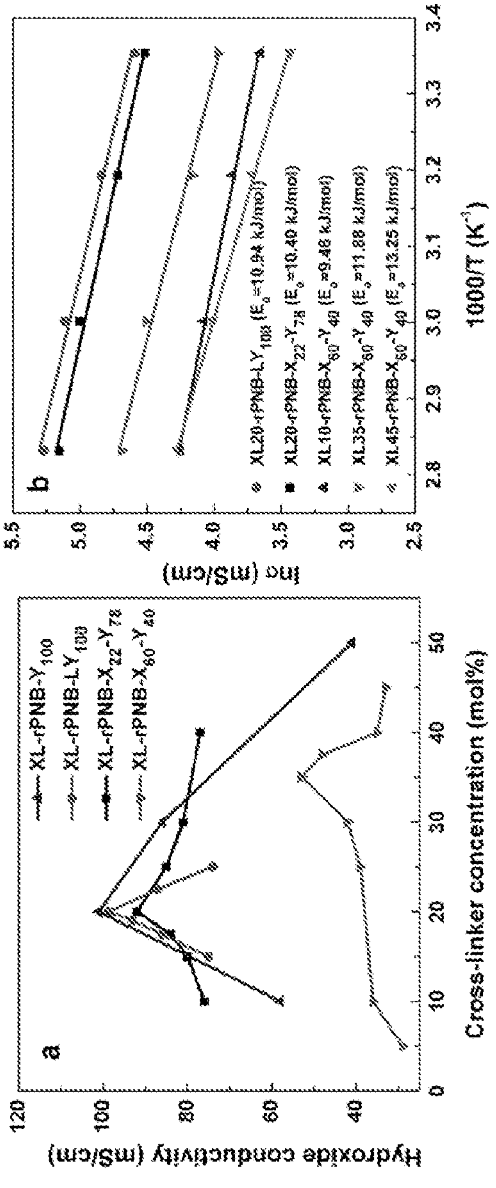
FIG. 27. Hydroxide conductivity of the membranes as a function of cross-linker concentration (panel a) and Arrhenius plots of the XL-rPNB membranes (panel b).

The conductivity vs. cross-linker concentration data is summarized in FIG. 27. The hydroxide mobility (and hydroxide conductivity) is highly influenced by the amount of cross-linker. As the amount of cross-linker increased in the samples, the conductivity peaked at 103 mS/cm (at 25° C.) with a cross-linker concentration of 20 mol % for the XL20-rPNB-$Y_{100}$. Although the XL20-rPNB-$Y_{100}$ had the highest conductivity among all AEMs reported in this study, its mechanical properties were poor. The mechanical properties were improved by increasing the molecular weight of the polymer, XL20-rPNB-$LY_{100}$, which had excellent conductivity (99 mS/cm at 25° C. and 195 mS/cm at 80° C.). The conductivities reported here are higher than the ROMP AEMs reported in the literature, mostly due to the high IEC value of poly(norbornene) (Zhao, Y. et al., Int. *J. Hydrogen Energy* 2016, 41, 16264-16274)

The hydroxide transport activation energy ($E_a$) (Li, X. et al., *ACS Appl. Mater. Interfaces* 2014, 6, 7585-95; Chen, W. et al., *J. Mater. Chem. A* 2017, 5, 15038-15047) was calculated and shown in FIG. 27. For XL-rPNB-$X_{60}$-$Y_{40}$, as the cross-linker concentration increased from 10 mol % to 45 mol %, the $E_a$ increased from 9.46 to 13.25 kJ/mol. For high-IEC AEMs (i.e., XL20-rPNB-$LY_{100}$ and XL20-rPNB-$X_{22}$-$Y_{78}$), their $E_a$ values are about the same (10.94 kJ/mol and 10.40 kJ/mol, respectively), indicating similar hydroxide environments in the AEMs.

Figure 28:
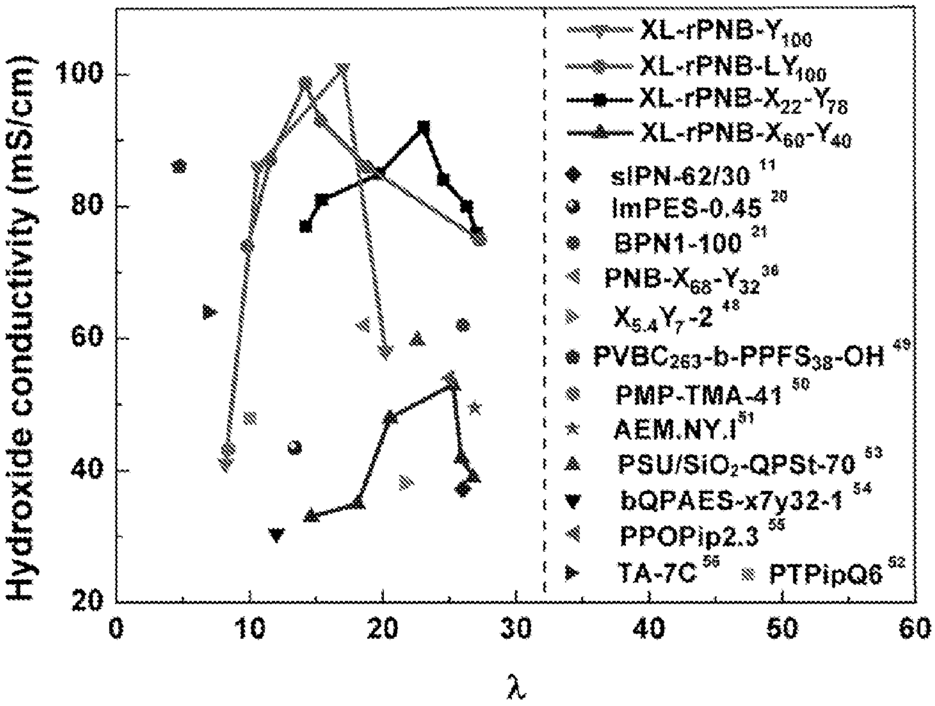
FIG. 28. Hydroxide conductivity of the XL-rPNB AEMs as a function of hydration number (2) compared with AEMs reported in the literature (20° C.-30° C.).

A different way to examine the data is to plot conductivity as a function of λ at 25° C., FIG. 28. FIG. 28 shows the region (low λ) where there is insufficient water, and the region of excess swelling (high λ). High λ values lead to ion channel flooding and a decline in conductivity. At λ<20, the homopolymer AEMs had relatively high conductivity compared to the diblock AEMs (XL-rPNB-$X_{22}$-$Y_{78}$ and XL-rPNB-$X_{6}$-$Y_{40}$). For example, XL20-rPNB-$LY_{100}$ (λ=14) had hydroxide conductivity of 99 mS/cm, while the XL40-rPNB-$X_{22}$-$Y_{78}$ had conductivity of 77 mS/cm. Compared with other AEMs reported in the literature (Liu, L. et al., *J. Mater. Chem. A* 2016, 4, 16233-16244; Zhu, M. et al., *J. Membr. Sci.* 2018, 554, 264-273; Zhang, M., et al., *ACS Appl. Mater. Interfaces* 2016, 8, 23321-23330; Abouzari-lotf, E. et al., *J. Mater. Chem. A* 2017, 5, 15326-15341; Olsson, J. S. et al., *Adv. Funct. Mater.* 2018, 28, 1702758; He, G. et al., *ACS Appl. Mater. Interfaces* 2017, 9, 28346-28354; Zhang, X. et al., *Polym. Chem.* 2018, 9, 699-711; Olsson, J. S. et al., *Macromolecules* 2017, 50, 2784-2793; Ge, Q. et al., *ACS Appl. Mater. Interfaces* 2015, 7, 28545-53), the XL-rPNB AEMs had higher conductivity at moderate k (10 to 30), suggesting XL-rPNB AEMs are promising candidates for the electrochemical applications.

Figure 29A:
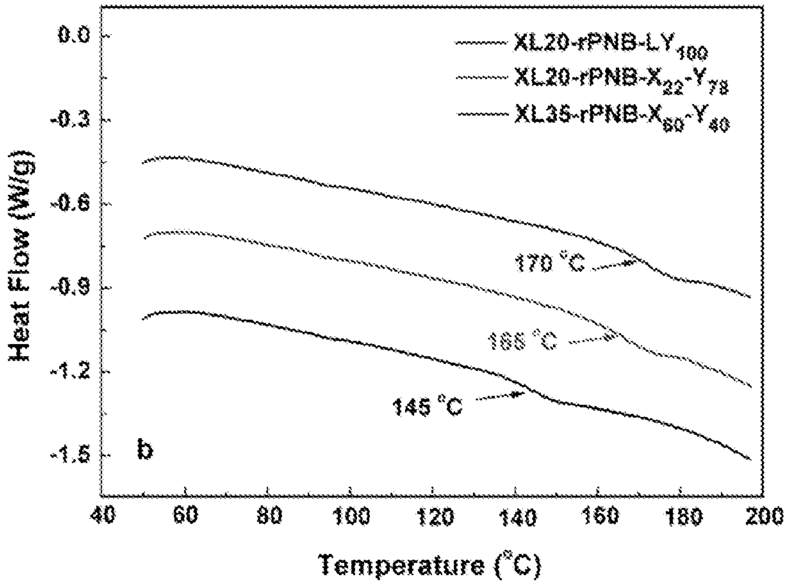
FIG. 29A. Endothermic DSC thermograms of the XL35-rPNB-$X_{60}$-$Y_{40}$, XL20-rPNB-$X_{22}$-$Y_{78}$ and XL20-rPNB-$LY_{100}$ in $Br^-$ form. To avoid overlaps, the graphs are vertically shifted.
Figure 29B:
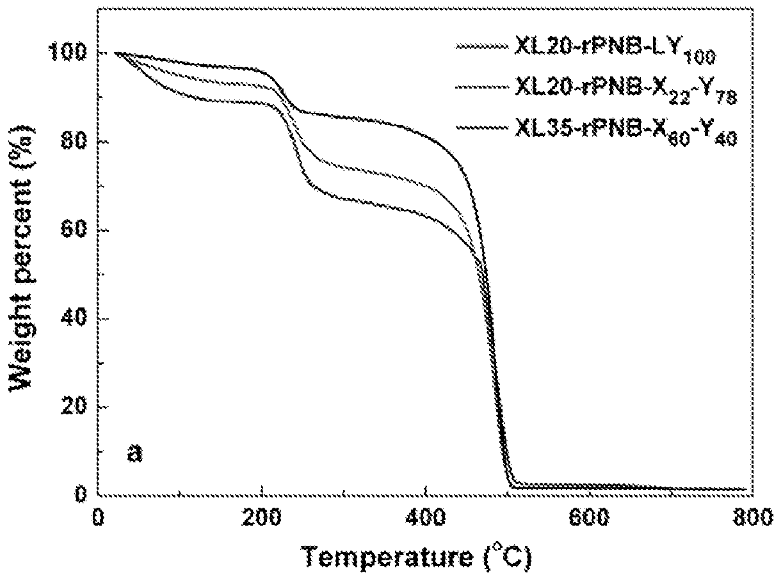
FIG. 29B TGA curves of the XL35-rPNB-$X_{60}$-$Y_{40}$, XL20-rPNB-$X_{22}$-$Y_{78}$ and XL20-rPNB-$LY_{100}$ in $Br^-$ form.

Thermal stability: The thermal stability of the ROMP AEMs was assessed using thermogravimetric analysis (TGA), FIG. 29A. There are three mass-loss steps in the TGA. The first is the loss below 100° C. which corresponds to the loss of water and any remaining organic solvent in the membranes. The second step at about 200° C. corresponds to loss of the quaternary ammonium groups ($N^+(CH_3)_3$, QA) because the weight loss is close to the QA mass in the AEMs. For example, the weight loss for the XL35-$X_{60}$-$Y_{40}$ is about 12 wt % at the second step and the QA groups have about 13 wt %. The third mass loss is most likely polymer backbone decomposition. Thus, ROMP poly(norbornene) backbone has sufficient stability for electrochemical devices at 80° C., such as fuel cells. In addition, FIG. 29B shows that the $T_g$ of the XL35-rPNB-$X_{60}$-$Y_{40}$, XL20-rPNB-$X_{22}$-$Y_{78}$ and XL20-rPNB-$LY_{100}$ materials is 145° C., 165° C. and 170° C., respectively. The higher number of ionic repeat units corresponds to a higher $T_g$.

Figure 30:
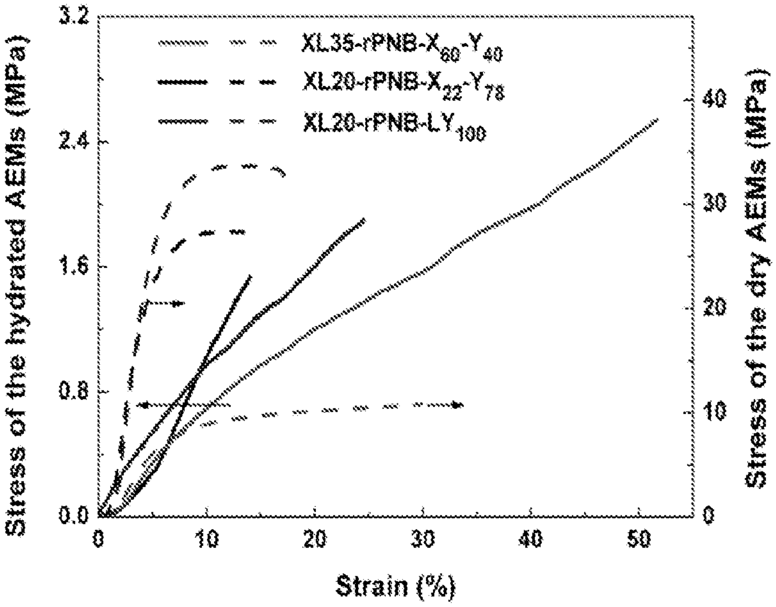
FIG. 30. Stress-strain curves of the fully hydrated and dry XL-rPNB membranes.

Mechanical stability: The mechanical properties of the fully hydrated and dry XL-rPNB-$X_{60}$-$Y_{40}$, XL-rPNB-$X_{22}$-$Y_{78}$ and XL-rPNB-$LY_{100}$ membranes are shown in FIG. 30. Elongation-to-break values for the hydrated AEMs are greater than 14.0%, while the tensile strength of each is relatively low, <2.6 MPa. The elongation-to-break for hydrated XL-rPNB-$X_{60}$-$Y_{40}$ (tensile stress=2.5 MPa, strain=51.7%) was the highest value obtained. It is high in comparison to the hydrated XL-rPNB-$X_{22}$-$Y_{78}$ (1.5 MPa, 14.0%). This suggests that higher ionic content within the AEM decreases the mechanical properties. XL20-rPNB-$LY_{100}$ (1.9 MPa, 24.5%) had better mechanical properties than XL20-rPNB-$Y_{100}$ due to its higher molecular weight. The dry AEMs had higher tensile strength (>10 MPa) than the hydrated membranes showing that the presence of absorbed water lowers the mechanical strength.

Figure 31A:
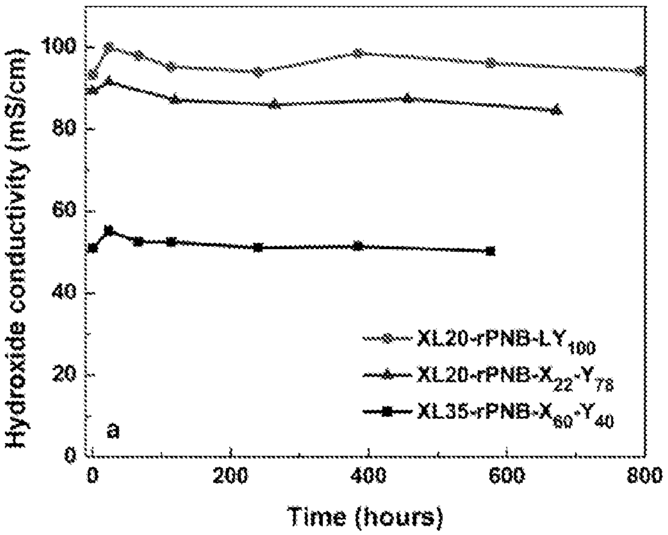
FIG. 31A. Alkaline stability of the XL20-rPNB-$LY_{100}$ (A), XL20-rPNB-$X_{22}$-$Y_{78}$ (B) and XL35-rPNB-$X_{60}$-$Y_{40}$ (C) after 1 M NaOH immersion at 80° C.: $OH^-$ conductivity as a function of degradation time at 25° C.
Figure 31B:
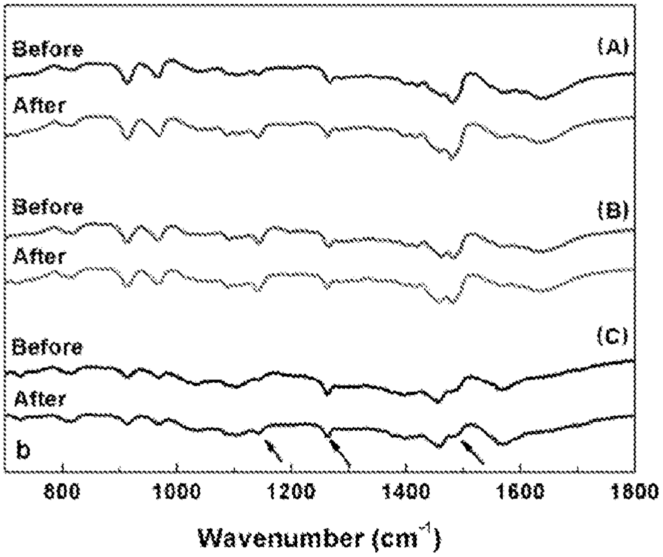
FIG. 31B. Alkaline stability of the XL20-rPNB-$LY_{100}$ (A), XL20-rPNB-$X_{22}$-$Y_{78}$ (B) and XL35-rPNB-$X_{60}$-$Y_{40}$ (C) after 1 M NaOH immersion at 80° C.: Zoomed FT-IR spectra.

Alkaline stability: The alkaline stability of the XL20-rPNB-$LY_{100}$ (4.51 meq/g), XL20-rPNB-$X_{22}$-$Y_{78}$ (3.78 meq/g) and XL35-rPNB-$X_{60}$-$Y_{40}$ (2.20 meq/g) membranes was evaluated by soaking them in 1 M NaOH at 80° C. for over 500 h, FIG. 31A. All the tested AEMs maintained their mechanical properties, flexibility and strength after soaking in NaOH. There was a slight increase in conductivity after 24 h which may be due to a more complete conversion to hydroxide form from either bromide or carbonate. In most membranes, there was little or no decrease in conductivity from the initial value. Even XL20-rPNB-$LY_{100}$, which had a high IEC (4.51 meq/g) retained its initial conductivity value after 792 h in 1 M NaOH at 80° C. (within experimental error), confirming excellent chemical stability. For the diblock polymers (e.g. XL35-rPNB-$X_{60}$-$Y_{40}$ which had lower IEC), the conductivity dropped 1.44% after 576 h. The XL20-rPNB-$X_{22}$-$Y_{78}$ membrane showed a decrease of 4.77% after 672 h. As shown in FIG. 31B, FT-IR analysis showed no change in the C—N stretch at 1490, 1260 and 1142 $cm^{-1}$ after the alkaline treatment (Mohanty, A. D et al., Macromolecules 2015, 48, 7085-7095; Chen, D et al., *ACS Appl. Mater. Interfaces* 2012, 4, 5775-5781). This suggests that the AEM chemical structures remained intact and the loss of conductivity may be caused by cracks along the edges of the AEMs.

Figure 32:
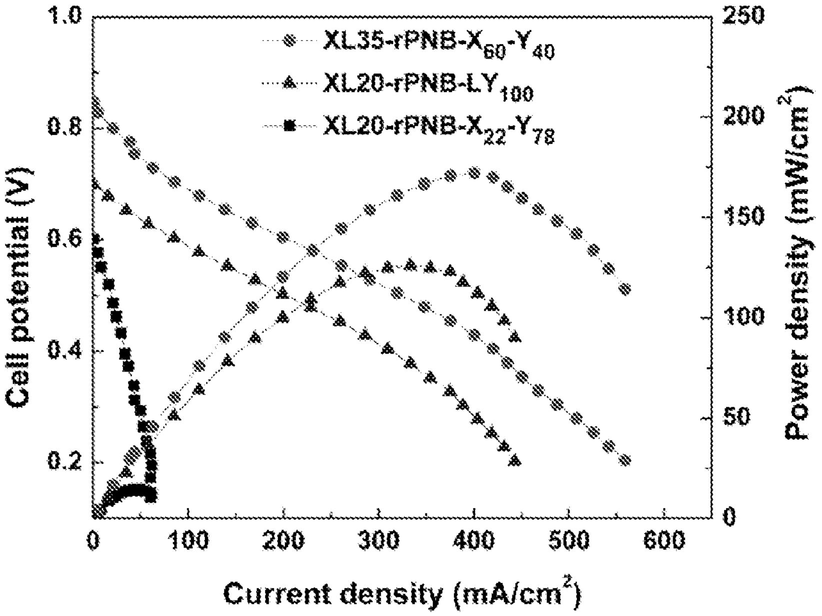
FIG. 32. The polarization and power density curves of the XL20-rPNB-$LY_{100}$, XL20-rPNB-$X_{22}$-$Y_{78}$ and XL35-rPNB-$X_{60}$-$Y_{40}$ AEMFCs.

Fuel cell tests: The ROMP AEMs were tested in AEM fuel cells to ensure that the membranes were sufficiently robust, conductive and, stable so that they can be used in a membrane electrode assembly (MEA) and electrochemical device. An MEA was constructed from each of the XL20-rPNB-$LY_{100}$, XL20-rPNB-$X_{22}$-$Y_{78}$ and XL35-rPNB-$X_{60}$-$Y_{40}$ membranes and operated in a $H_2/O_2$ fuel cell at 60° C., FIG. 32. The open-circuit voltage of the cell with the XL20-rPNB-$X_{22}$-$Y_{78}$ membrane was 0.60 V, which is modest. The poor mechanical properties of the membrane caused small cracks resulting in fuel crossover and/or cell shorting. Although the free-standing XL20-rPNB-$LY_{100}$ membrane was more robust, its open-cell voltage was still somewhat low (0.70 V), most likely due to the high gas crossover originating from the high water uptake. XL35-rPNB-$X_{60}$-$Y_{40}$ had a lower IEC and the best mechanical properties. The open-circuit voltage was 0.83 V. The maximum power density for the XL20-rPNB-$LY_{100}$ and XL35-rPNB-$X_{60}$-$Y_{40}$ fuel cells was 126 $mW/cm^2$ at 333 $mA/cm^2$, and 172 $mW/cm^2$ at 401 $mA/cm^2$, respectively. These tests show that conductivity and mechanical properties have to be optimized for the intended application of the membrane. The variables to be considered include operating temperature and cross-membrane differential pressure. Optimization and further testing of these materials may be the subject of future reports.

In summary, a series of ROMP cross-linked poly(norbornene)s were synthesized and evaluated for possible use in electrochemical devices. The polymers were composed of an all-hydrocarbon backbone and flexible alkyl side chain with quaternary ammonium head-group. The polymers with exceptionally high IEC (4.73 meq/g) were synthesized by choosing a proper ratio between hydrophobic and halogenated monomers with respect to G3. Modest crosslinking (20 mol % cross-linker concentration) was used to achieve high hydroxide conductivity (XL20-rPNB-$LY_{100}$): 99 mS/cm at 25° C. and 195 mS/cm at 80° C., which is higher than previously reported ROMP AEMs. Moreover, the XL20-rPNB-$LY_{100}$ membrane had excellent alkaline stability. Further optimization of properties and reinforcement of the membrane may lead to higher fuel cell performance.

Example 4: Achieving 3.4 W/cm2 Alkaline Polymer Fuel Cell: Composite Cross-Linked Poly(Norbornene) Anion Conducting Membranes for High Power, Durability and Water Management Energy conversion devices using solid polymer electrolytes such as fuel cells and electrolyzers are promising options for producing and storing clean energy because of their high thermodynamic efficiency and solid-state design (Steele, B. C. et al., Nature 2001, 414, 345). These devices are also scalable and can be used for transportation, remote and distributed power, and large-scale facilities for electricity and hydrogen production.

Polymer electrolyte membranes for fuel cells and electrolyzers are divided into two broad categories: proton exchange membrane (PEM) and anion exchange membrane (AEM) based on the dominant charge carrying ion. There are already commercialized fuel cell electric vehicles and stationary power generators based on PEM membranes, however, there are significant costs associated with the platinum-based electrocatalysts and perfluorinated membranes. AEM-based devices have the potential to lower the cost of ownership compared to PEM-based devices because the high pH environment is advantageous for the oxygen reduction reaction (ORR) kinetics in a fuel cell (and water oxidation kinetics in an electrolyzer) and enables the use of non-Pt catalysts (McLean, G. F. et al., *International Journal of Hydrogen Energy* 2002, 27 (5), 507-526; Dekel, D. R., et al., *Journal of Power Sources* 2018, 375, 158-169). Also, a variety of low-cost monomers can be used to synthesize hydrocarbon-based hydroxide ion conducting polymers that are stable in alkaline conditions, compared to the perfluorinated polymers needed for PEM-based electrochemical devices (Varcoe, J. R. et al., *The Journal of Physical Chemistry B* 2006, 110 (42), 21041-21049; Varcoe, J. R. et al., *Energy & Environmental Science* 2014, 7 (10), 3135-3191). Perfluorinated polymers are expensive and dangerous to synthesize.

The critical metrics for AEMs include (i) high anion (e.g. hydroxide) conductivity, (ii) long-term alkaline stability at the operating temperature, (iii) robust mechanical properties for withstanding in-use pressure differences, and (iv) control over undue water uptake which can disrupt ion transport within the electrodes and membrane (Gottesfeld, S. et al., *Journal of Power Sources* 2018, 375, 170-184). There have been several reports of AEMs with hydroxide conductivity of over 100 mS/cm (at 60° C. to 80° C.) (Mandal, M. et al., *Journal of Membrane Science* 2019, 570-571, 394-402; Dang, H.-S. et al., *Journal of Materials Chemistry A* 2016, 4 (30), 11924-11938; Liu, L. et al., *Journal of Materials Chemistry A* 2018, 6 (19), 9000-9008; Liu, L. et al., *Journal of Materials Chemistry A* 2016, 4 (41), 16233-16244)). More recent reports of AEMs have shown conductivity at or near 200 mS/cm (at 80° C.) (Mamlouk, M. et al., *International Journal of Hydrogen Energy* 2012, 37 (16), 11912-11920; Zhu, L.; Zimudzi, T. J. et al., *Polymer Chemistry* 2016, 7 (14), 2464-2475). High conductivity AEMs have been paired with optimized electrodes (with either Pt or non-Pt catalysts) to give AEM-based fuel cells with >1 $W/cm^2$ (Wang, L. et al., *Chemical Communications* 2017, 53 (86), 11771-11773; Omasta, T. J. et al., *Journal of Power Sources* 2018, 375, 205-213; Omasta, T. J.; Peng, X. et al., *J Electrochem Soc* 2018, 165 (15), J3039-J3044; Wang, L. et al., *Green Chemistry* 2017, 19 (3), 831-843). The current record for power in an AEM fuel cell is 2 $W/cm^2$ (Omasta, T. et al., *Energy & Environmental Science* 2018, 11 (3), 551-558; Wang, L. et al., *Journal of Materials Chemistry A* 2018, 6 (31), 15404-15412)). AEM fuel cells are known to be sensitive to the relative humidity in the fuel and oxidant streams, and water uptake in the AEM membrane and ionomer. Proper water management in the membrane and electrodes is critical to achieving high power density. Water is electrochemically generated at the anode during the hydrogen oxidation reaction (HOR) and is consumed at the cathode by the ORR in an AEM fuel cell. Water is transported from the cathode to the anode by electro-osmotic drag and as waters of hydration for the conducting anion.

Water also back diffuses from the anode to cathode. Without adequate water content within the membrane and electrodes, the ionic conductivity will suffer and polymer degradation will accelerate due to the higher effective hydroxide concentration within the AEM. On the other hand, if there is too much water, the thin catalyst layers can be easily flooded, and the efficient flow of ions within the electrodes and membranes can be disrupted. Mechanical degradation in the membrane can also occur due to the higher internal stress and expansion within the AEM.

Atmospheric carbon dioxide disrupts the performance of hydroxide-based AEM devices. Although this issue is not directly studied in this paper, it is worth noting that carbonate or bicarbonate can form by reaction of $CO_2$ with hydroxide. The mobility of carbonate and bicarbonate are less than hydroxide making the seemingly high conductivity AEM less conductivity (Pandey, T. P. et al., *Physical Chemistry Chemical Physics* 2015, 17 (6), 4367-4378). In contrast to the PEM devices, conductivity and peak power density for AEM fuel cells are often reported under $CO_2$-free conditions so that an equal basis for comparing performance can be made. It is also clear that very high hydroxide conductivity AEMs are needed because the value will drop when operated in the presence of carbon dioxide.

Efficient ion channels are needed in AEM to achieve high conductivity because the number of ions cannot be independently increased (i.e. higher ion exchange capacity (IEC)) because of the penalty due to excessive water uptake. It has been shown that high mobility ion channels can be formed through the phase segregation obtained by the use of block copolymers (BCP) (Huang, G. et al., *J Electrochem Soc* 2017, 164 (14), F1648-F1653; Pan, J. et al., *Energy & Environmental Science* 2014, 7 (1), 354-360; Wang, J. et al., *Chem Sus Chem* 2015, 8 (24), 4229-4234). Nanochannels have been created through nanophase separation between hydrophobic and hydrophilic blocks of a BCP (Park, D.-Y. et al. *The Journal of Physical Chemistry C* 2013, 117 (30), 15468-15477; Wang, L. et al. *Soft Matter* 2016, 12 (24), 5359-5371; Li, Y. et al. *Macromolecules* 2015, 48 (18), 6523-6533). It is important to note that not all BCP morphologies lead to high conductivity because the channels must also be interconnected for efficient ion conduction (Chen, C. et al. *Journal of Materials Chemistry A* 2016, 4 (11), 4071-4081). The nature of the polymer backbone and type/location of hydrophilic groups within the polymer is important for long term AEM stability at high pH. It has been experimentally shown that polar moieties, such as ether, ketone or ester linkages, within the polymer or side-groups are susceptible to nucleophilic attack and backbone degradation (Mohanty, A. D. et al. *Macromolecules* 2016, 49 (9), 3361-3372; Mohanty, A. D. et al. *Journal of Materials Chemistry A* 2014, 2 (41), 17314-17320; Arges, C. G. et al. *ACS Applied Energy Materials* 2018, 1 (7), 2991-3012). Positioning the cation head groups at the ends of long pendant alkyl tether ($C_4$ to $C_6$) has also been found to be an effective strategy for mitigating polymer degradation (Pan, J. et al., *Energy & Environmental Science* 2013, 6 (10), 2912-2915). Quaternary ammonium head group, especially trimethyl ammonium cation, has been found to be have an excellent balance of conductivity and stability, although other conducting groups show merit too (Hibbs, M. R. et al., *Journal of Polymer Science Part B: Polymer Physics* 2013, 51 (24), 1736-1742; Liu, L. et al. *Journal of Polymer Science Part A: Polymer Chemistry* 2018, 56 (13), 1395-1403).

In this example, a BCP of poly(norbornene) (PNB) synthesized by vinyl addition polymerization has been used as the AEM. PNB is synthesized from an inexpensive precursor material (dicyclopentadiene), and has a high glass transition temperature ($T_g$). PNB is also an all-hydrocarbon backbone with compact monomer size allowing the creating of very high IEC AEMs (Martínez-Arranz, S. et al. *Macromolecules* 2010, 43 (18), 7482-7487) This material was previously shown to form an extremely stable polymers with IEC values greater approaching 4 meq/g (J. A. Kaitz, et al., Macromolecules. 46 (2013) 608-612). Light cross-linking was used to control water uptake and provide additional mechanical strength without encountering the problems of high cross-link densities. Thin membranes are desired to minimize ohmic losses in the AEM. A thin polytetrafluoroethylene (PTFE) reinforcement was used casting the membranes making them mechanically tough (Merle, G. et al. *Journal of Membrane Science* 2011, 377 (1), 1-35; Quartarone, E. et al., *Materials* (Basel, Switzerland) 2017, 10 (7), 687). In the past, similar approaches have been used to make composite AEMs for fuel cells that have achieved modest peak power densities of <350 $mW/cm^2$ (Zhang, F. et al. *Journal of Materials Chemistry* 2010, 20 (37), 8139-8146; Zhao, Y. et al. *Journal of Power Sources* 2013, 221, 247-251). The membranes used in this study balance conductivity, water uptake and toughness to produce fuel cells with peak power density up to 3.4 $W/cm^2$ at 80° C. using $H_2/O_2$. This is considerably higher than the highest reported AEM fuel cell to date. The membranes are also shown to be stable with 545 h run-time, which is also the longest reported AEM fuel cell, to date.

Block copolymer synthesis and membrane formation: Synthesis of the tetrablock PNB copolymer GT64 has 64 mole % hydrophilic monomer was performed according to the previously Examples described herein. The IEC of the polymers was calculated based on $^1H$ NMR analysis using a Bruker Avance 400 MHz NMR instrument using $CDCl_3$ as the solvent as described in Examples herein. The number average molecular weight ($M_n$) and polydispersity index ($M_w/M_n$) of the tetrablock copolymer were determined by GPC (Shimadzu) equipped with an LC-20 AD HPLC pump and a refractive index detector (RID-20 A, 120 V). GPC measurements were performed in THF with the eluent flow rate of 1.0 mL/min at 30° C. and calibrated against a polystyrene standard as previously described herein in previous Examples.

Light cross-linking was carried out by adding the cross-linking agent, N,N,N',N'-Tetramethyl-1,6-hexanediamine (TMHDA), to the polymer/solvent solution. The mole percent of crosslinker to the available head-group sites was: 2.5 mol %, 5 mol %, 10 mol %, 15 mol %, 20 mol % and 25 mol %. For example, GT64-5 has 5 mol % TMHDA with respect to the moles of head-groups within the BCP. The polymer solution was then solvent cast onto a PTFE reinforcement layer by Xergy, Inc. (Harrington, Del., United States) to form a composite film. The composite membranes were immersed in 50 wt % aqueous trimethylamine solution for at least 48 h at room temperature to convert the bromoalkyl tethers into quaternary ammonium head-groups. The quaternized membranes were washed thoroughly with DI water and stored in DI water until they were ready to be used.

Water uptake, dimensional swelling ratio, hydration number (2): The water uptake of the membranes was calculated according to Equation 1, where $M_d$ is the dry mass of the membrane and $M_w$ is the mass of the fully hydrated membrane after removing excess surface water.

$$WU\% = \frac{M_w - M_d}{M_d} \times 100 \quad (1)$$

The swelling ratio was calculated by Equation 2, where $V_d$ is dry volume of the membrane and $V_w$ is the volume of the fully hydrated membrane after removing excess surface water.

$$\text{Swelling ratio} = \frac{V_w - V_d}{V_d} \times 100 \quad (2)$$

Mechanical properties: The storage modulus of the reinforced composite membranes was measured by dynamic mechanical analysis (DMA) using a TA Instruments Q800 under a 1 Hz single-frequency strain mode in air at 30° C. A fully hydrated, rectangular sample was loaded into the DMA with tension clamps after removing surface water. Experiential parameters for the DMA were set to 0.1% strain and a preload force of 0.01 N with a force track of 125%.

Membrane electrode assembly (MEA) fabrication: Gas diffusion electrodes (GDEs) were prepared by hand spraying catalyst layer onto a gas diffusion layer (GDL, Toray TGP-H-060 with 5% or 20% PTFE wet-proofing) using a similar method described in Omasta et al. (Omasta, T. J. et al. *Energy & Environmental Science* 2018, 11 (3), 551-558). ETFE-[poly(ethylene-co-tetrafluoroethylene)]-based radiation grafted AEI ionomer was provided by Varcoe and Poynton et al (Poynton, S. D. et al. *Journal of Materials Chemistry A* 2014, 2 (14), 5124-5130). The ETFE AEI solid ionomer was finely ground with a mortar and pestle and then mixed with Pt on Vulcan carbon (Alfa Aesar HiSPEC 4000) to form the cathode catalyst ink mixture (20 wt % ionomer). Then, a small amount of DI water (1 ml) was added to the solid mixture and the mixture was ground for additional 10 minutes to avoid aggregated particles and then transferred to a vial. 2-propanol was added (a total of 9 ml) to the mortar to rinse the residual powder and then transferred to the mixture. The mortar was rinsed with 2-propanol an additional 2-3 times to ensure the majority of the ink mixture was collected. The final ground ink mixture was sonicated with a sonic probe for 20 seconds followed by an additional 20 minutes of sonication in an ice bath before it was hand sprayed onto a Toray GDL to produce one 25 $cm^2$ GDE. This process was repeated for the anode catalyst ink mixture using PtRu on Vulcan carbon catalyst with 8% PTFE (20 wt % ionomer). The platinum and platinum ruthenium metal loading of these GDEs were determined by X-ray fluorescence (XRF) and indicated in Table 6. Two 5 $cm^2$ GDEs (anode and cathode) were cut from the 25 $cm^2$ GDE to assemble with an oversized 5 $cm^2$ composite PNB AEM to make an MEA.

MEA assembly and fuel cell testing: The anode and cathode GDEs and membrane were ion exchanged in 1 M KOH solution for a total of 60 minutes (refreshing the base solution every 20 minutes) prior to cell assembly. The membrane was sandwiched between two GDEs and pressed together and secured in 5 $cm^2$ Fuel Cell Technologies hardware between two single pass serpentine flow graphite plate and PTFE gaskets. Total torque applied to the cell was 40 in-lb with a compression ratio of 25%.

The fuel cell was installed into the test station with the cell temperature set to 60° C. or 80° C. $H_2$ and $N_2$ was flowed through the anode and cathode, respectively, until the desired temperature was achieved. Once the desire temperature was reached, the $N_2$ was switched to $O_2$ and a constant voltage of 0.5V was applied to allow the cell to break-in. After a stable current exchange density was established, anode and cathode dew points were raised or lowered to optimize the relative humidity (RH) of the inlet gas on both sides of the cell. After the cell was equilibrated at the intended RH for both electrodes, voltage polarization curve was measured by sweeping voltage from OCV to 0.1 V. After all of the initial performance at various RHs were done, the cell was held at a constant current density of 600 $mA/cm^2$ for a cell durability test, in $O_2$ or $CO_2$-free air. The cell performance was monitored over time for a minimum of 24 hours.

Electrochemical properties: High frequency resistance (HFR) was analyzed by electrochemical impedance spectroscopy (EIS) using a Metrohm Autolab potentiostat/galvanostat with booster. Area specific resistance (ASR) of the membranes was calculated using the HFR. The hydrogen crossover rate was measured using the same instrument while $H_2$ and $N_2$ were flowed at the anode and cathode, respectively.

Results: The AEMs used in this study are composite films made of a high IEC, vinyl addition poly(norbornene) BCP solvent cast with a thin, polytetrafluoroethylene (PTFE) reinforcement layer from Xergy, Inc. The PTFE reinforcement provides mechanical strength so that thin membranes (<20 μm) can be used. The same base polymer was used to make all composite membranes. This polymer was synthesized according to a previous report and had a molecular weight ($M_n$) of 51.0 kDa with a polydispersity index (PDI) of 2.02. This range of molecular weight and polydispersity was previously found to yield cast membranes with conductivity and mechanical strength. In a previous report, light cross-linking was found to be beneficial to the ionic conductivity of the membranes, especially for high IEC materials. A high degree of cross-linking can inhibit ion mobility and cause brittleness. The membrane cross-linker (TMHDA) concentration was studied by preparing composite AEMs with 0, 2.5, 5, 10, 15, 20 and 25 mol % cross-linking agent (i.e. mol % with respect to bromine head-groups within the polymer). The IEC of finished polymer decreased slightly with cross-linker concentration due to the mass of the added cross-linker (3.37 to 3.28 meq/g), although the number of cation head-groups per monomer did not change. The properties of the membranes are summarized in Table 6.

The mechanical properties of the membranes were influenced by the degree of crosslinking, Table 6. The storage modulus and resulting stiffness of the membranes was improved by crosslinking. The uncross-linked membrane (GT64-0) had a storage modulus of only 66.8 MPa, which is similar to that of the PTFE by itself. Very light cross-linking (2.5 mol %) led to a small increase in modulus, 75.4 MPa. There was an 8-fold increase in storage modulus for the membrane with the highest cross-linker concentration (25 mol %) compared to the uncross-linked sample, 553.5 MPa. The higher modulus of the cross-linked membranes provided needed rigidity and toughness so that they could be handled and used in very thin forms so that the ohmic loss during device operation can be minimized.

TABLE 6

| AEM properties. | | | | | | | | |
|---|---|---|---|---|---|---|---|---|
| Sample | Crosslinking (mol %) | IEC (meq/g)[c] | ASR ($\Omega$-cm$^2$)[d] | Storage Modulus (MPa)[e] | Water Uptake (%) | Swelling Ratio (%) | IEC/ASR | WU/ASR |
| GT64-0 | 0 | 3.37 | 0.038 | 66.75 | 88 | 68 | 3.33 | 2316 |
| GT64-2.5 | 2.5 | 3.36 | 0.056 | 75.42 | 82 | 45 | 3.30 | 1464 |
| GT64-5 | 5 | 3.34 | 0.041 | 118.66 | 65 | 39 | 3.30 | 1585 |
| GT64-10 | 10 | 3.31 | 0.033 | 129.46 | 35 | 24 | 3.28 | 1061 |
| GT64-15 | 15 | 3.28 | 0.020 | 175.45 | 29 | 14 | 3.26 | 1472 |
| GT64-20 | 20 | 3.25 | 0.025 | 458.11 | 24 | 11 | 3.23 | 968 |
| GT64-25 | 25 | 3.22 | 0.025 | 553.48 | 18 | 7 | 3.20 | 735 |

[a]$M_n$ of the precursor polymer determined by GPC;
[b]$M_w/M_n$ of the precursor polymer determined by GPC;
[c]IEC calculated after the addition of TMHDA molecular weight;
[d]Area specific resistance measured by EIS at 60° C.;
[e]Storage modulus determined by DMA.

The water uptake and swelling ratio of the composite films decreased with cross-linker concentration, Table 6. The water uptake was relatively high for the uncross-linked membrane (88%) and the swelling ratio was 68%. Even a very small cross-linker concentration (2.5 mol %) significantly lowered the swelling ratio due to a more tightly bound structure within the cross-linked polymer network. At higher cross-linker concentrations, ≥10%, the water uptake and swelling ratio were both well below 50%, which is advantageous for reducing the physical deformation when integrated into a membrane electrode assembly. It is noted that the water uptake values for the composite films are less than the those of the free standing films without PTFE support, as reported previously. For example, 10 mol % cross-linker had 53% water uptake for the unreinforced polymer and only 35% water uptake in GT64-10. At 20 mol % cross-link, the effect is even more dramatic. The water uptake was 51% for the unreinforced polymer vs. 24% for the reinforced polymer. This shows that the hydrophobic PTFE reinforcement contributes to limiting the water uptake in these membranes.

Figure 33:
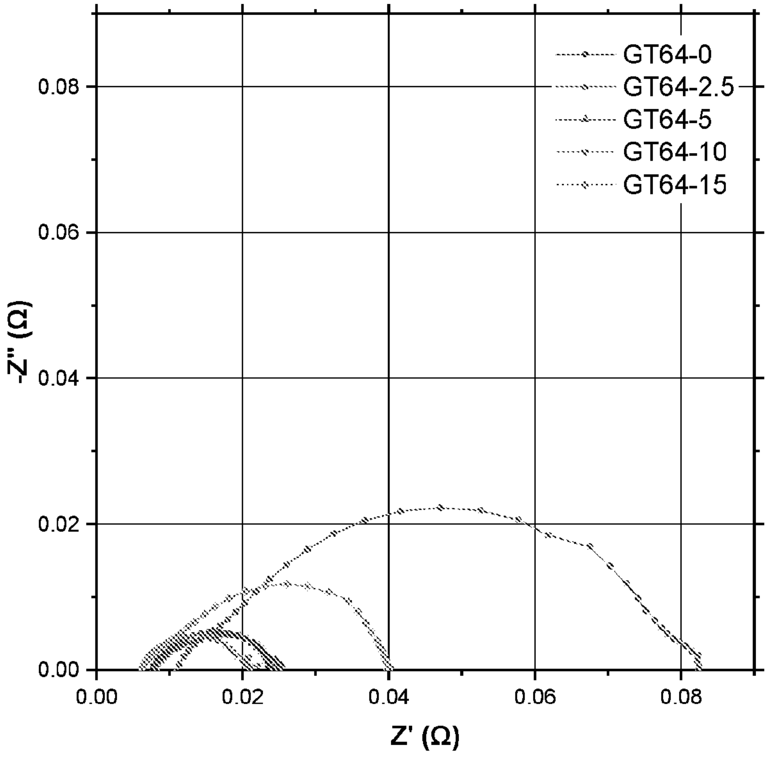
FIG. 33. EIS data at 60° C.

The high frequency resistance (HFR) and area specific resistance (ASR) were evaluated using electrochemical impedance spectroscopy (EIS). The Nyquist plots from the EIS measurements of the MEAs at 60° C. are shown in FIG. 33. The high frequency intercept (HFR) in the plots represents the total series ohmic resistance of the membrane, as well as any other series resistances, such as contact and hardware resistances. The thinness of the membranes used here lowers the overall HFR which helps to maximize fuel cell power output.

The ASR was calculated using the HFR of the MEAs as measured by EIS. This value represents the through-plane area resistance of the membrane, which is especially important for composite membranes because the supporting material does not contribute to ionic conductivity. Through-plane hydroxide mobility depends on the orientation of the pores in the reinforcement layer and membrane packing. The ASR values for the membranes in this study are listed in Table 6. All of the membranes with the exception of GT64-2.5 have an ASR of ≤0.04 $\Omega$-cm$^2$, which exceeds the guidelines for fuel cell integration set by the ARPA-E IONICS (US Department of Energy) program. Table 6 also shows how modest cross-linking in these polymers greatly decreased the water uptake. The swelling ratio decreased to only 7% and high conductivity was achieved without excessive water, as shown by the decreasing value of WU/ASR. It is noted that achieving high conductivity by increasing WU leads to poor mechanical stability for the membrane and devices made from those membranes.

Figure 34:
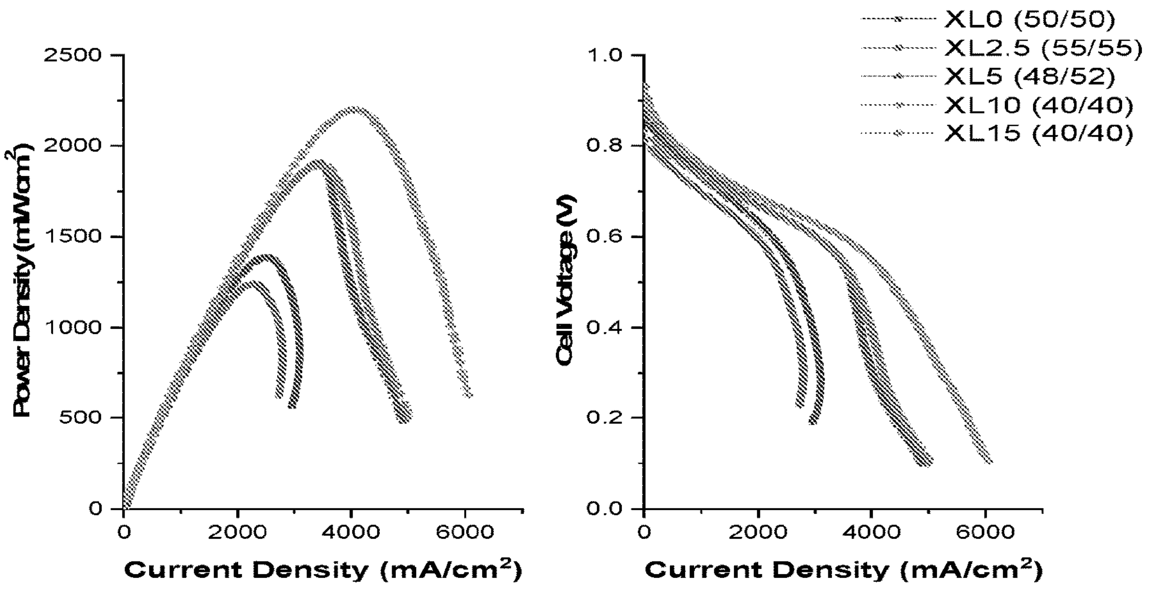
FIG. 34. Comparison of best peak performance after RH optimization. A/C denotes anode (A) and cathode (C) dew points in degrees Celsius, respectively. Cell temperature for all samples was 60° C.

Two sets of fuel cells were constructed using the reinforced membranes in Table 6. The fuel cells were operated with humidified $H_2$ and $O_2$, and 5% wetproofed Toray-H-60 GDL at a cell temperature of 60° C., as summarized in Table 7. After a short break-in period where the anode and cathode RH were optimized, the forward and reverse polarization scans were run on each cell to determine the peak power density. The optimized anode and cathode dew points are listed in Table 7 using the notation (A/C), where the value of A represents the anode dew point and the value of C represents the cathode dew point in degrees Celsius. This notation will be used throughout this paper. The performance based on the cross-linker concentration are shown in FIG. 34. The cell voltage at peak power for all samples at 60° C. was around 0.55 V. Specific power and specific current were calculated based on the peak power density, current produced at peak power, and the metal loadings of the electrodes.

Three distinct power tiers in the current density of can be seen in Table 7, with peak power increasing with cross-linker concentration. Among the membranes tested, the lowest performing cells contained membranes with 0 and 2.5 mol % crosslinker concentration, which only had 1241 to 1386 mW/cm$^2$ peak power, respectively. Intermediate power levels were observed for membranes with 5 and 10 mol % cross-linker concentration: 1894 and 1902 mW/cm$^2$, respectively. The highest power density was observed for the cell containing the GT64-15 membrane: achieved 2200 mW/cm$^2$ peak power density at with both anode and cathode dew point at 40° C. (47.54% RH). Even at 60° C., this cell exceeded the previous highest power AEM fuel cell reported by Wang et al., 2.02 W/cm$^2$ at 80° C. (Wang, L. et al., *Journal of Materials Chemistry A* 2018, 6 (31), 15404-15412).

TABLE 7

Fuel cell performance highlights at 60° C.

| XL % | BOL cross over (mA/cm$^2$)[a] | OCV, BOL (V) | A/C RH | HFR (mΩ) | CD (mA/cm$^2$) | PPD (mW/cm$^2$) | PtRu/C loading (mg/cm$^2$) | Pt/C loading (mg/cm$^2$) | Spec. power (mW/mg PtRu) | Spec. power (mW/mg Pt) | Spec. current (mA/mg PtRu) | Spec. current (mA/mg Pt) |
|---|---|---|---|---|---|---|---|---|---|---|---|---|
| 0 | 40 | 0.881 | 50/50 | 7.6 | 2497 | 1386 | 0.472 | 0.424 | 2936 | 3269 | 5291 | 5890 |
| 2.5 | 24.8 | 0.873 | 55/55 | 11.1 | 2270 | 1241 | 0.331 | 0.313 | 3751 | 3966 | 6857 | 7251 |
| 5 | 4.8 | 0.950 | 48/52 | 8.1 | 3431 | 1902 | 0.948 | 0.490 | 2005 | 3880 | 3620 | 7003 |
| 10 | 54.0 | 0.882 | 40/40 | 7.0 | 3417 | 1894 | 0.730 | 0.515 | 2595 | 3679 | 4680 | 6634 |
| 15 | 12.0 | 0.930 | 40/40 | 6.2 | 4097 | 2200 | 0.986 | 0.560 | 2231 | 3929 | 4155 | 7316 |

[a]Beginning of life crossover measured by EIS:
[b]High frequency resistance measured by EIS;
[c]Metal loadings for specific power and current determined by XRF. All other values measured or calculated based on test station data.
XL = crosslinked; A/C = denotes anode (A) and cathode (C) dew points in degrees Celsius, respectively; CD = current density; PPD = peak power density.

Figure 35:
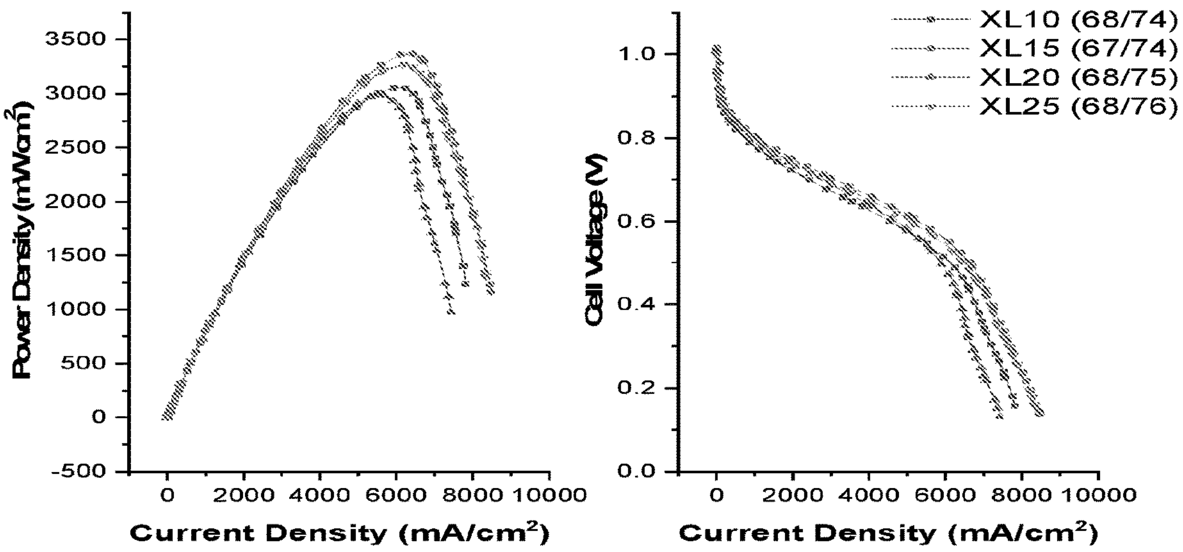
FIG. 35. Power density and cell voltage of XL AEMs at 80° C.
Figure 36:
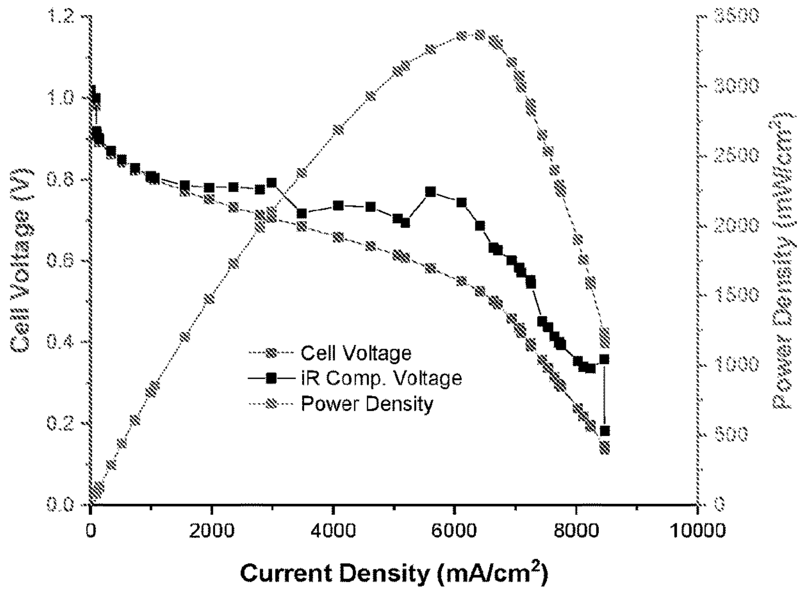
FIG. 36. Current Density vs. cell voltage of XL15 at 80° C.

At 80° C. the performance of the fuel cells significantly increased, as summarized Table 8. The higher crosslinker concentration samples were selected for testing at 80° C. because of their performance at lower temperatures. The GDEs used in these tests were further optimized (20% wetproofing Toray-H-60) and more attention was paid to optimizing the relative humidity of the anode and cathode feed. As shown in FIG. 35, there is less of a separation in power density among the four cells tested. All cells achieved peak power at about 0.53 V. GT64-10 and GT64-20 both achieved about 3 W/cm$^2$ peak power with similar anode and cathode dew points. The peak power for GT64-25 was 3.265 W/cm$^2$ which may be due to the tighter control of physical deformations due to water swelling, however, its hydroxide conductivity was lower than the other membranes. Similar to the results obtained at 60° C., GT64-15 again showed the highest performance among all membranes tested with a peak power density of 3.368 W/cm$^2$. The individual polarization curves for GT64-15 are shown in FIG. 36. To the authors' knowledge, this is the highest performance reported for an AEM fuel cell, surpassing the previous highest report by 70%. It is noted that the power density produced is relatively similar across a relatively wide range of cross-linker concentrations. This appears to be the results of off-setting trends of mechanical stability (better with higher cross-linker concentration) and lower conductivity, with both caused by lower WU.

certain crosslinker concentrations are better than others. The IEC/ASR is a similar to conductivity per IEC (σ/IEC), which has been used in the past to measure how efficient the conducting groups are at transporting hydroxide ions. For membranes in this study, the ion conduction efficiencies are all quite similar, ranging only from 3.20 to 3.33. This is because there are only slight variations in ASR and IEC among the samples tested. An additional parameter to examine is the WU/ASR, which shows that although the hydroxide conductivity decreased with cross-linker concentration, cell performance did not suffer much because the minimal WU (and resulting swelling) were a significant benefit.

The one drawback to the use of thin composite membranes is higher hydrogen crossover, especially at low temperature. Prior to the break-in procedure, a hydrogen crossover test was performed by applying $H_2$ at the anode and $N_2$ at the cathode. The cathode current measured a cell voltage of 0.5 V corresponds to hydrogen cross-over from the cathode to the anode. The values of hydrogen crossover are listed in Tables 6 and 7. The cross-over does not appear to be a function of the membrane thickness or the crosslinker concentration and was as high as 54 mA/cm$^2$ for GT64-10. It is suspected that the cross-over occurred mainly at unintentional weak points or thin points in the membranes, although no obvious regions were seen. The effect of the elevated crossover for GT64-10 can be seen in the lower open circuit voltage (OCV) values. The OCV ranged from

TABLE 8

Fuel cell performance highlights at 80° C.

| XL % | BOL cross over (mA/cm$^2$)[a] | OCV, BOL (V) | Optim. A/C (° C.) | HFR (mΩ) | Cell potential (V) | CD (mA/cm$^2$) | PPD (mW/cm$^2$) | PtRu/C loading (mg/cm$^2$) | Pt/C loading (mg/cm$^2$) | Spec. power (mW/mg PtRu) | Spec. power (mW/mg Pt) | Spec. current (mA/mg PtRu) | Spec. current (mA/mg Pt) |
|---|---|---|---|---|---|---|---|---|---|---|---|---|---|
| 10 | 54.0 | 1.001 | 68/74 | 7.01 | 0.514 | 5940 | 3055 | 0.70 | 0.60 | 4364 | 5092 | 8491 | 9906 |
| 15 | 12.0 | 1.016 | 67/74 | 5.05 | 0.524 | 6425 | 3368 | 0.70 | 0.60 | 4811 | 5613 | 9182 | 10712 |
| 20 | | 1.009 | 68/75 | 1.52 | 0.536 | 5588 | 2995 | 0.70 | 0.60 | 4279 | 4992 | 7982 | 9313 |
| 25 | | 0.996 | 68/76 | 5.74 | 0.528 | 6179 | 3265 | 0.70 | 0.60 | 4664 | 5442 | 8834 | 10307 |

[a]Beginning of life crossover measured by EIS. All other values measured or calculated based on test station data.
XL = crosslinked; A/C = denotes anode (A) and cathode (C) dew points in degrees Celsius, respectively; CD = current density; PPD = peak power density.

In previous ex-situ testing of reinforced membranes of similar IEC showed that the highest hydroxide conductivity occurred with 5 mol % crosslinker concentration. This is in contrast to the results of this study where 15 mol % cross-linker concentration gave the highest power density at both 60° C. and 80° C. In Table 6, water uptake normalized by the ASR (WU/ASR) and the IEC normalized by the ASR (IEC/ASR). These quantities give some insight into why 0.881 V to 0.950 V. Other fuel cells using the same electrode formulation had OCV values of about 1.1 V.

The relative humidity at the anode and cathode inlet is known to play a critical role in alkaline exchange membrane fuel cell performance. The water content in the hydrogen and oxygen input streams must be carefully balanced with the production of water at the anode, the diffusion of water through the membrane, and consumption of water at the cathode. Factors such as catalytic activity and loading can affect each individual electrode differently, which in turn affects the overall cell performance. As mentioned earlier, the three tiers of power output can be seen in FIG. 34 based on the amount of cross-linker in each membrane. However, there is an additional trend that can be seen in this data. Not only does the performance go up with cross-linker concentration, but the amount of humidity required also decreases. As reported previously, water uptake decreases with increasing cross-linker concentration in the polymer network. (J. M. Schwartz, et al., J. Polym. Sci. Part A Polym. Chem. 56 (2018) 221-228). As seen in the water uptake data in Table 6, the higher cross-linker concentration decreases the WU. However, the tighter and more rigid polymer network also appears to lock water inside the membrane, limiting the rate of dry-out. Dry-out is especially a problem for the thin membranes in this study which appears to show that a critical cross-linker concentration is needed for maintaining proper hydration.

Figure 37:
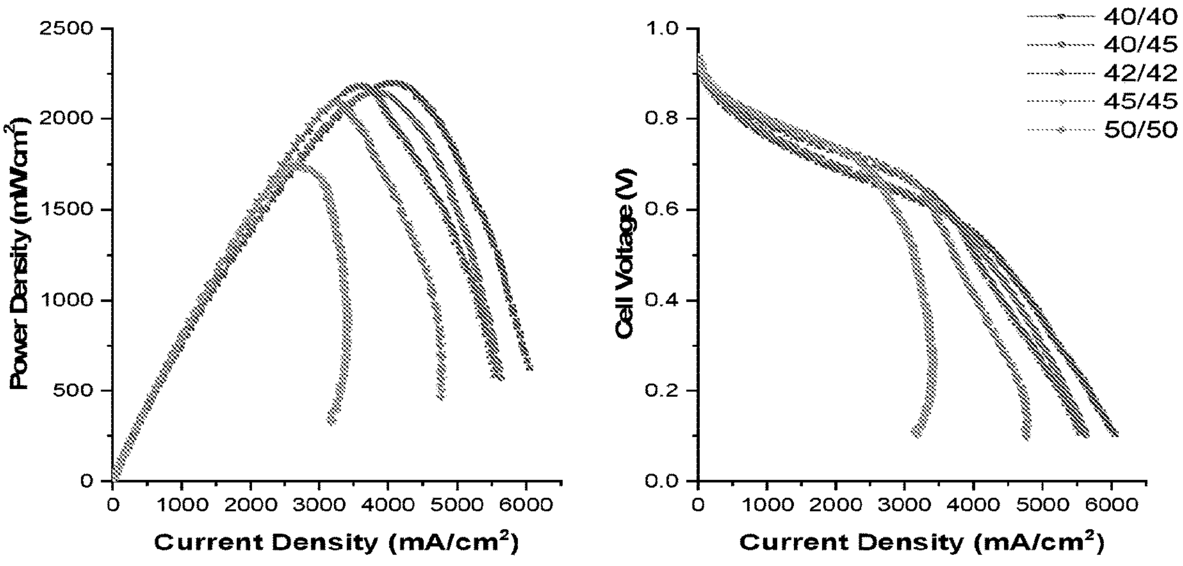
FIG. 37. GT64-15 polarization curves at various anode and cathode inlet RH during BOL. $H_2/O_2$.

The cells with ≥10% cross-linker concentration operated at 60° C. had a peak power density with anode and cathode dew points of 40° C. or 47.5% RH. FIG. 37 shows RH optimization for the GT64-15 membrane. At anode and cathode dew points of 50/50, there is clearly too much water in the system, which causes electrode flooding and lower power. The performance increases steadily as the humidity is reduced to 40/40.

This trend continues for an intermediate amount of cross-linker (5 mol %), where the required RH was 64.5% RH and 74.8% for the anode and cathode, respectively. At cross-linker concentrations of ≤2.5 mol %, the RH for anode and cathode needed to be 69.5% RH to achieve the highest peak power. RH optimization for GT64-2.5 is shown in FIG. 37. At 100% RH, lower power was observed due to cell flooding. At the opposite end of the spectrum (dew points 50/50), the membrane is too dry and low power is also observed. At dew points of 55/55, significantly higher power is able to be achieved due to an optimal balance of input water and generated water.

Figure 38:
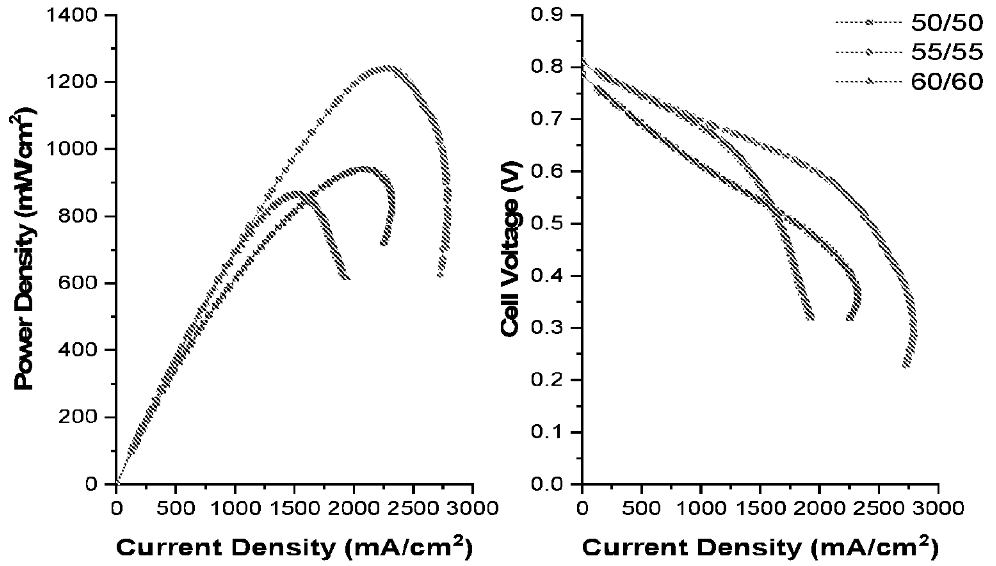
FIG. 38. GT64-2.5 polarization curves at various anode and cathode inlet RH during BOL. $H_2/O_2$.
Figure 39:
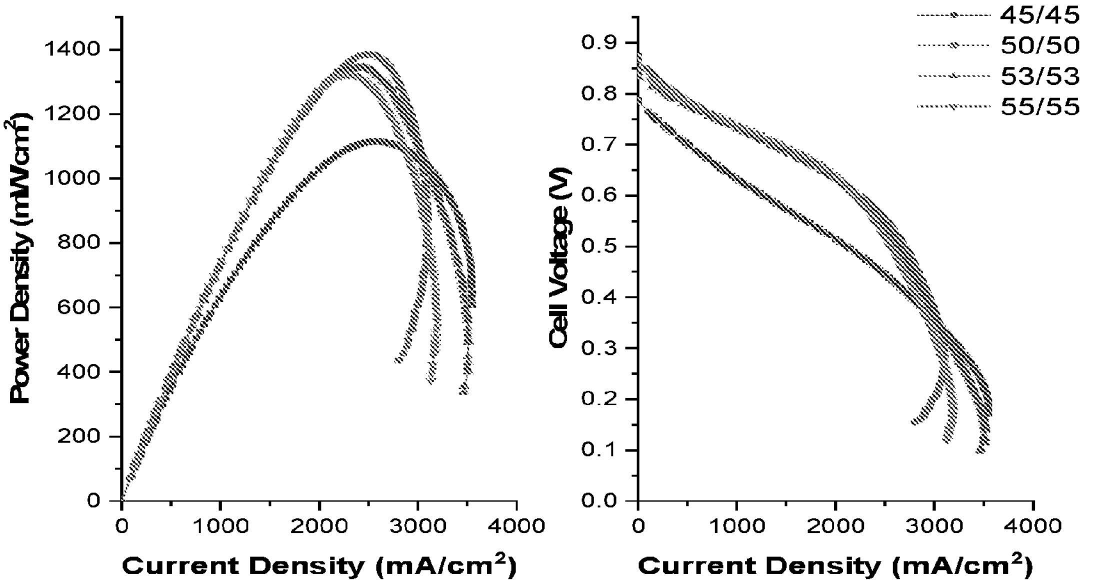
FIG. 39. GT64-10 polarization curves at various anode and cathode inlet RH during BOL. $H_2/O_2$.

FIG. 38 shows the RH optimization behavior for the membrane without any cross-linker. While the separation in the data is not as clear, the optimal dew points for this cell are between 50/50 and 55/55. When the dew points were set at 45/45, lower power was observed due to a lack of hydration.

Figure 40:
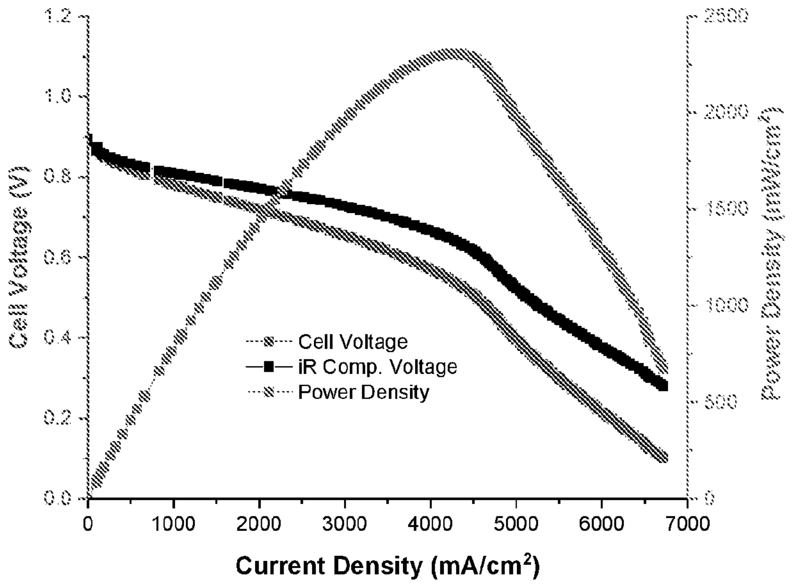
FIG. 40. GT64-15 performance at 75/75/80.
Figure 41:
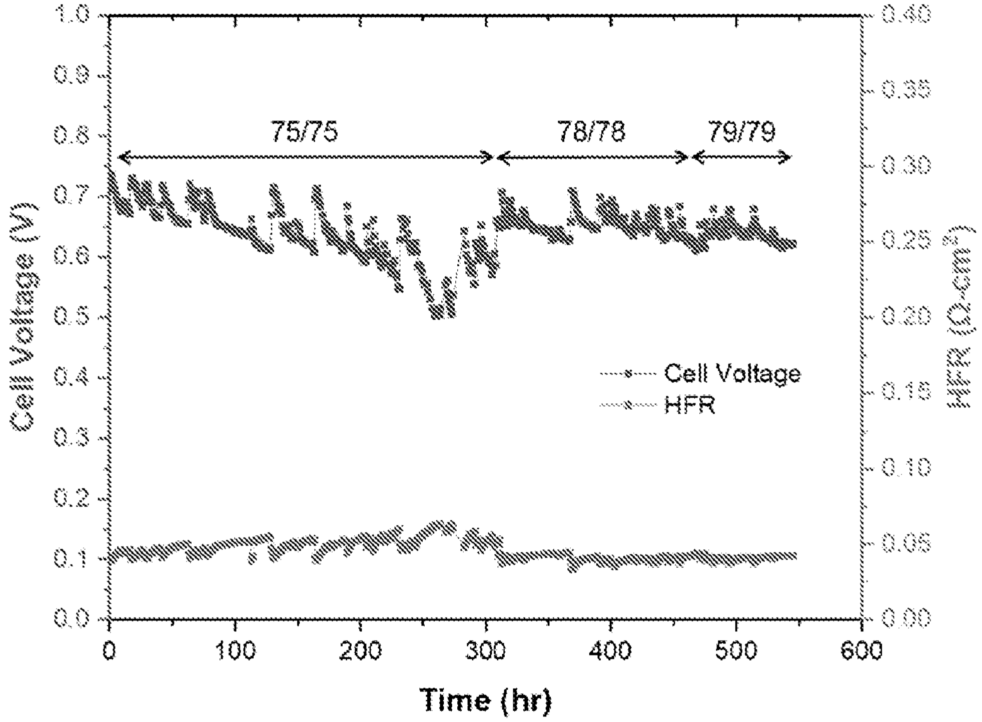
FIG. 41. GT64-15 performance over time.

The long-term stability of the cells tested here was investigated using the 5% wetproofed GDL. The durability of GT64-15 was tested at 80° C. using $CO_2$-free air. Prior to switching to $CO_2$-free air, this cell achieved 2.3 W/cm$^2$ at 80° C. in $H_2/O_2$, as shown in FIG. 40. FIG. 41 shows hourly data of the cell's voltage over time at a constant current density of 600 mA/cm$^2$. Overall, the cell ran for 545 hours without detectable degradation of the membrane. To the authors' knowledge, 545 hours is also the longest durability test to date for an AEM fuel cell. During the first 300 hours, it was observed that the cell performance dropped about 17% over this time. However, the source of the degradation may be due to the radiation-grafted ETFE AEI ionomer in the electrodes, which was reported to degrade about 6.2% after 500 hours. This change in performance likely caused the water dynamics at the electrode to change over time. As such, the humidity was adjusted to 78/78 after 300 hours and the initial level of performance was restored. After the next 150 hours, the dew points of the anode and cathode were increased to 79/79 for the last 95 hours of the durability test. After adjusting the water content, the cell voltage and the HFR also returned to its initial values indicating that proper hydration levels had been achieved. In fact, comparing the initial HFR (0.043 Ω-cm$^2$) to the final (0.042 Ω-cm$^2$) shows that the performance did not change. This is indicative of the need for a longer break-in period for AEM membranes and electrodes.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

That which is claimed is:

1. A multiblock copolymer comprising one or more ion conducting norbornene-based hydrophilic blocks and one or more hydrophobic blocks.

2. The multiblock copolymer of claim 1, wherein the one or more hydrophobic blocks are selected from norbornene-based hydrophobic blocks and alkene-based hydrophobic blocks.

3. The multiblock copolymer of claim 1, wherein the one or more hydrophobic blocks(s) are norbornene-based hydrophobic blocks comprising one or more hydrophobic monomers with a structure represented by Formula (I):

(I)

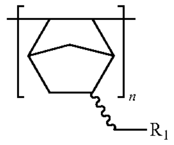

wherein $R_1$ is a saturated C1-C20 alkyl chain or halogenated alkyl chain branched or unbranched; and n is an integer from 1 about 1,000.

4. The multiblock copolymer of claim 1, wherein the one or more hydrophobic blocks(s) are alkene-based hydrophobic blocks comprising one or more hydrophobic monomers with a structure represented by Formula (II):

(II)

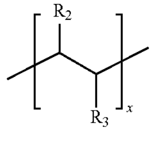

wherein $R_2$ and $R_3$ are independently selected from H, and a saturated C1-C20 alkyl or halogenated alkyl chain branched or unbranched; and x is an integer from about 10 to 1,000.

5. The multiblock copolymer of claim 1, wherein the one or more ion conducting hydrophilic blocks comprise one or more hydrophilic monomers with a structure represented by Formula (III):

(III)

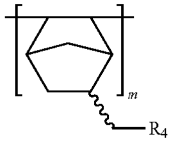

wherein $R_4$ is a saturated C2-C20 alkyl chain branched or unbranched with one or more cationic head groups; and m is an integer from about 10 to about 1,000.

6. The multiblock copolymer of claim 5, wherein the cationic head group is a quaternary ammonium head group.

7. The multiblock copolymer of claim 5, wherein $R_4$ is a saturated C3 or C4 alkyl chain.

8. An anion-exchange membrane (AEM) comprising the multiblock copolymer of claim 1.

9. The AEM of claim 8, wherein the one or more ion conducting hydrophilic blocks are crosslinked with a cross-linker.

10. The AEM of claim 9, wherein the crosslinking agent is an alkyldiamine tether comprising a saturated C2-C10 alkyl chain branched or unbranched or an multi-amine alkyl tether comprising a saturated C2-C10 alkyl chain branched or unbranched with at least two amine functionalities.

11. The AEM of claim 5, wherein one or more cationic head groups of the one or more ion conducting hydrophilic blocks within the multiblock copolymer are crosslinked with each other via the crosslinker.

12. The AEM of claim 9, wherein the concentration of crosslinker is from about 5 mol % to about 50 mol %.

13. The AEM of claim 9 comprising a structure represented by:

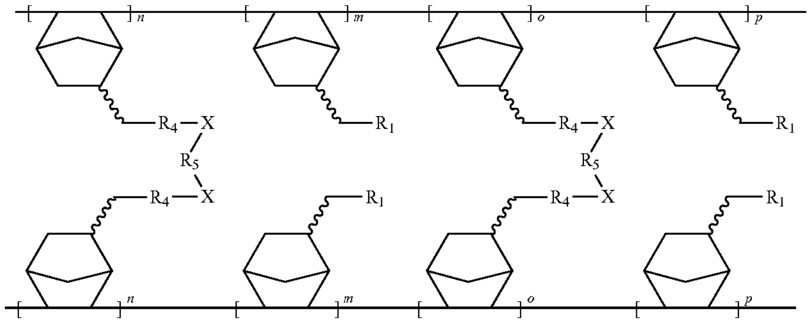

wherein $R_4$ is a saturated C1-C20 alkyl chain branched or unbranched;

$R_1$ is a saturated C2-C20 alkyl chain branched or unbranched;

X is a cationic head group comprising a cationic charged heteroatom;

$R_5$ is a crosslinker comprising a saturated C2-C10 alkyl chain branched or unbranched; and n, m, o, and p are integers independently selected from about 10 to about 1,000.

14. The AEM of claim 9, further comprising a stabilizing agent.

15. The AEM of claim 9 comprising one or more anion conductive channels.

16. The AEM of claim 9 comprising one or more of:

a tensile strength of from about 10 to about 500 MPa;

an elongation at break percentage of from about 10 to about 200%;

a Young's modulus of from about 0.005 to about 1 Gpa;

an ion exchange capacity of from about 1.5 to about 4.5 meq/g;

a hydroxide conductivity of from about 35 to about 250 mS/cm at 80° C.;

a water uptake percentage of from about 10% to about 70%; and a hydration number X of from about 6 to about 30.

17. A method of making the multiblock copolymer of claim 1 comprising vinyl addition polymerization.

18. A method of making the copolymer composition of claim 1 comprising ring opening metathesis polymerization (ROMP).

19. A method of making a crosslinked multiblock copolymer comprising crosslinking one or more ion conducting hydrophilic blocks in a multiblock copolymer of claim 1 with one or more crosslinking agents.

20. A device comprising the multiblock copolymer of claim 1.

* * * * *

UNITED STATES PATENT AND TRADEMARK OFFICE

CERTIFICATE OF CORRECTION

PATENT NO. : 12,030,981 B2
APPLICATION NO. : 17/042003
DATED : July 9, 2024
INVENTOR(S) : Kohl et al.

It is certified that error appears in the above-identified patent and that said Letters Patent is hereby corrected as shown below:

In the Specification

Column 3, Lines 10-11: Please delete "[Not sure what it means to be a bond.]"

Column 5, Line 48: Please correct "and X" to read --and λ--

Column 5, Line 54: Please correct "number (2)" to read --number (λ)--

Column 14, Line 44: Please delete "Make all mol %."

Column 19, Line 8: Please correct "where 20" to read --where 2θ--

Column 19, Line 67: Please correct "Bf form" to read --$Br^-$ form--

Column 20, Line 5: Please correct "The Cl" to read --The $Cl^-$--

Column 20, Line 67: Please correct "$H_{ice}=H_{ice}{}^{o}-\Delta C_p \Delta T_f$" to read --$H_{ice}=H^{o}_{ice}-\Delta C_p \Delta T_f$--

Column 22, Lines 43-47, Scheme 1: Please correct "
1. trimethylamine
aq. rt, 24 h
2. NaOH aq.
rt, 24 h
" to read
--
1. trimethylamine
aq. rt, 24 h
2. NaOH aq.
rt, 24 h
--

Column 25, Line 35: Please correct "(a)" to read --(σ)--

Signed and Sealed this
Twenty-fourth Day of September, 2024

Katherine Kelly Vidal

*Director of the United States Patent and Trademark Office*

Column 25, Line 44: Please correct “Ina” to read --lnσ--

Column 25, Line 66: Please correct “a/IEC” to read --σ/IEC--

Column 26, Line 16: Please correct “number (2)” to read --number (λ)--

Column 28, Line 19: Please correct “6,7” to read --6.7--

Column 30, Line 60: Please correct “-200 mS/cm” to read --~200 mS/cm--

Column 31, Lines 7-8: Please remove the paragraph break between “ions.” and “Although”

Column 32, Line 21: Please correct “(($_7{}^3$-allyl)Pd($^i$Pr$_3$P)Cl)” to read --(($\eta^3$-allyl)Pd($^i$Pr$_3$P)Cl)--

Column 32, Line 27: Please correct “>99%” to read --≥99%--

Column 32, Line 34: Please correct “($\eta^3$-allyl)Pd(Pr$_3$P)Cl” to read --($\eta^3$-allyl)Pd($^i$Pr$_3$P)Cl--

Column 32, Line 57: Please correct “(M/$M_n$)” to read --($M_w$/$M_n$)--

Column 34, Line 52: Please correct “$H_{ice}=H_{ice}{}^o-\Delta C_p\Delta T_f$” to read --$H_{ice}=H^o_{ice}-\Delta C_p\Delta T_f$--

Column 34, Line 61: Please correct “where 20” to read --where 2θ--

Column 35, Line 31: Please correct “($\eta^3$-allyl)Pd)($^i$Pr$_3$P)Cl)” to read --($\eta^3$-allyl)Pd($^i$Pr$_3$P)Cl)--

Column 36, Line 1: Please correct “($M_a$)” to read --($M_n$)--

Column 44, Lines 50-67, Scheme 3: Please correct “ 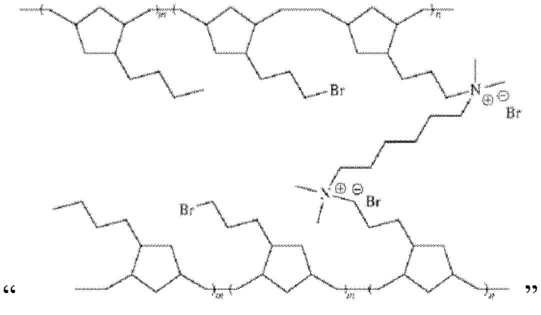 ” to read -- 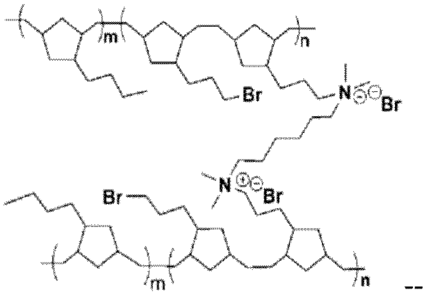 --

Column 46, Lines 1-15, Scheme 3: Please correct “

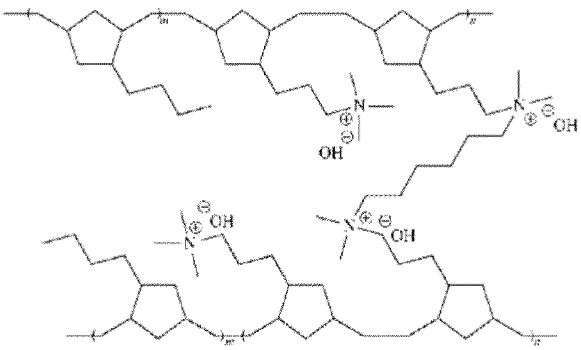

XL-rPNB-$X_m$-$Y_n$ ”

to read --

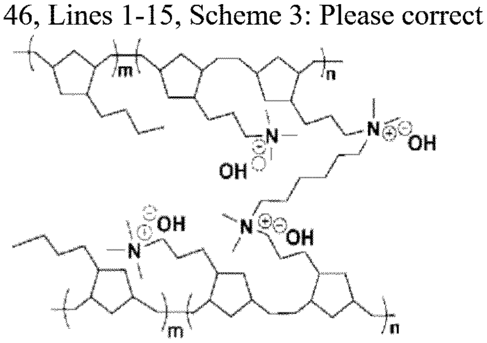

XL-rPNB-$X_m$-$Y_n$ --

Column 46, Line 33: Please correct “Bf ions for Off ions” to read --$Br^-$ ions for $OH^-$ ions--

Column 47, Line 16: Please correct “with F” to read --with $I^-$--

Column 48, Line 66: Please correct “($H_e$)” to read --($H_c$)--

Column 50, Line 65: Please correct “the X, value” to read --the λ value--

Column 51, Line 1: Please correct “highest value” to read --highest λ value--

Column 51, Line 30: Please correct “6/IEC” to read --σ/IEC--

Column 52, Line 8: Please correct “XL-rPNB-$X_6$-$Y_{40}$” to read --XL-rPNB-$X_{60}$-$Y_{40}$--

Column 52, Line 22: Please correct “k (10 to 30)” to read --λ (10 to 30)--

Column 56, Lines 63-64: Please correct “number (2)” to read --number (λ)--

In the Claims

Column 66, Line 62, Claim 16: Please correct “number X” to read --number λ--